(12) United States Patent
Rupp et al.

(10) Patent No.: US 9,974,226 B2
(45) Date of Patent: May 22, 2018

(54) GENERATING AN AGRICULTURE PRESCRIPTION

(71) Applicant: The Climate Corporation, San Francisco, CA (US)

(72) Inventors: Craig Eugene Rupp, Ames, IA (US); A. Corbett S. Kull, Palatine, IL (US); Steve Richard Pitstick, Maple Park, IL (US); Patrick Lee Dumstorff, Chicago, IL (US)

(73) Assignee: The Climate Corporation, San Francisco, CA (US)

( * ) Notice: Subject to any disclaimer, the term of this patent is extended or adjusted under 35 U.S.C. 154(b) by 477 days.

(21) Appl. No.: 14/691,280

(22) Filed: Apr. 20, 2015

(65) Prior Publication Data

US 2015/0302305 A1 Oct. 22, 2015

Related U.S. Application Data

(60) Provisional application No. 61/981,909, filed on Apr. 21, 2014.

(51) Int. Cl.
*G06F 17/00* (2006.01)
*G06N 5/02* (2006.01)
*A01B 79/00* (2006.01)

(52) U.S. Cl.
CPC .................... *A01B 79/005* (2013.01)

(58) Field of Classification Search
CPC .................................................. A01B 79/005
See application file for complete search history.

(56) References Cited

U.S. PATENT DOCUMENTS

| | | | |
|---|---|---|---|
| 5,721,679 A | * | 2/1998 | Monson ............... A01B 79/005 701/409 |
| 2006/0037520 A1 | | 2/2006 | Tsing |
| 2014/0012732 A1 | | 1/2014 | Lindores |

OTHER PUBLICATIONS

International Searching Authority; International Search Report and Written Opinion; Application No. PCT/US15/26906; dated Jul. 30, 2015; 7 pgs.

* cited by examiner

*Primary Examiner* — Luis Sitiriche
(74) *Attorney, Agent, or Firm* — Hickman Palermo Becker Bingham LLP

(57) ABSTRACT

A method begins by agriculture equipment collecting current on-site gathered agriculture data regarding an agriculture region and sending at least a representation of the current on-site gathered agriculture data to a host device. The method continues with the host device processing one or more of the at least a representation of the current on-site gathered agriculture data, current off-site gathered agriculture data, historical on-site gathered agriculture data, historical off-site gathered agriculture data, and historical analysis of agriculture predictions regarding the agriculture region to produce a current agriculture prediction for the agriculture region. The method continues with the host device generating an agriculture prescription regarding at least a portion of the agriculture region based on the current agriculture prediction and sending the agriculture prescription to one or more of the agriculture equipment.

18 Claims, 39 Drawing Sheets

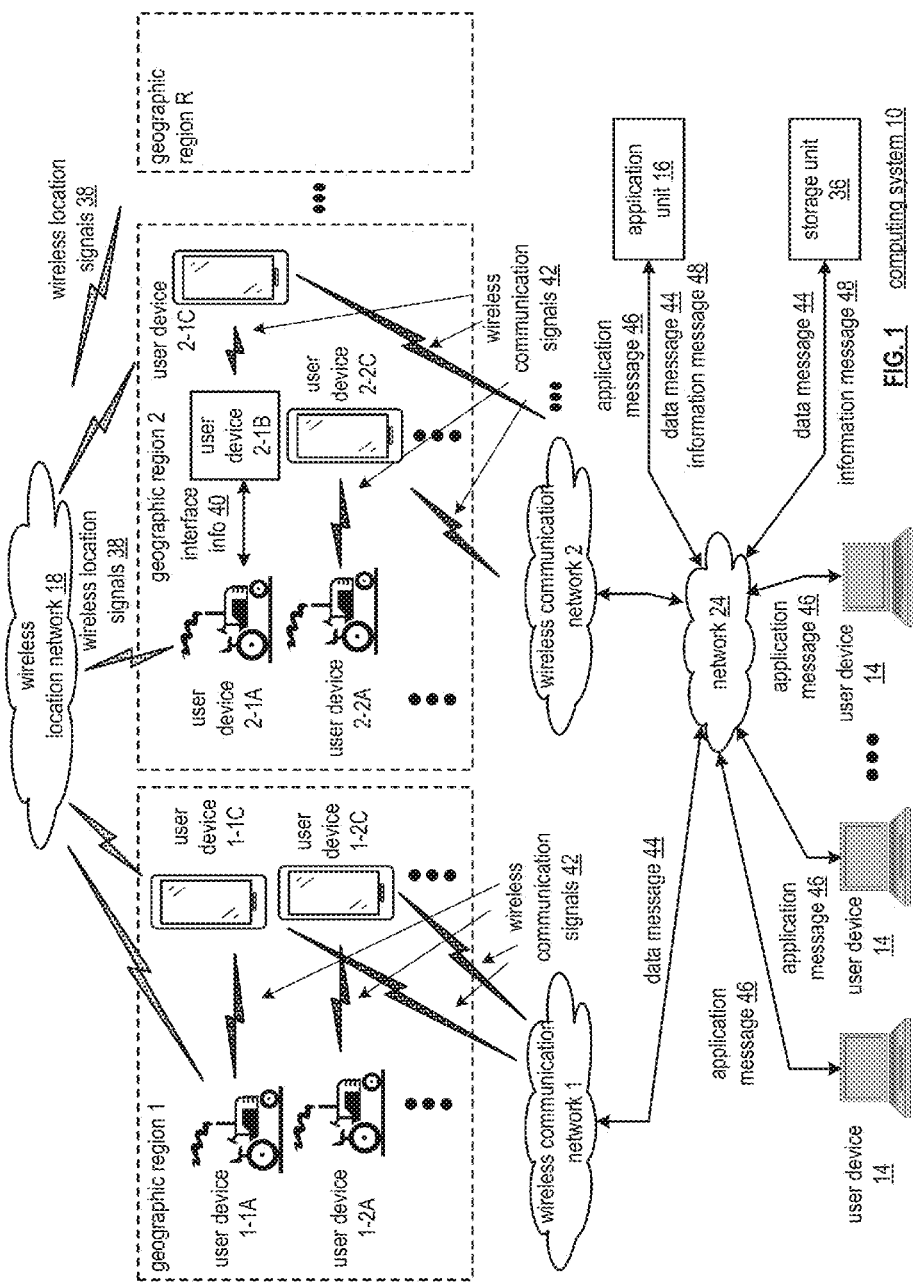
FIG. 1 computing system 10

| geographic region 1 | geographic region 2 | geographic region 3 | geographic region 4 | geographic region 5 | geographic region 6 |
|---|---|---|---|---|---|
| geographic region 7 | geographic region 8 | geographic region 9 | geographic region 10 | geographic region 11 | geographic region 12 |
| geographic region 13 | geographic region 14 | geographic region 15 | geographic region 16 | geographic region 17 | geographic region 18 |
| geographic region 19 | geographic region 20 | geographic region 21 | geographic region 22 | geographic region 23 | geographic region 24 |
| geographic region 25 | | | | | |

FIG. 2

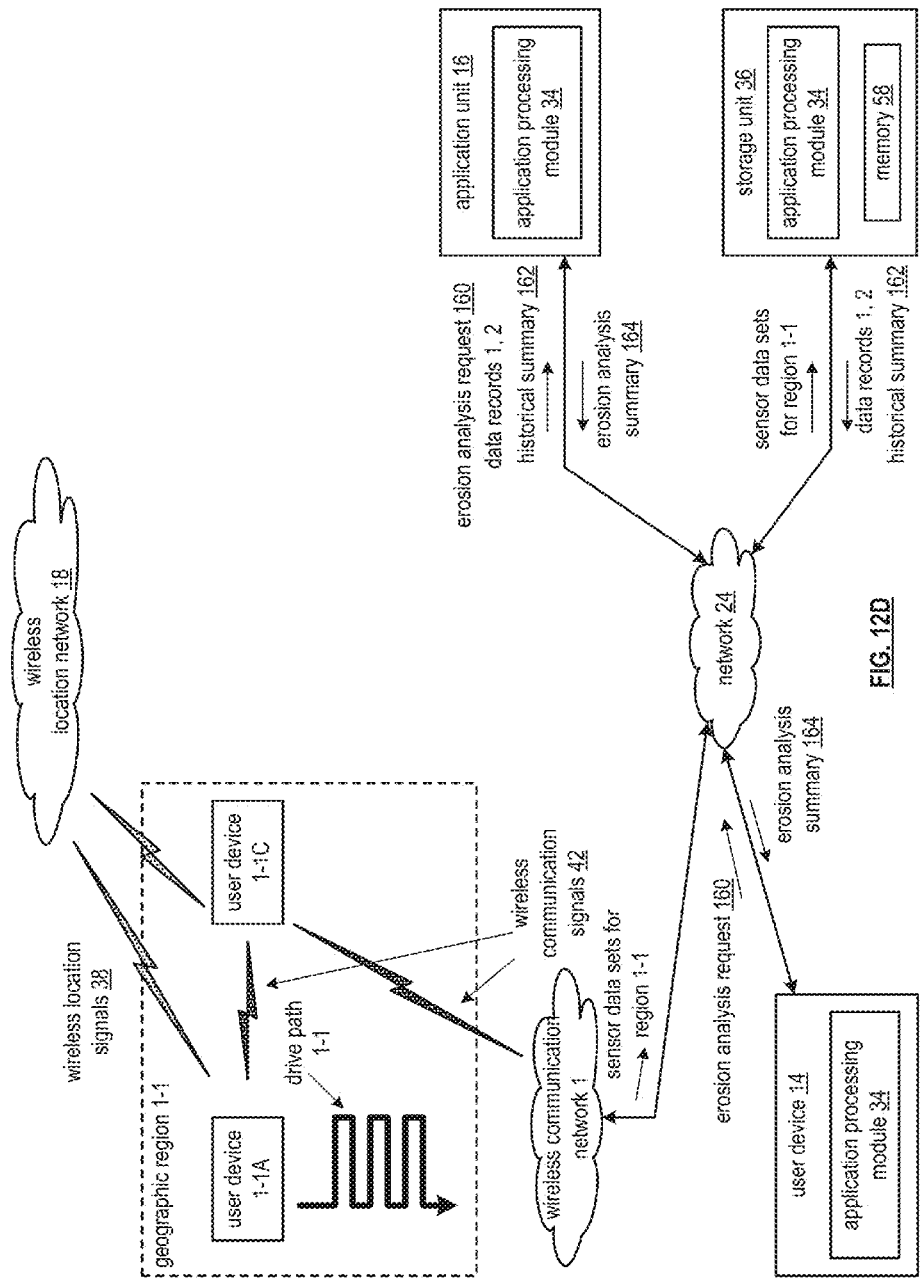

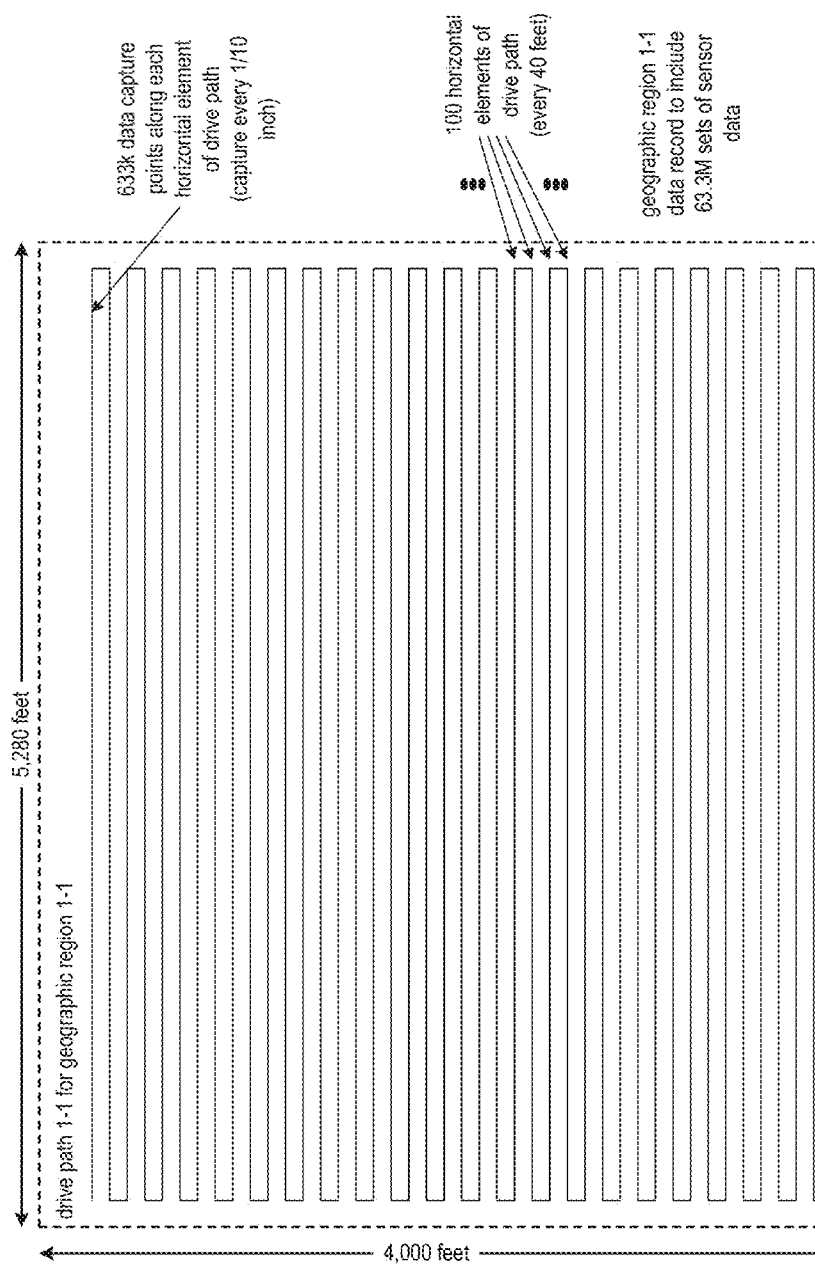

GENERATING AN AGRICULTURE PRESCRIPTION

CROSS REFERENCE TO RELATED PATENTS

This application is a U.S. national stage application filed under 35 U.S.C. § 371 based upon International Patent Application PCT/US15/26906, filed Apr. 21, 2015, which claims the benefit of U.S. provisional application 61/981,090, filed Apr. 21, 2014, the entire contents of which are hereby incorporated by reference as if fully set forth herein for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems utilized in agriculture and more particularly to utilization of computing systems to prescribe aspects of an agriculture life cycle to provide improved results of the agriculture life cycle.

Description of Related Art

Agriculture is known to include cultivation of plants to sustain and enhance human life. The cultivation of plants includes executing numerous steps of the agriculture lifecycle, such as, land management, irrigation, fertilization, planting, and harvesting. Effectiveness of the agriculture lifecycle may depend upon process control of the execution of the numerous steps and further depend upon numerous conditions, such as, available sunlight, water availability, temperature ranges, wind speeds, soil type, soil nutrients, and other factors.

Computing devices are known to gather data, store the data, process the data, and communicate the data. Examples of a computing device includes embedded farming equipment electronics, a smart phone, a tablet computer, a laptop computer, a personal computer, a storage server, and/or a data processing server. Basically, any device that includes a computing unit, one or more interfaces, and a memory system may be deemed a computing device.

As is further known, computing devices may be utilized to gather data associated with the agriculture lifecycle and to process the gathered data. Such processed data may be utilized to understand cause and effect relationships associated with the effectiveness of the agriculture lifecycle.

BRIEF DESCRIPTION OF THE SEVERAL VIEWS OF THE DRAWING(S)

FIG. 1 is a schematic block diagram of an embodiment of a computing system in accordance with the present invention;

FIG. 2 is a diagram illustrating an embodiment of a plurality of geographic regions in accordance with the present invention;

Figure 12A:
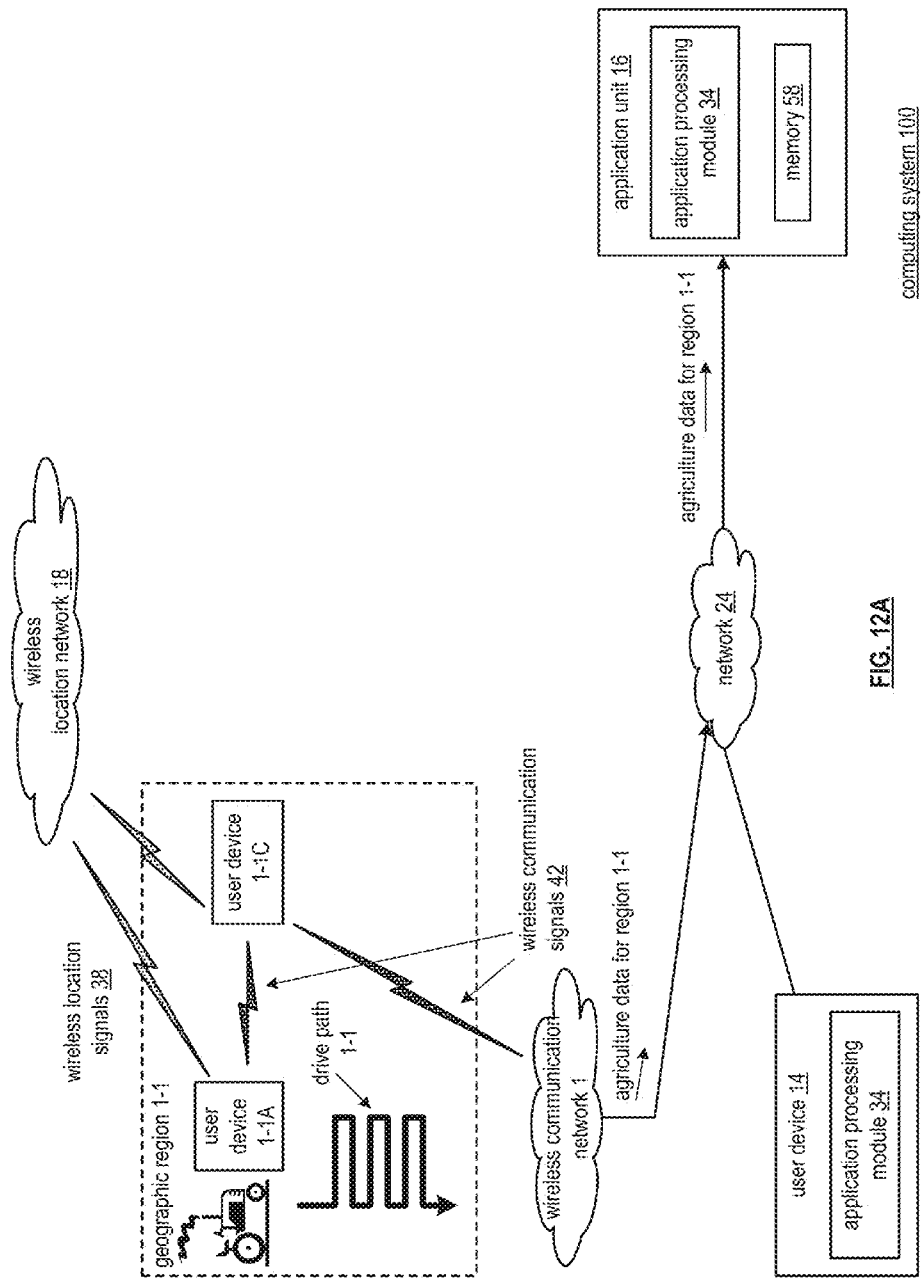
FIGS. 12A and 12B are a schematic block diagram of another embodiment of a computing system in accordance with the present invention.
Figure 12B:
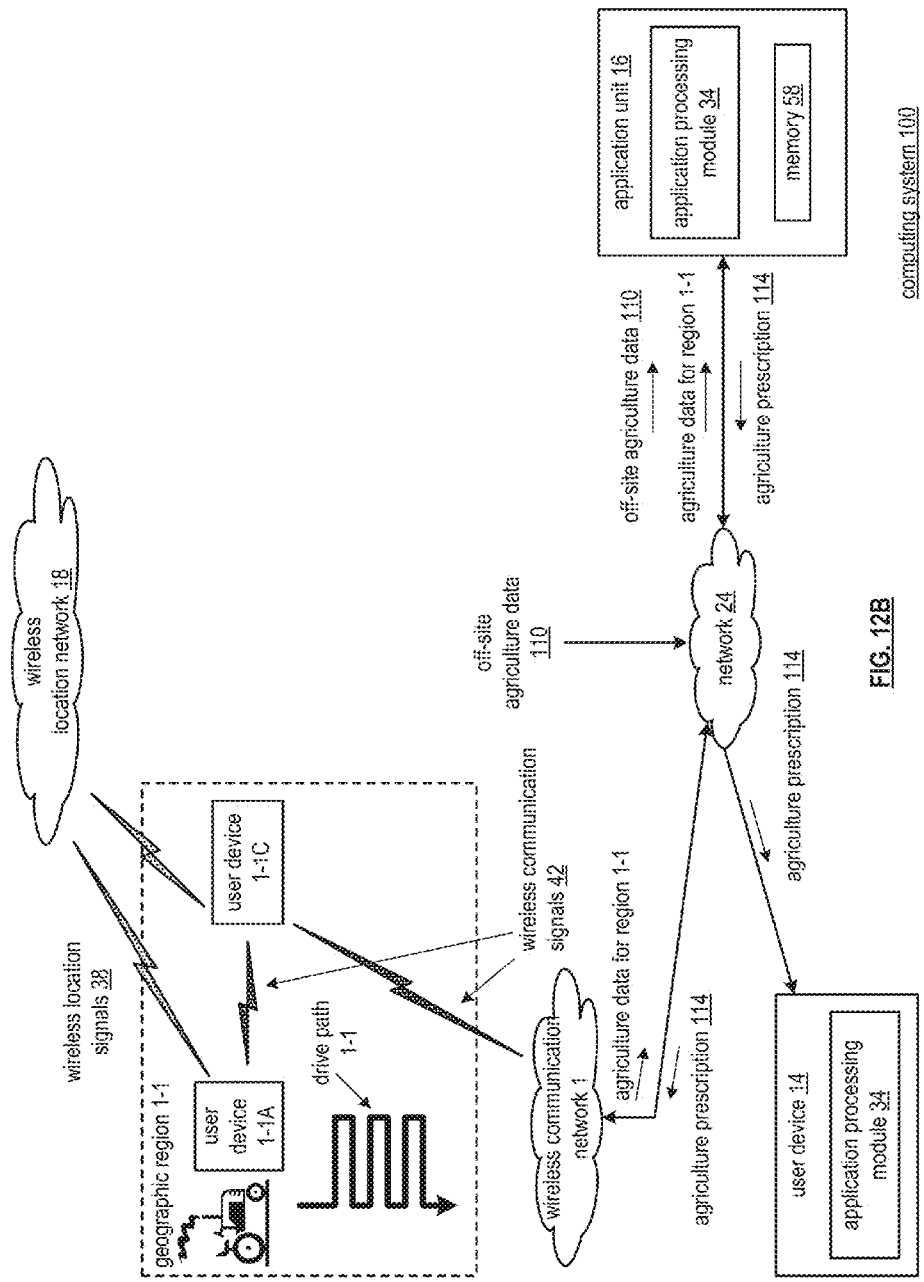
Figure 12C:
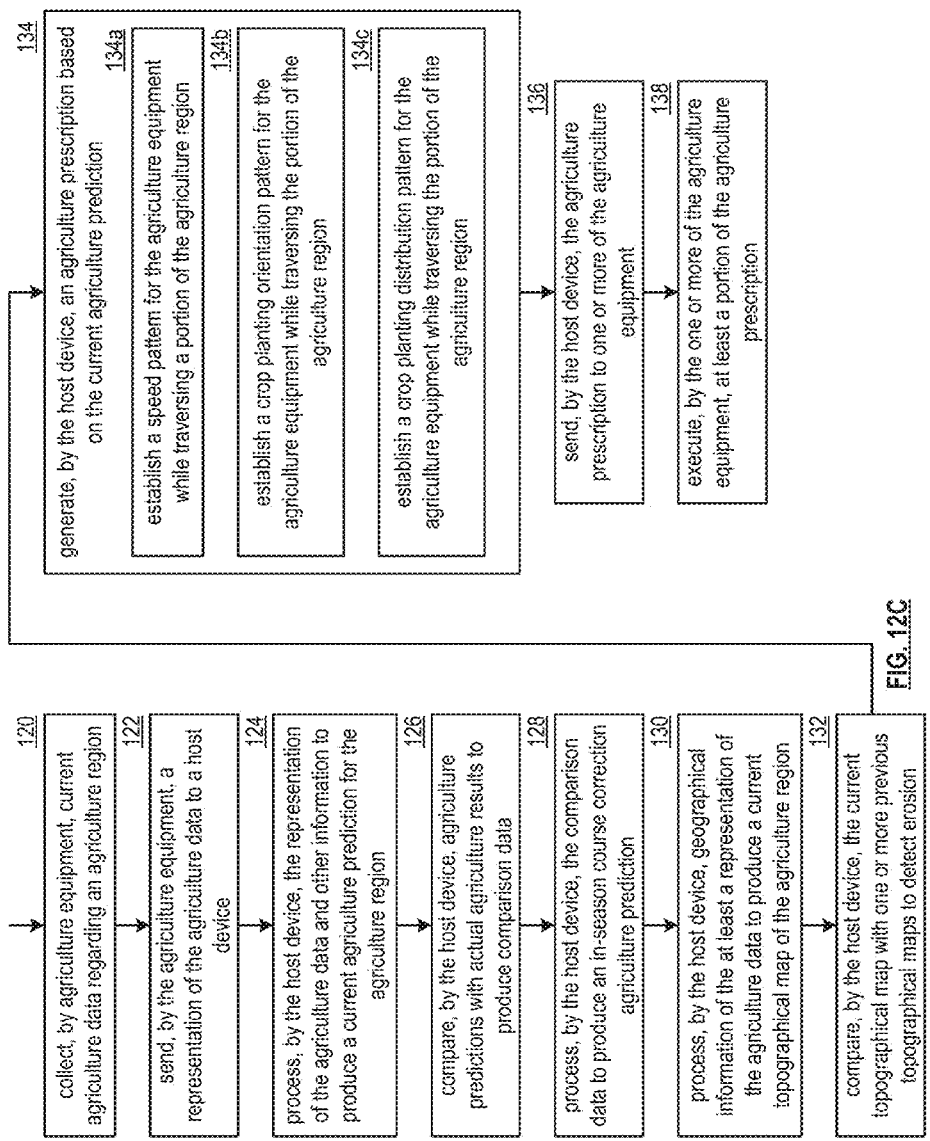
FIG. 12C is a flowchart illustrating an example of generating an agriculture prescription in accordance with the present invention.
Figure 12F:
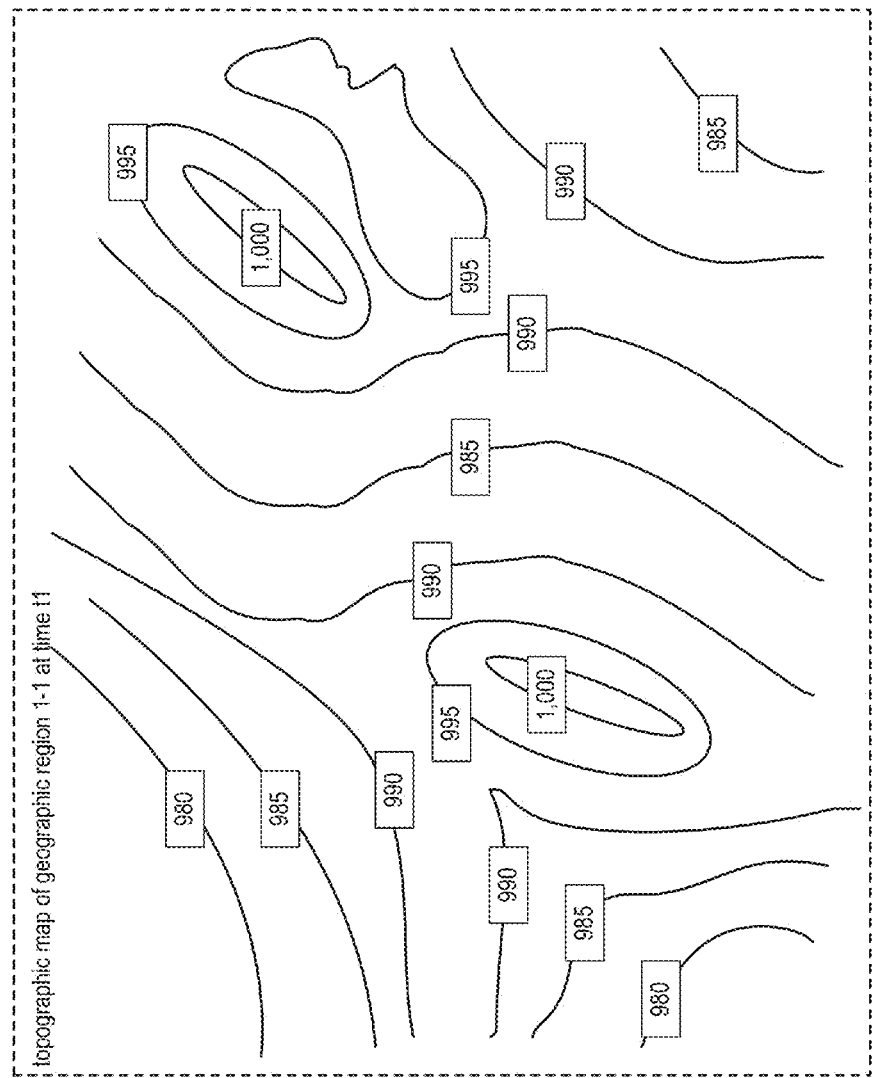
FIG. 12D is a schematic block diagram of another embodiment of a computing system in accordance with the present invention.
FIG. 12E is a diagram illustrating another embodiment of a drive path for an associated geographic region in accordance with the present invention.
Figure 12G:
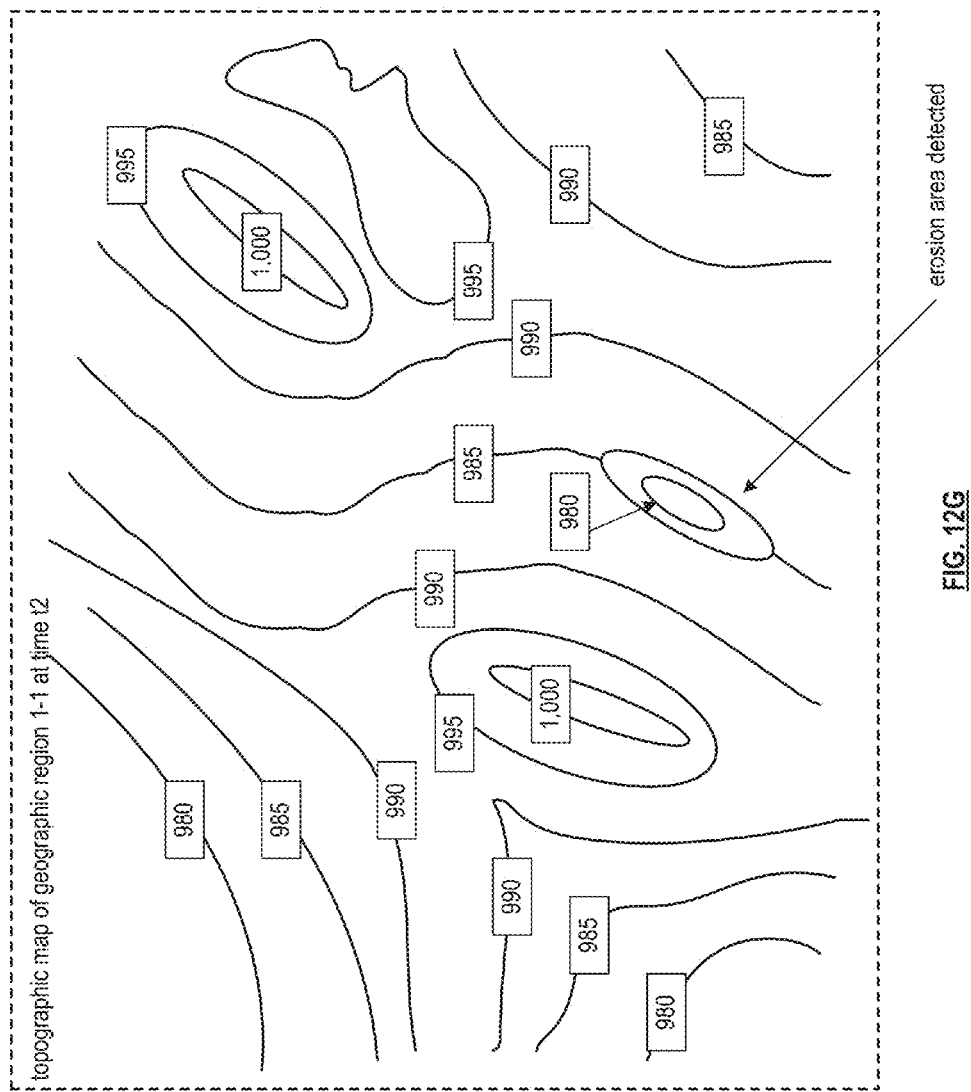
Figure 12H:
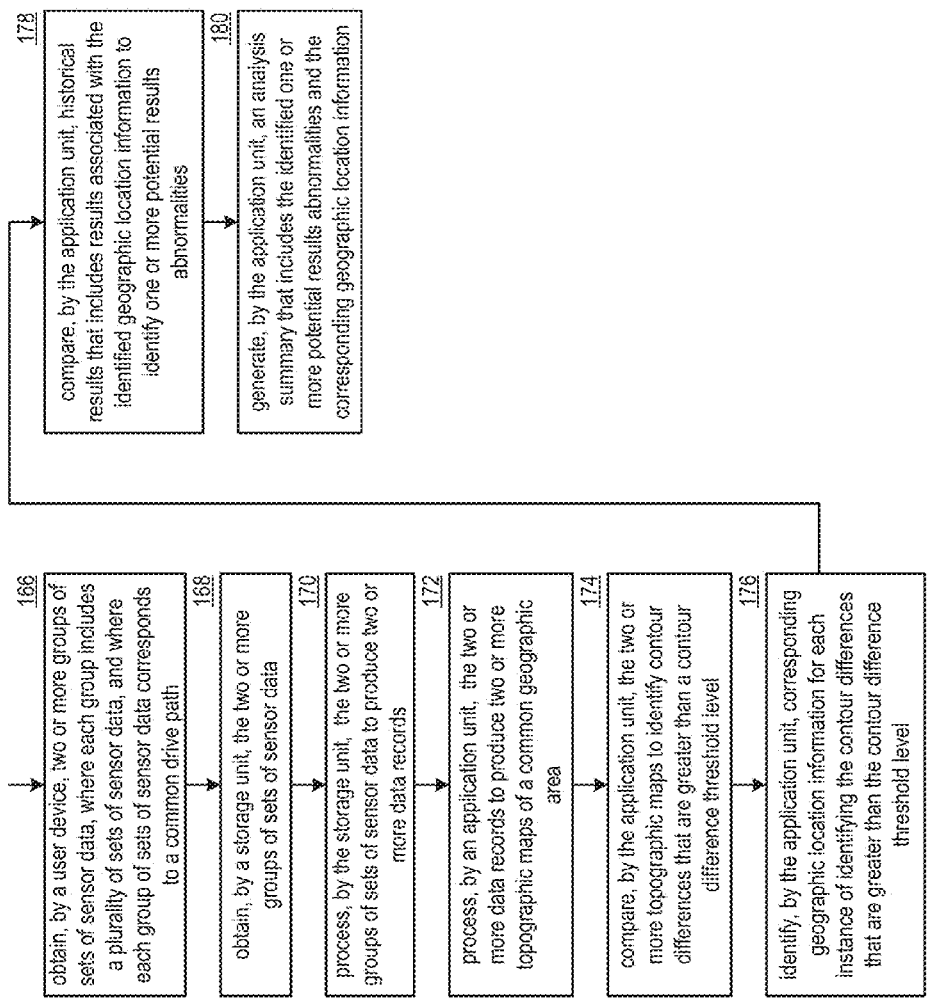
Figure 13A:
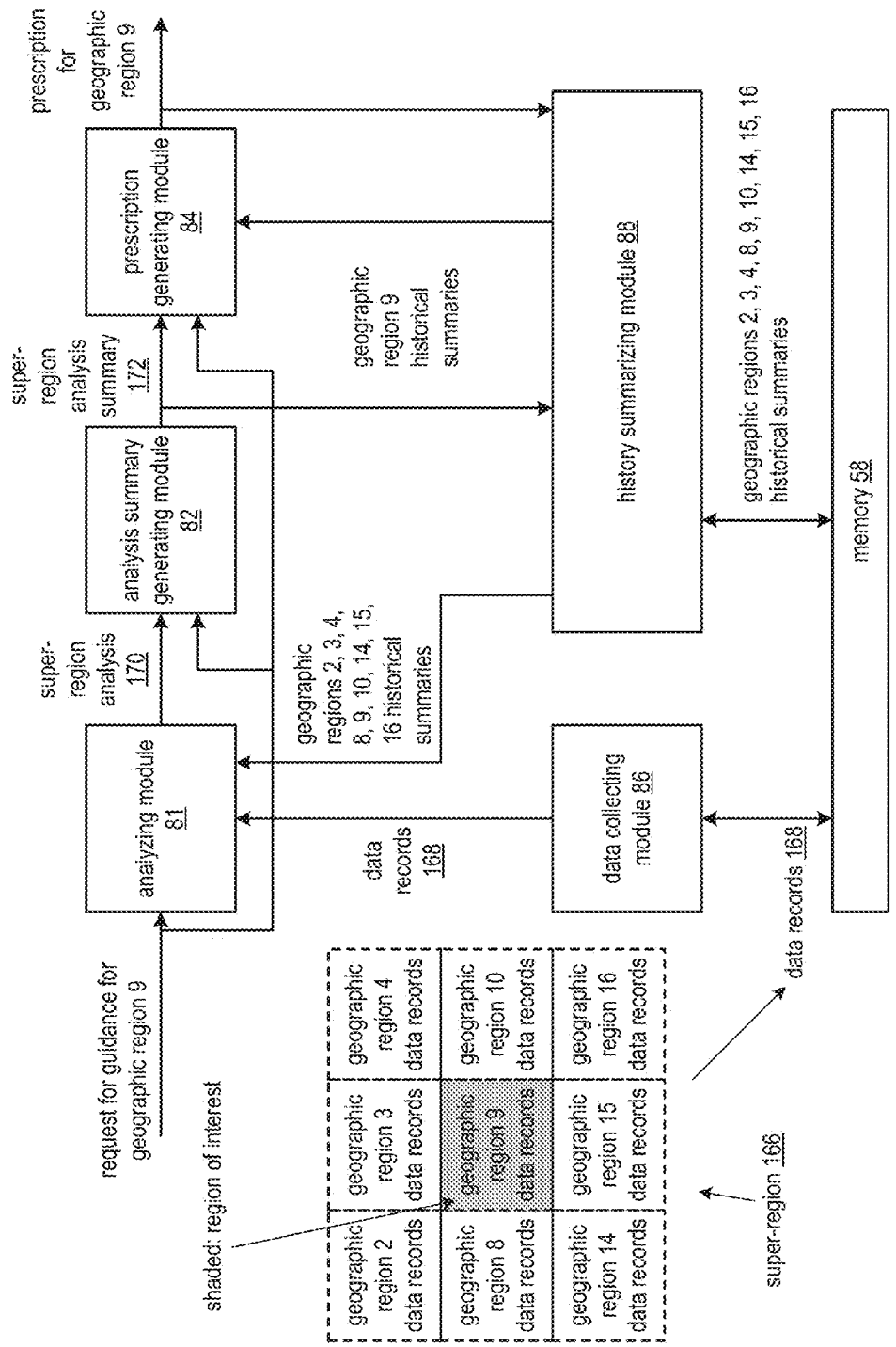
Figure 13B:
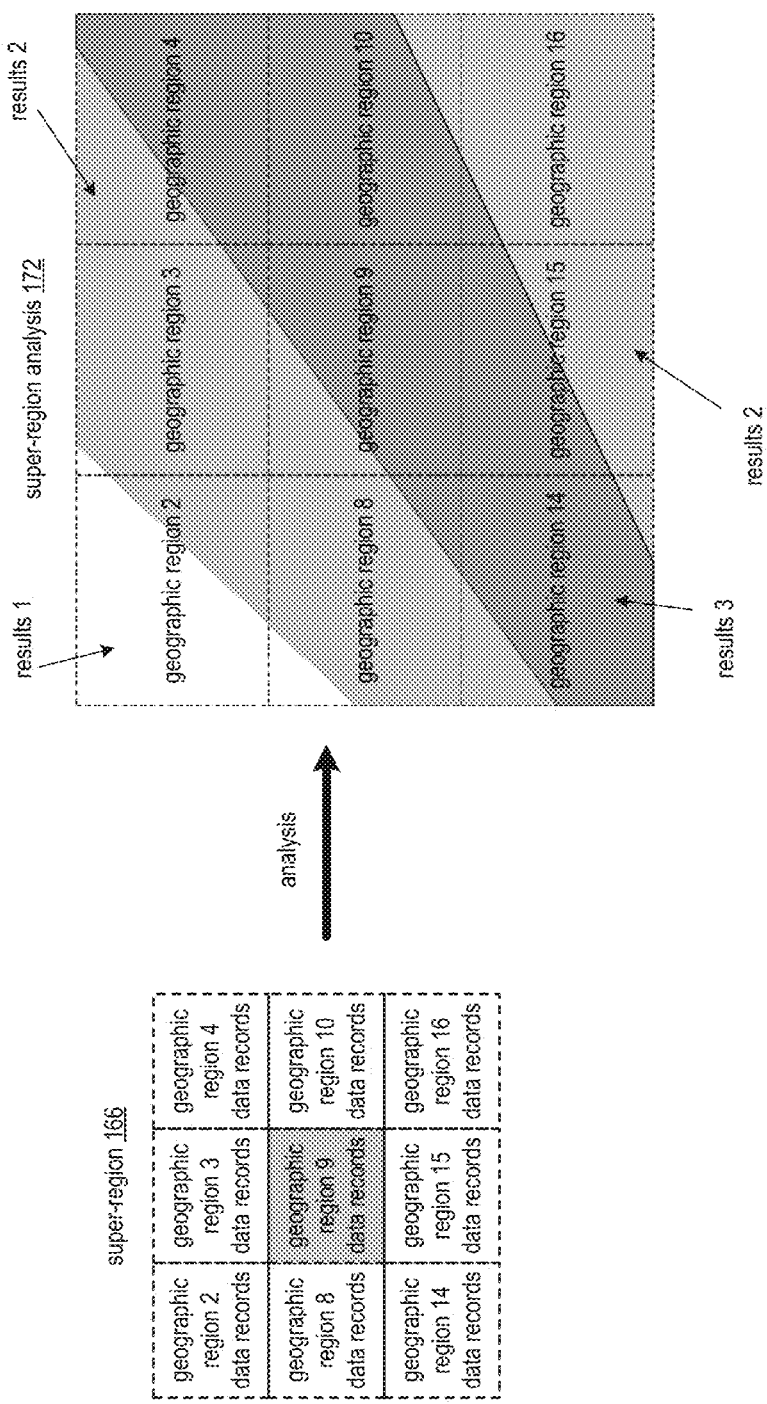
Figure 13C:
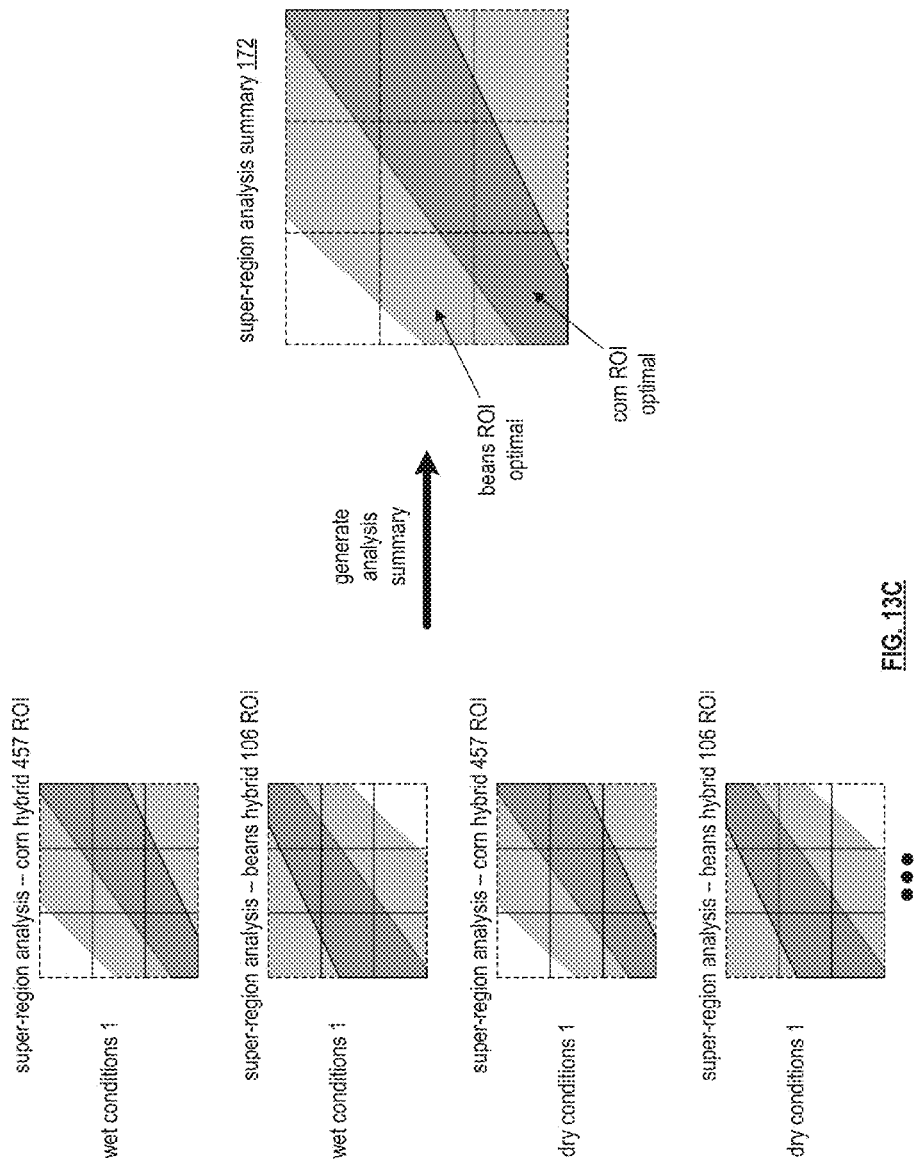
Figure 13D:
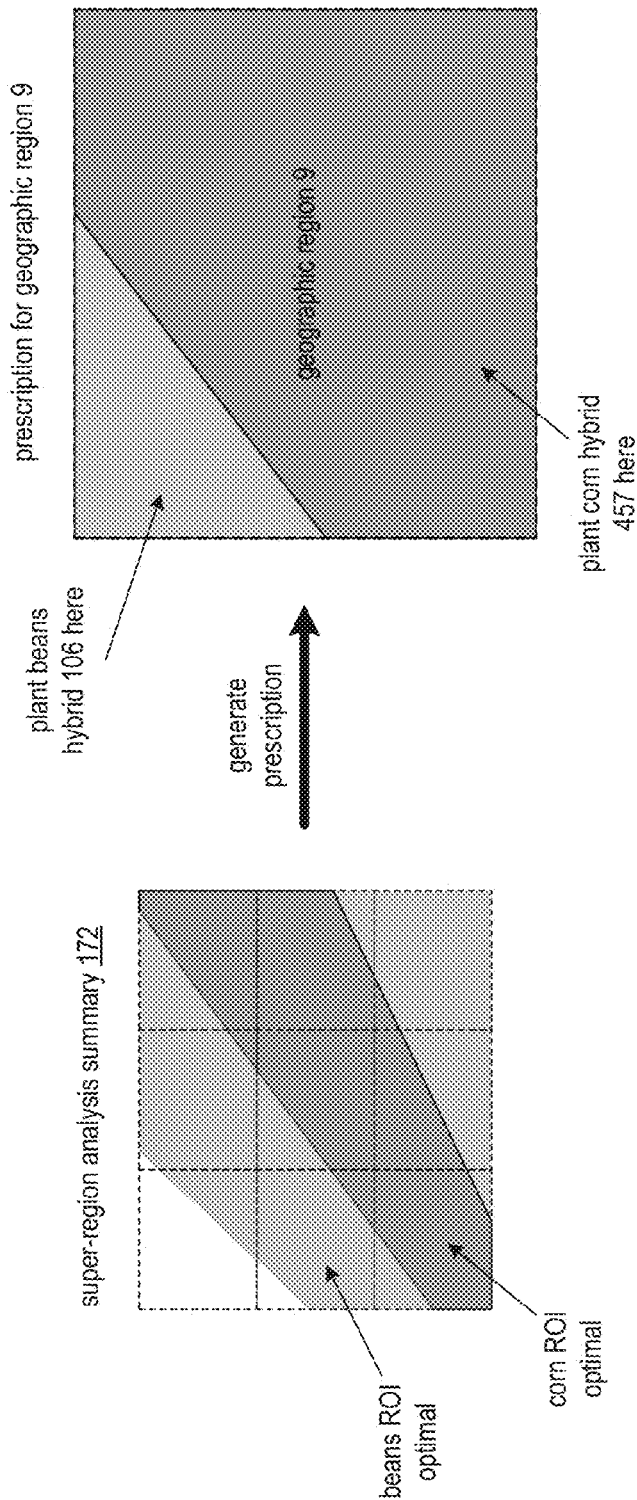
Figure 13E:
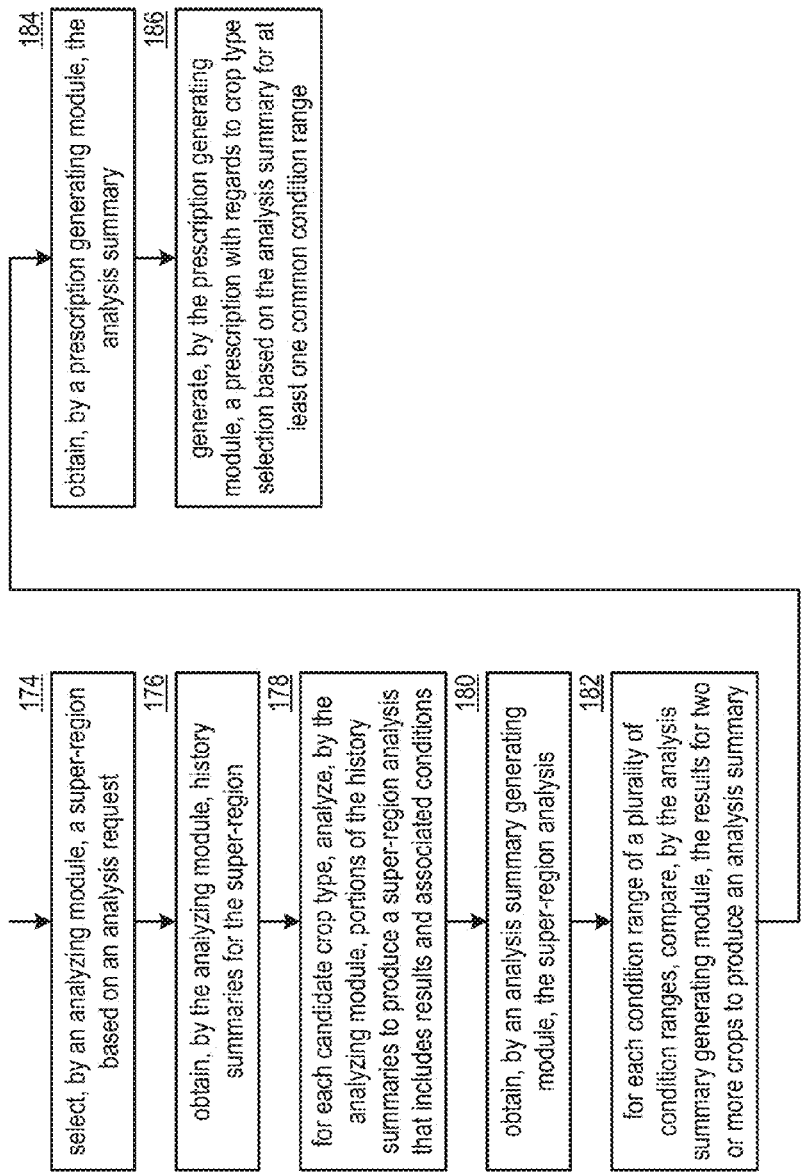
Figure 14A:
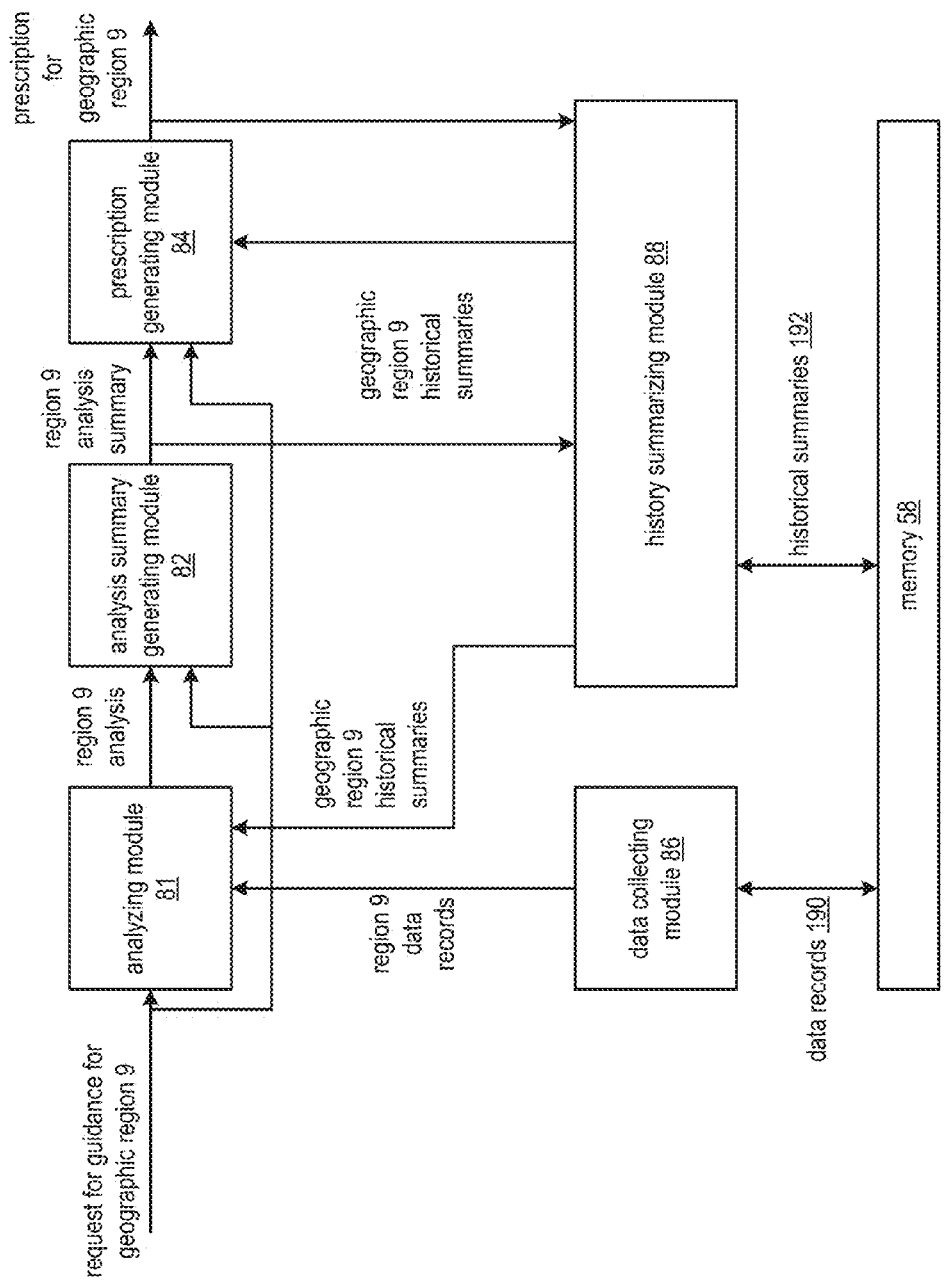
Figure 14B:
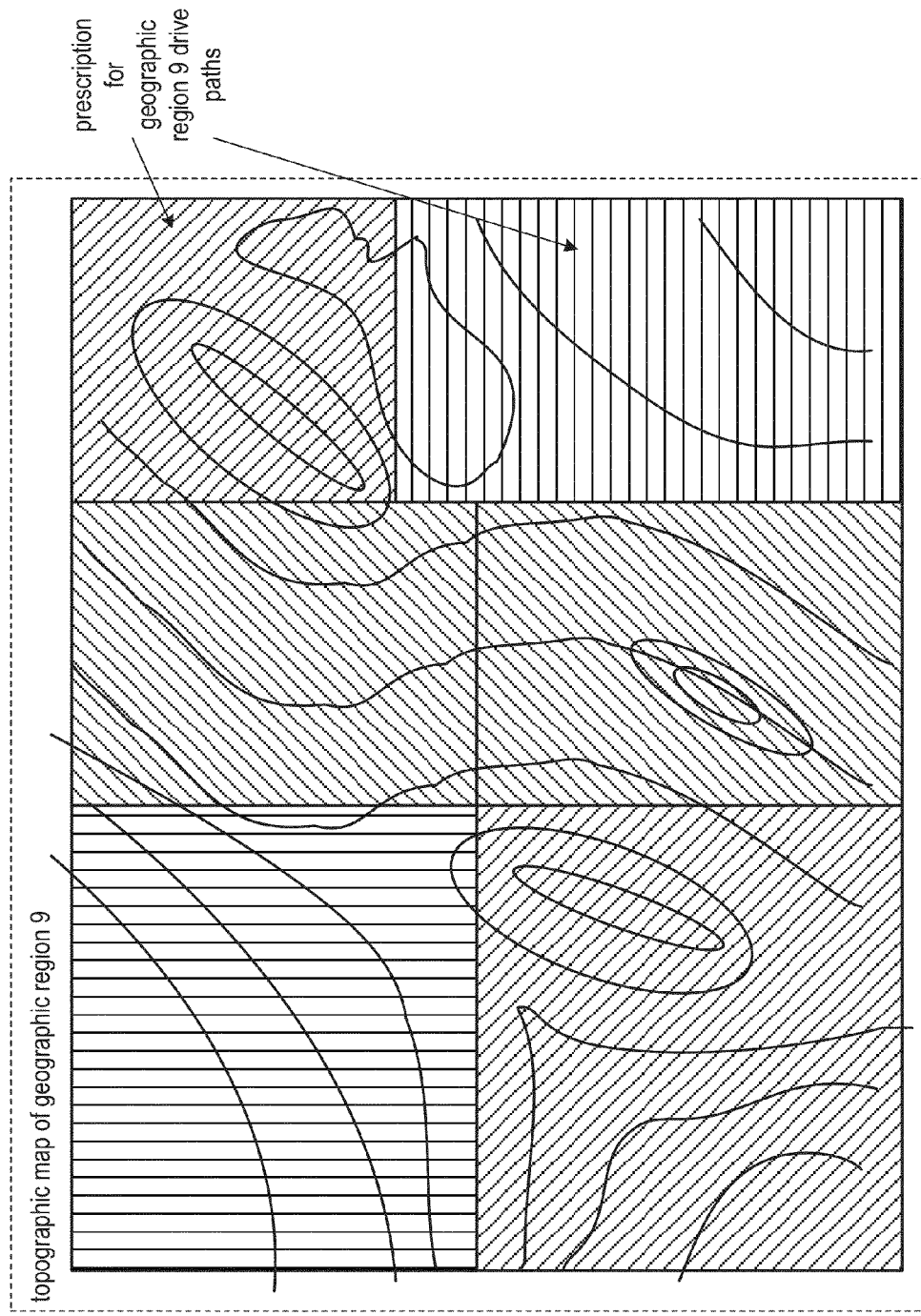
Figure 14C:
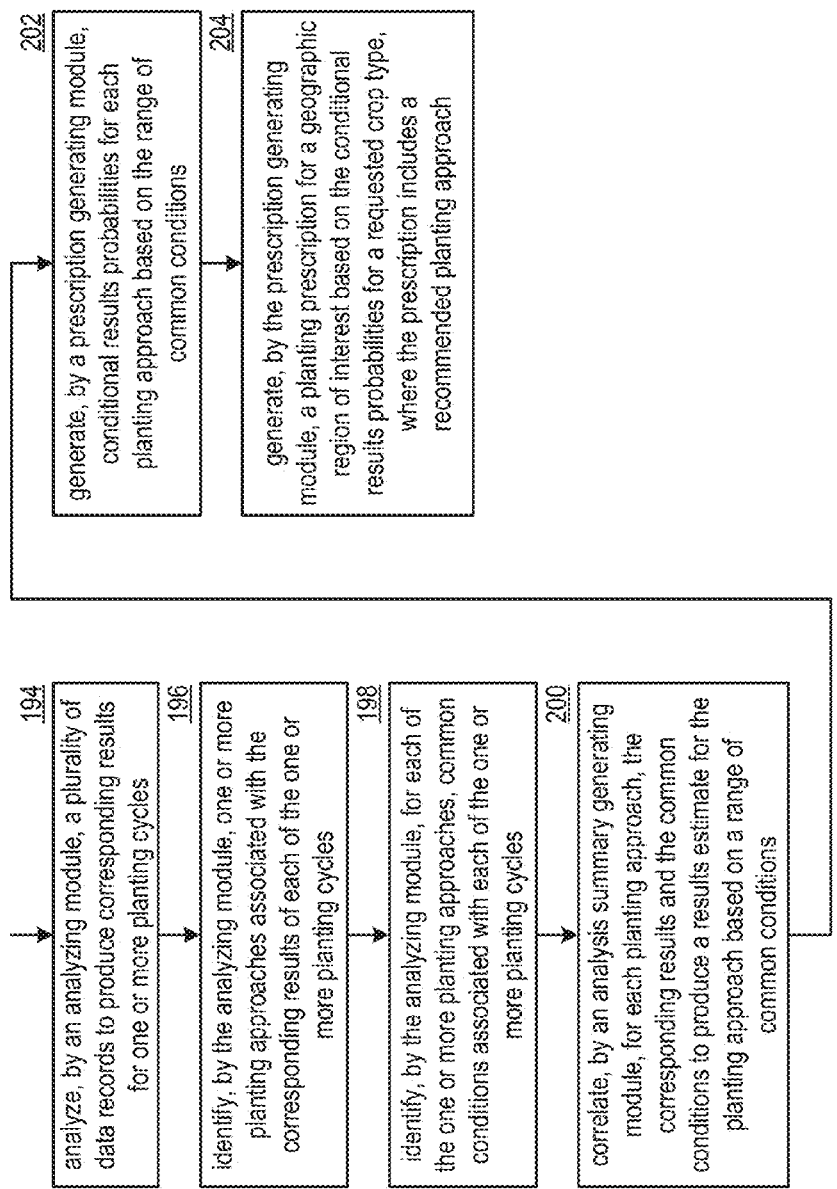
Figure 15A:
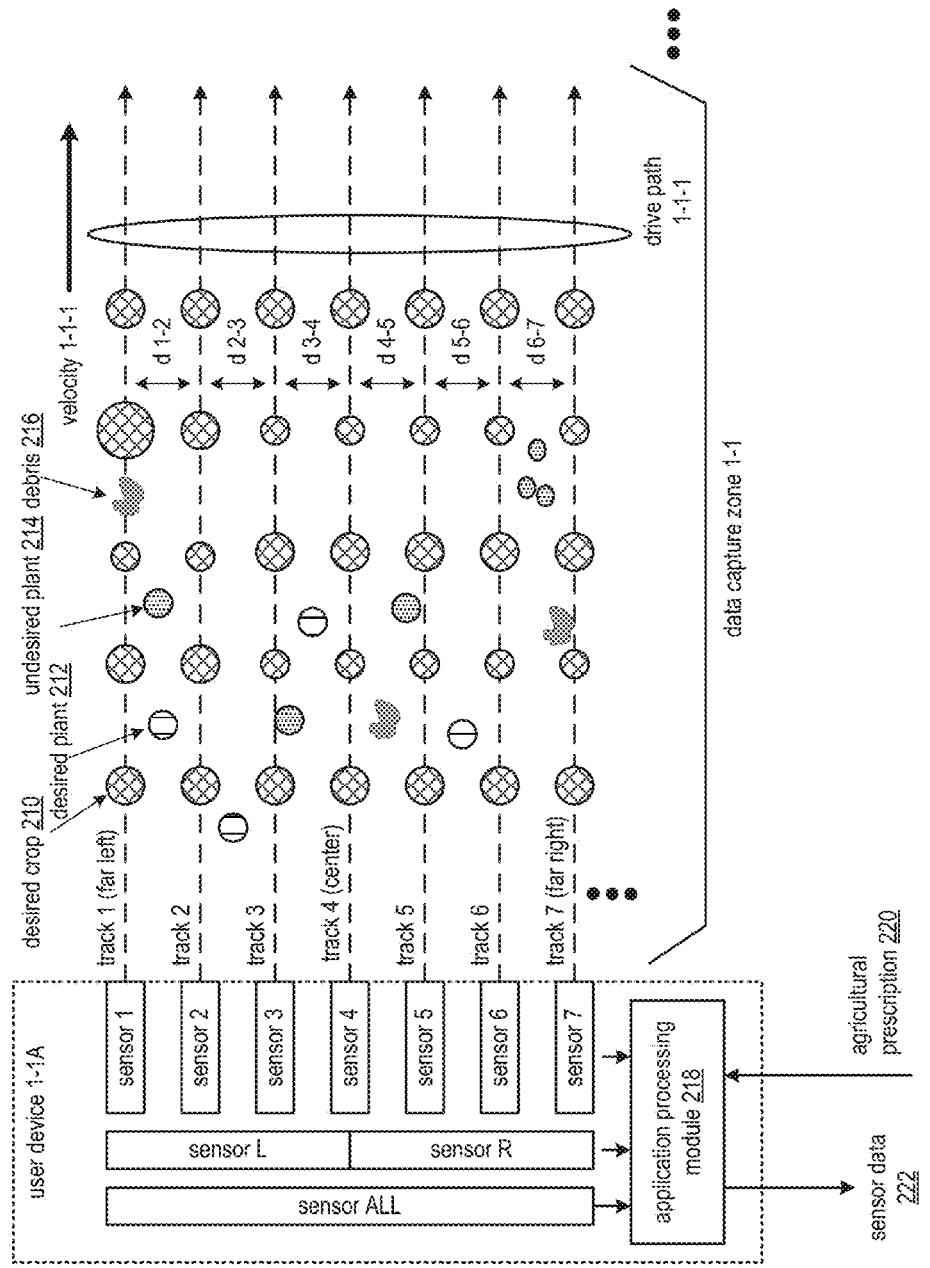
Figure 15B:
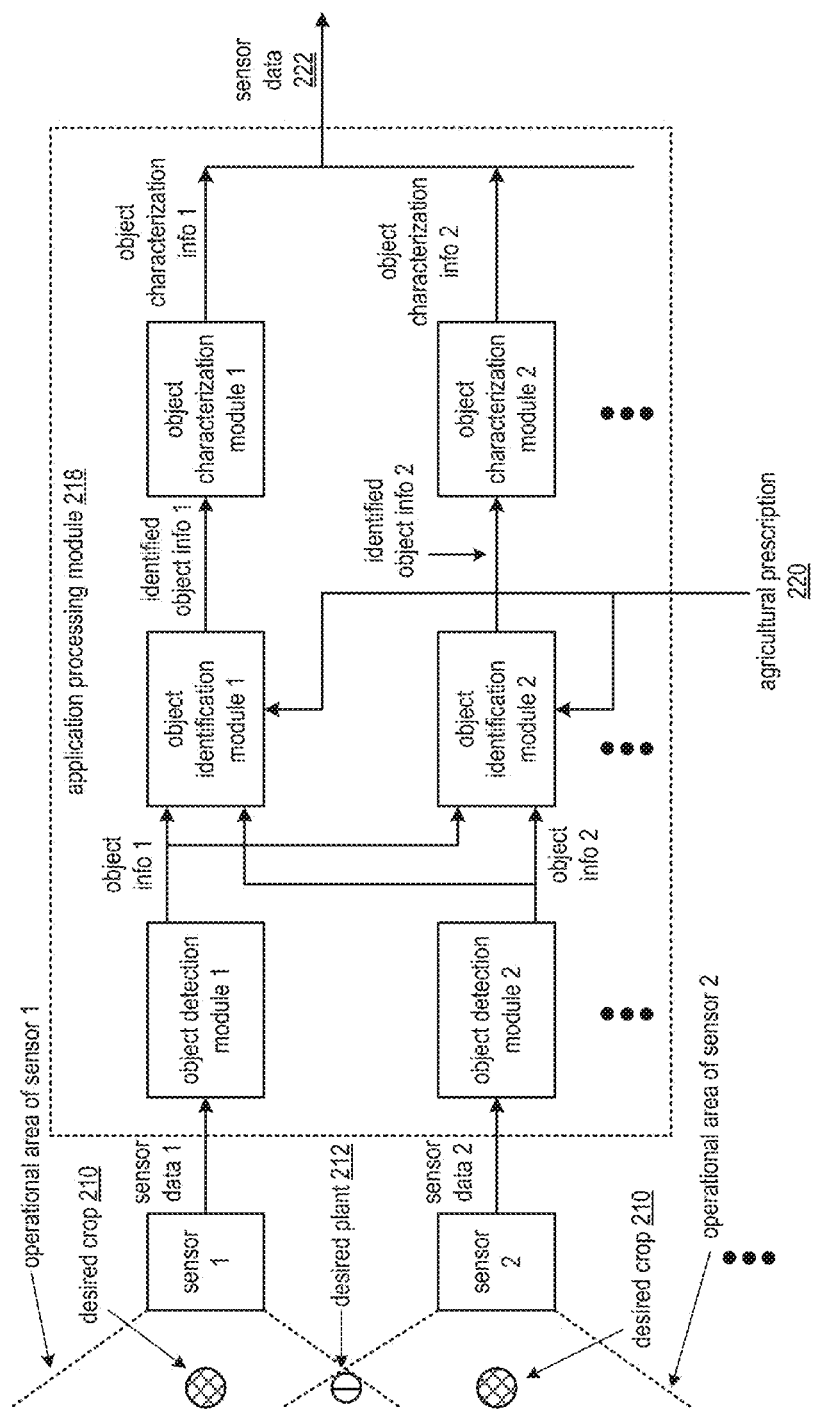
Figure 15C:
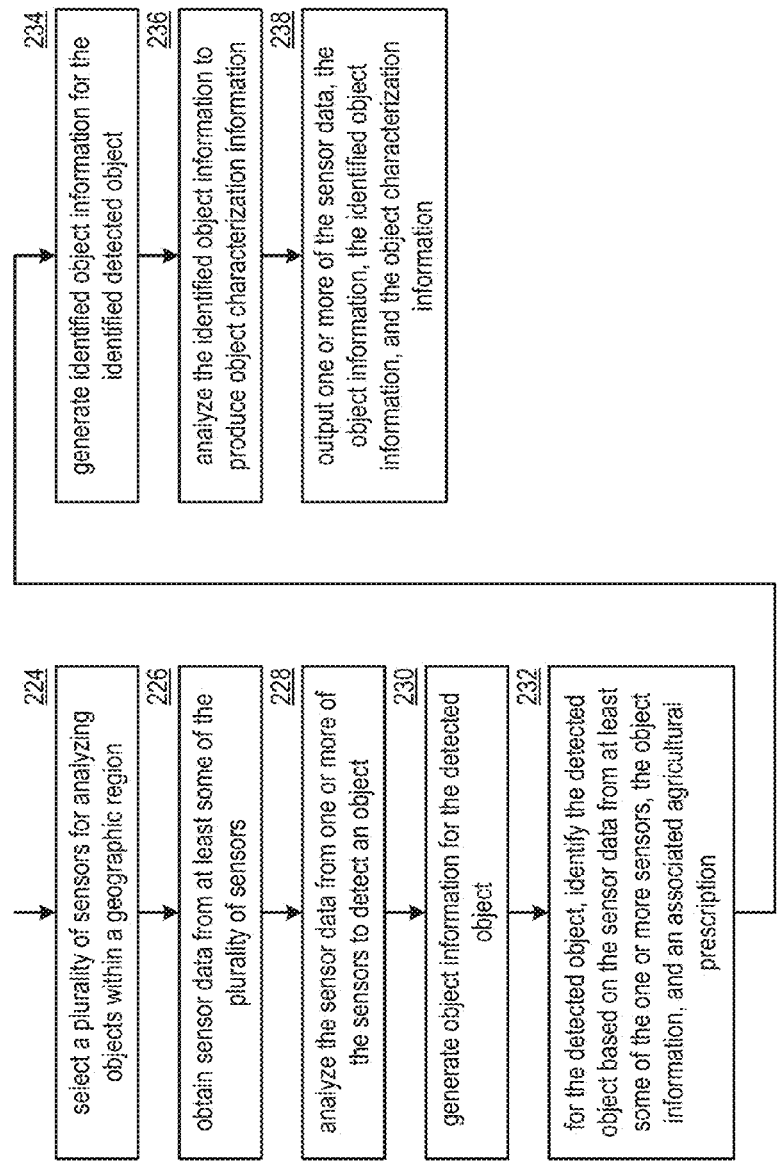
Figure 16A:
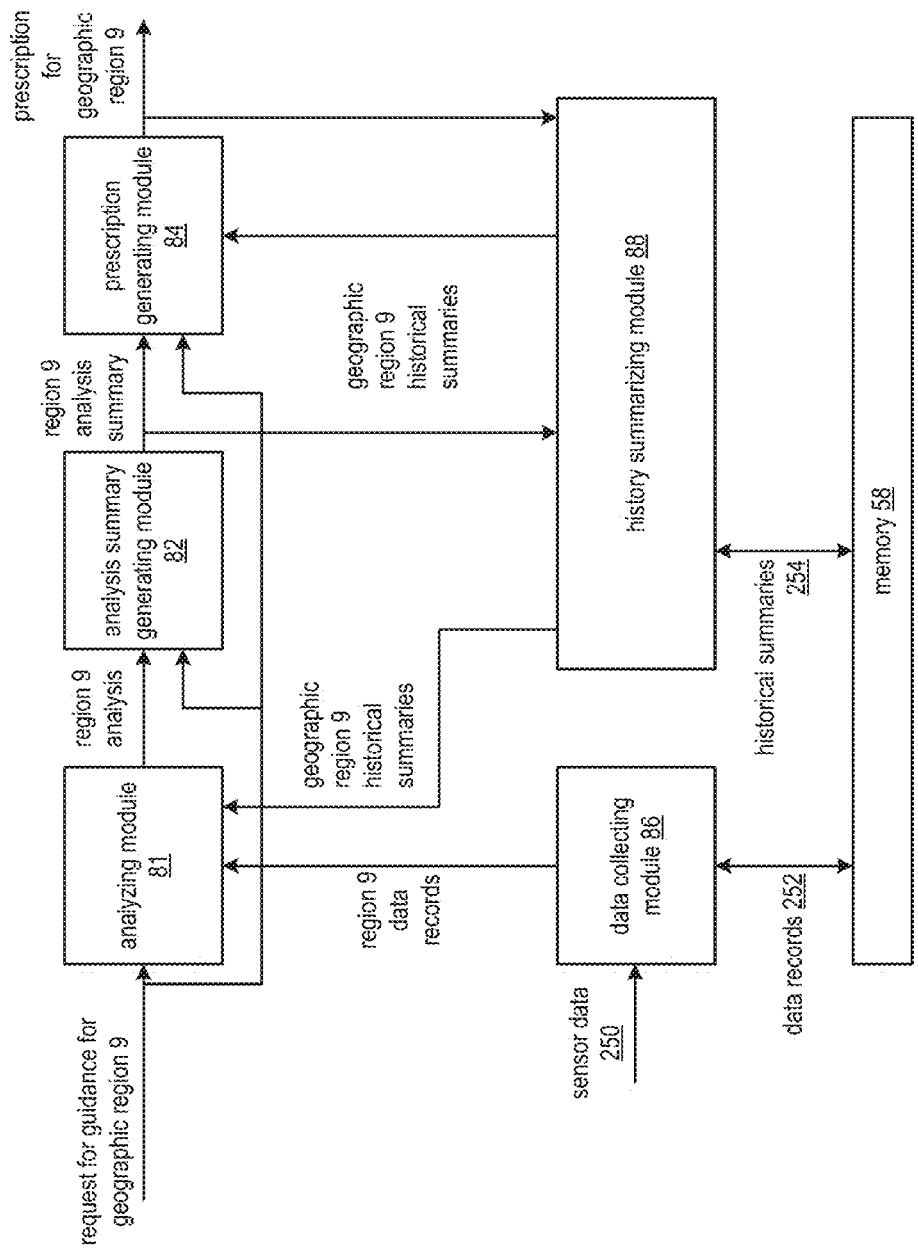
Figure 16B:
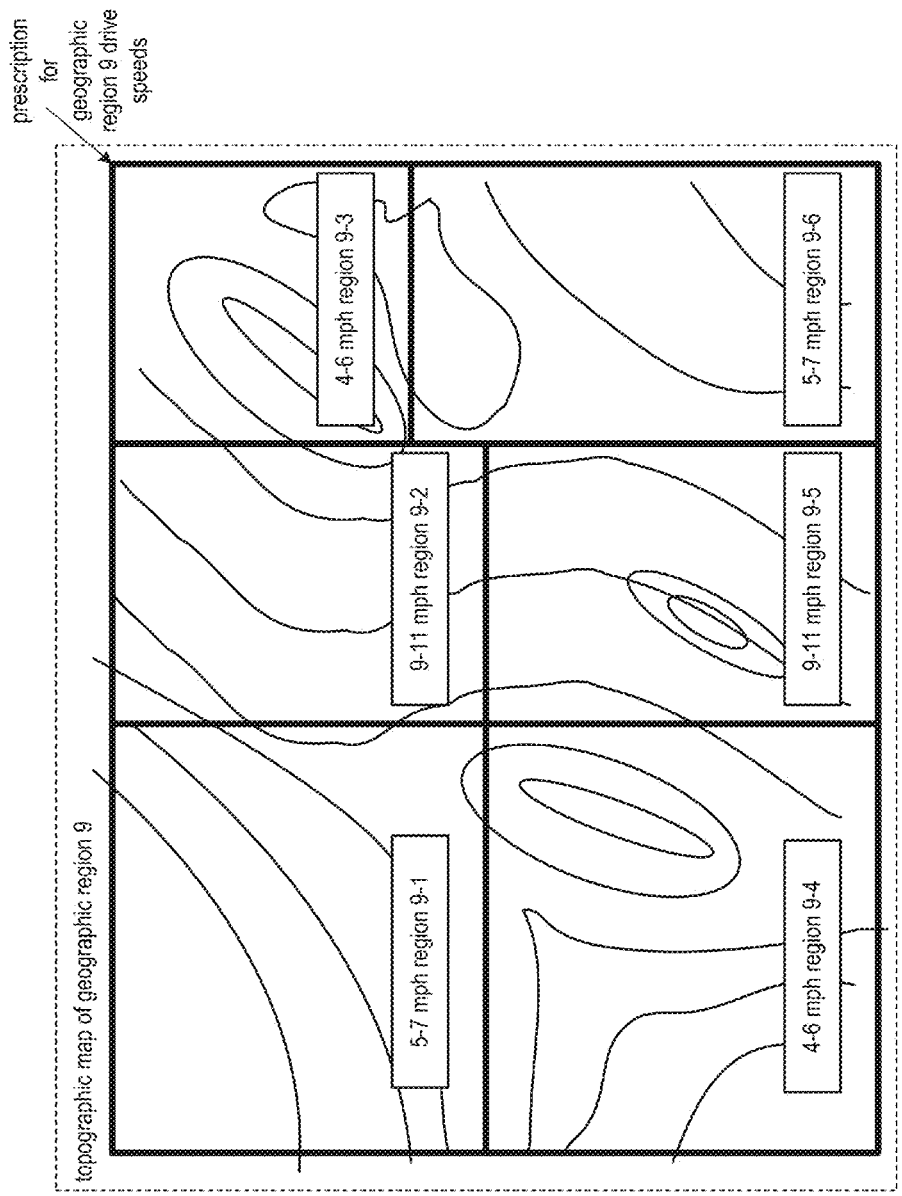
Figure 16C:
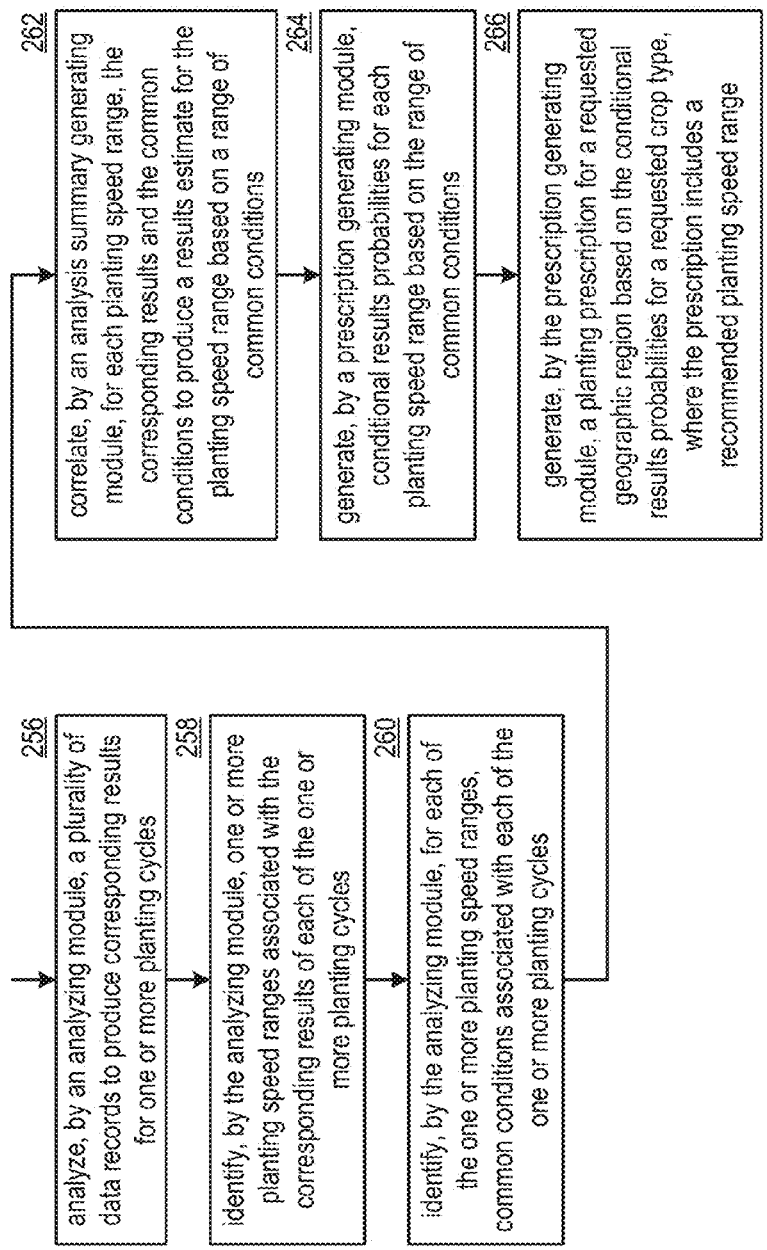
Figure 17A:
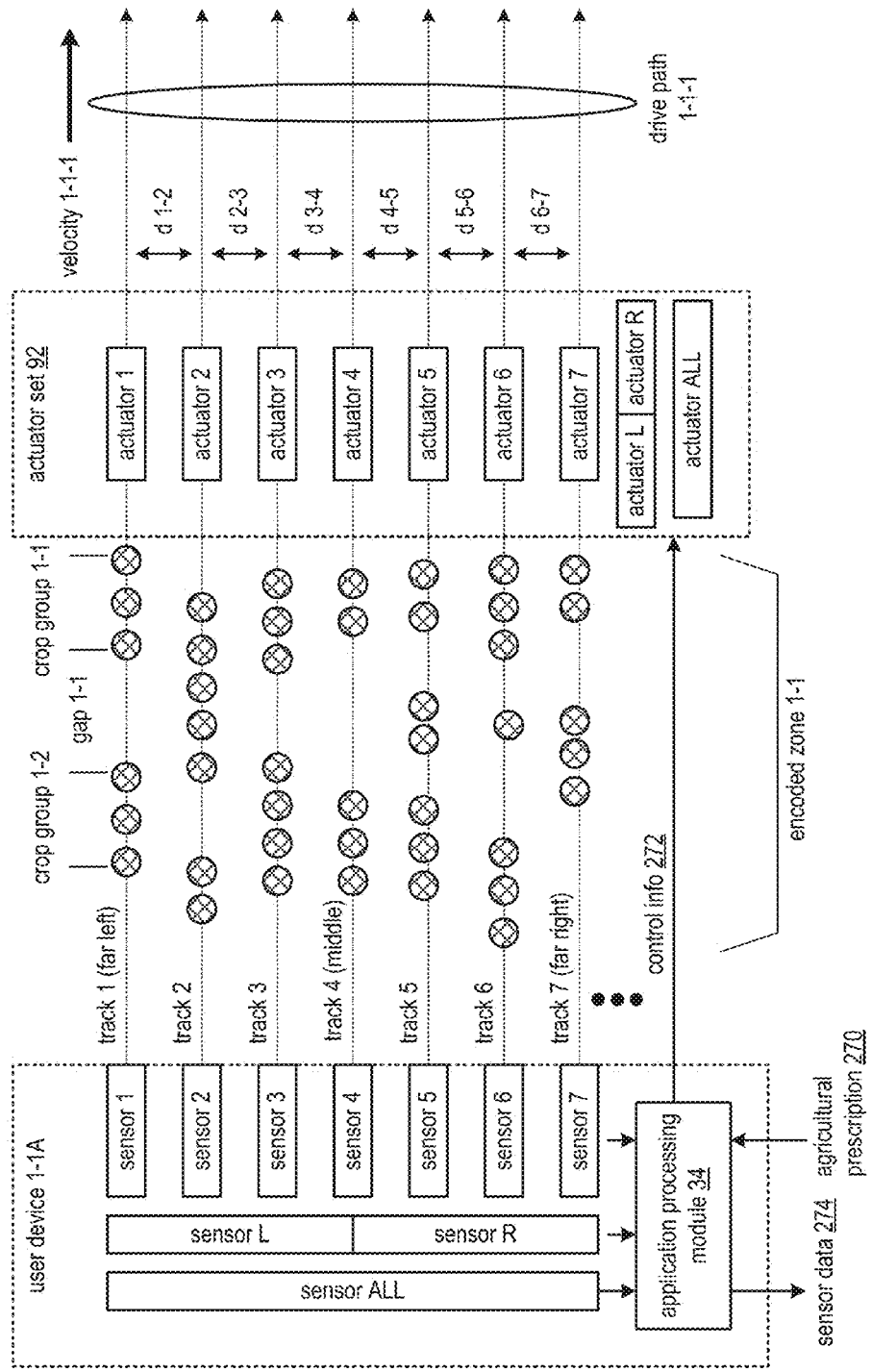
Figure 17B:
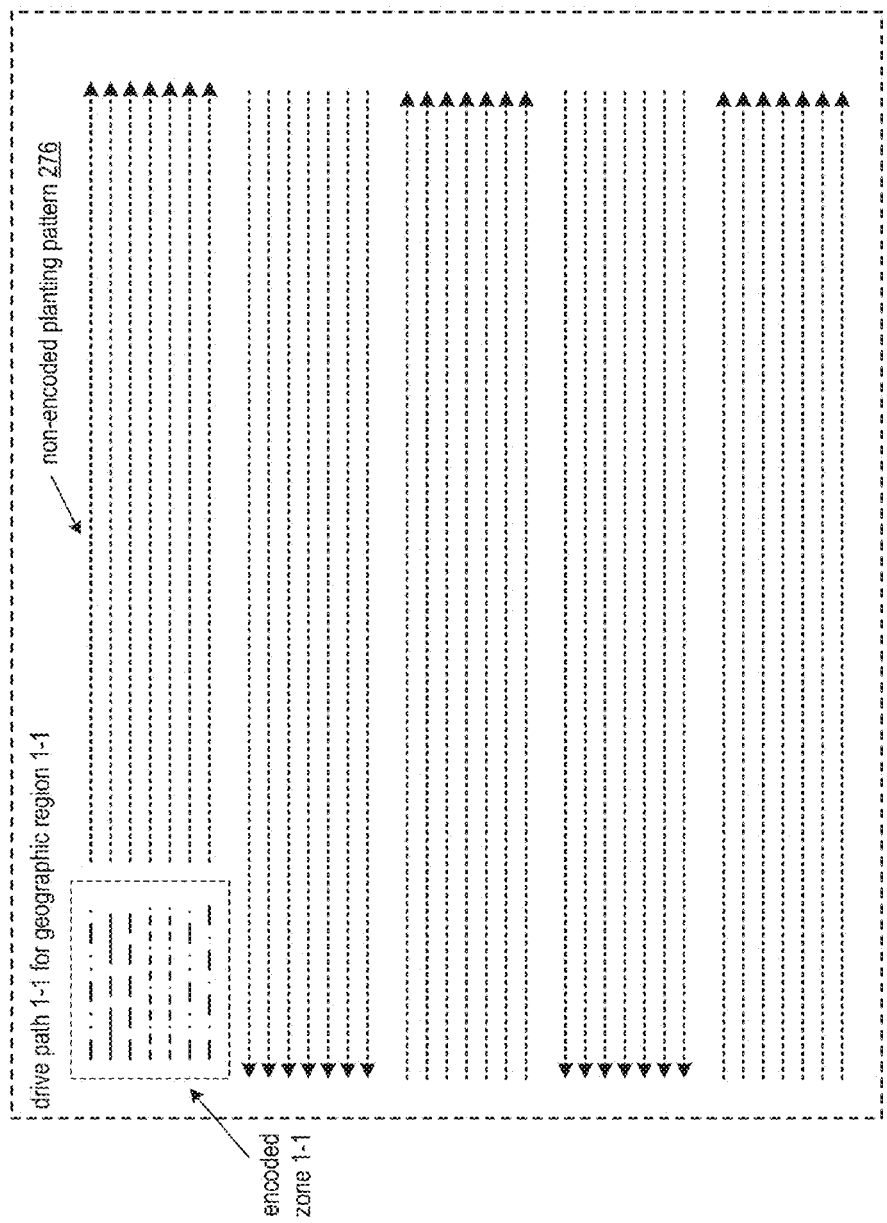
Figure 17C:
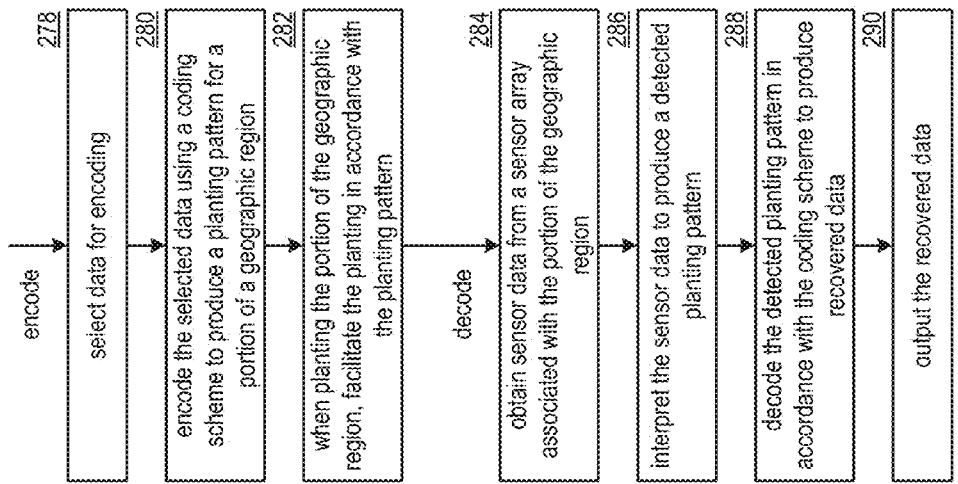
Figure 18A:
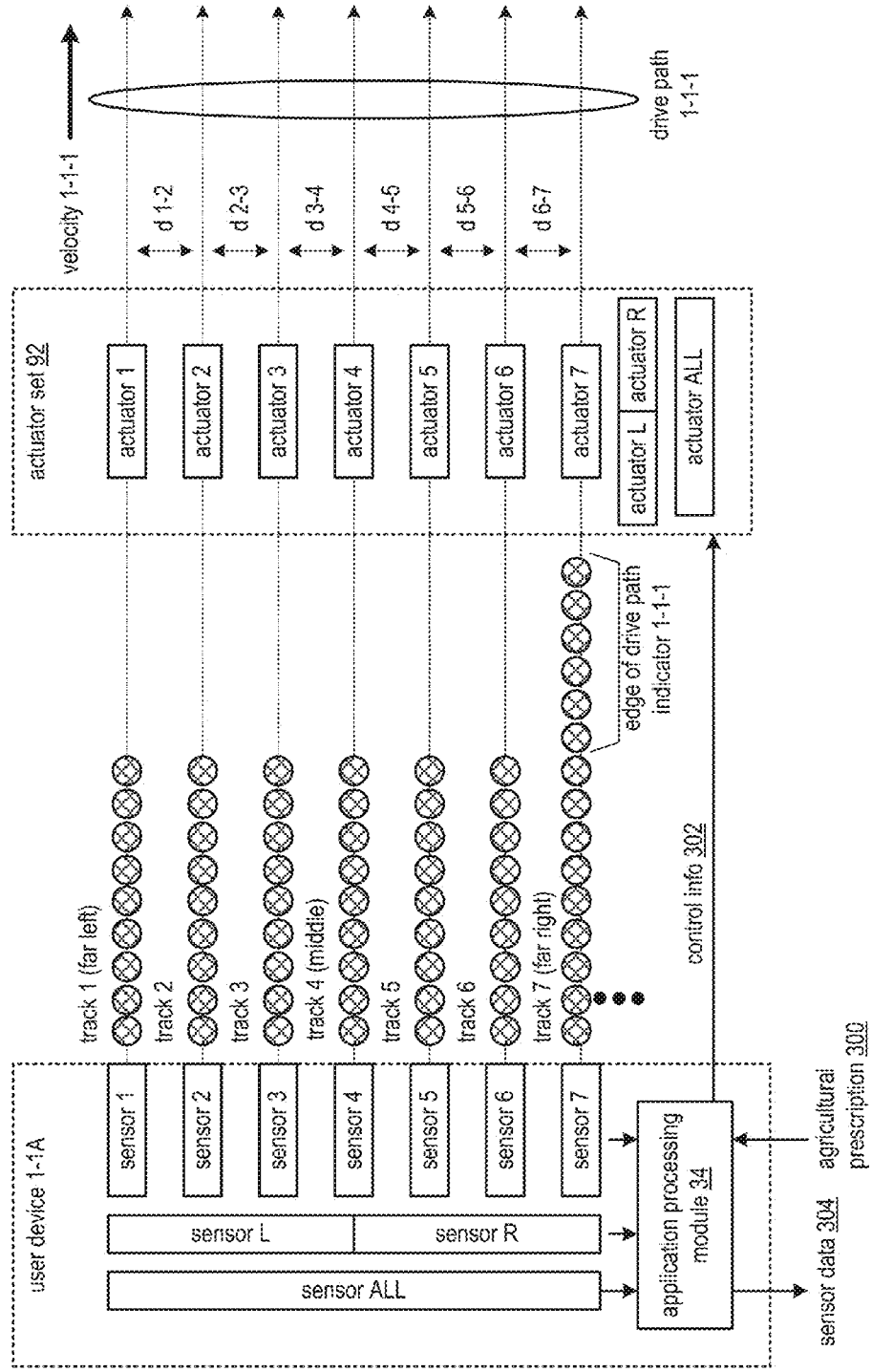
Figure 18B:
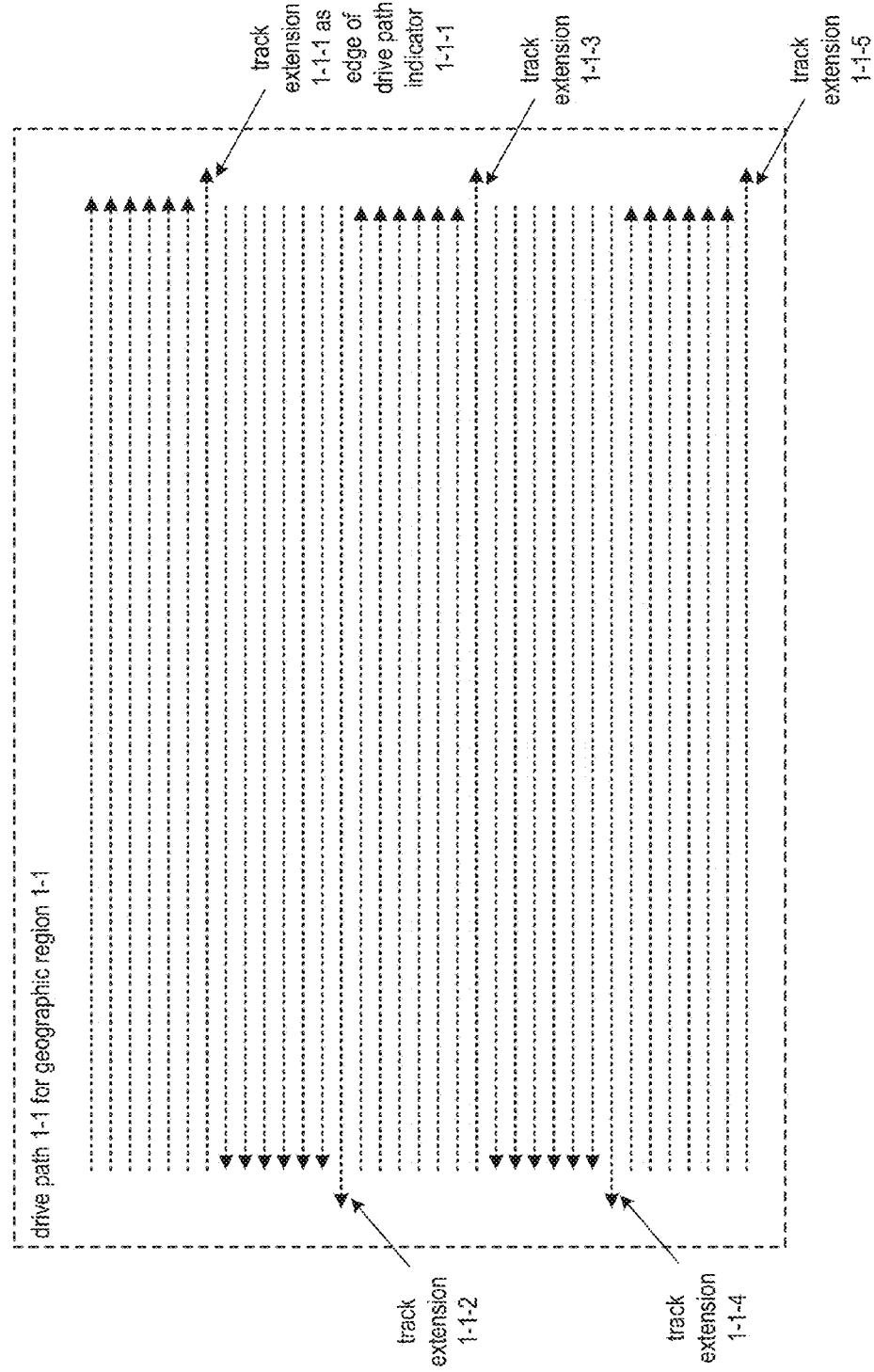
Figure 18C:
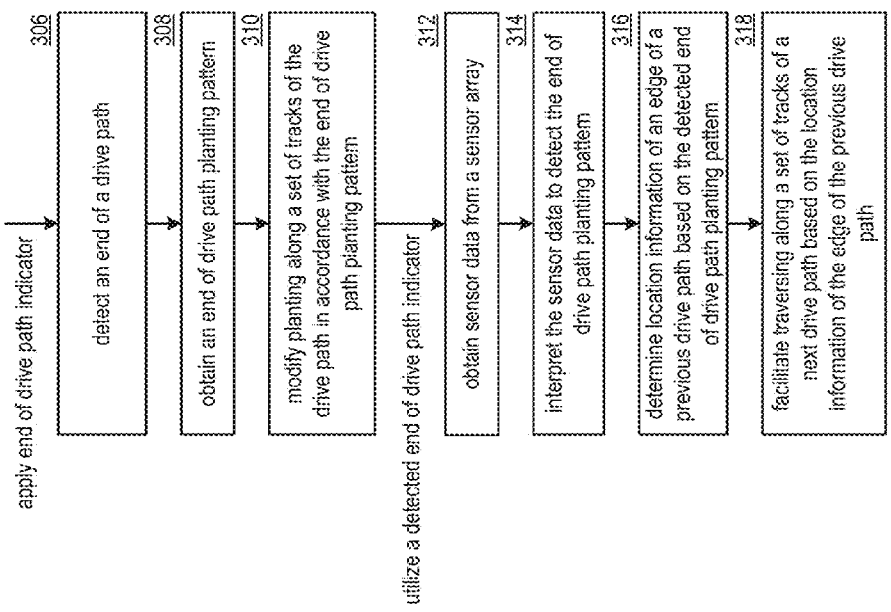

FIGS. 12F-G are diagrams illustrating examples of topographic maps for an associated geographic region in accordance with the present invention;

FIG. 12H is a flowchart illustrating an example of identifying topographic abnormalities in accordance with the present invention;

FIG. 13A is a schematic block diagram of an embodiment of an application processing module in accordance with the present invention;

FIG. 13B is a diagram illustrating an example of producing a super-region analysis in accordance with the present invention;

FIG. 13C is a diagram illustrating an example of producing a super-region analysis summary in accordance with the present invention;

FIG. 13D is a diagram illustrating an example of producing an agricultural prescription for a geographic region in accordance with the present invention;

FIG. 13E is a flowchart illustrating an example of generating an agricultural prescription in accordance with the present invention;

FIG. 14A is a schematic block diagram of another embodiment of an application processing module in accordance with the present invention;

FIG. 14B is a diagram illustrating an example of a drive path agricultural prescription in accordance with the present invention;

FIG. 14C is a flowchart illustrating another example of generating an agricultural prescription for a geographic region in accordance with the present invention;

FIG. 15A is a diagram illustrating another relationship between a user device and tracks along a drive path in accordance with the present invention;

FIG. 15B is a schematic block diagram of another embodiment of an application processing module in accordance with the present invention;

FIG. 15C is a flowchart illustrating an example of digitizing objects within a geographic region in accordance with the present invention;

FIG. 16A is a schematic block diagram of another embodiment of an application processing module in accordance with the present invention;

FIG. 16B is a diagram illustrating an example of a drive speed agricultural prescription in accordance with the present invention;

FIG. 16C is a flowchart illustrating an example of determining a drive speed for an agricultural prescription in accordance with the present invention;

FIG. 17A is a diagram illustrating another relationship between a user device, an actuator set, and tracks along a drive path in accordance with the present invention;

FIG. 17B is a diagram illustrating another embodiment of a drive path for an associated geographic region in accordance with the present invention;

FIG. 17C is a flowchart illustrating an example of coding data as a planting pattern in accordance with the present invention;

FIG. 18A is a diagram illustrating another relationship between a user device, an actuator set, and tracks along a drive path in accordance with the present invention;

FIG. 18B is a diagram illustrating another embodiment of a drive path for an associated geographic region in accordance with the present invention; and FIG. 18C is a flowchart illustrating an example of aligning tracks of a drive path in accordance with the present invention.

DETAILED DESCRIPTION OF THE INVENTION

FIG. 1 is a schematic block diagram of an embodiment of a distributed computing system 10 that includes at least one wireless location network 18, one or more wireless communication networks 1, 2, etc., a network 24, an application unit 16, a storage unit 36, a plurality of user devices 14, and a plurality of user devices associated with geographic regions 1-R (e.g., user devices 1-1A, 1-1C, 1-2A, 1-2C, etc., associated with geographic region 1, user devices 2-1A, 2-1B, 2-1C, 2-2A, 2-2C, etc., associated with geographic region 2). Hereafter, the user devices associated with the geographic regions and the user devices 14 may be referred to interchangeably as the user devices. The components of the computing system 10 are coupled via the network 24, which may include one or more of wireless and/or wireline communications systems, one or more private communications systems, a public internet system, one or more local area networks (LAN), and one or more wide area networks (WAN).

Each wireless communications network includes one or more of a public wireless communication system and a private wireless communication system and may operate in accordance with one or more wireless industry standards including universal mobile telecommunications system (UMTS), global system for mobile communications (GSM), long term evolution (LTE), wideband code division multiplexing (WCDMA), IEEE 802.11, IEEE 802.16. Each wireless communication network 1-R sends wireless communications signals 42 to the user devices and receives wireless communications signals 42 from the user devices to communicate data messages 44 and/or application messages 46. The user devices associated with the geographic regions may send and receive the wireless communications signals 42 directly between two or more user devices. Alternatively, or in addition to, the two user devices may communicate interface information 40 directly via a wireline interface between the two user devices. For instance, user device 2-1A communicates the interface information 40 with the user device 2-1B when the user device 2-1A and the user device 2-1B are operably coupled with the wireline interface.

The wireless location network 18 includes one or more of a public wireless location system (e.g., global positioning satellite (GPS), a cellular network) and a private wireless location system (e.g., wireless beacon, a wireless local area network (WLAN)). The wireless location network 18 sends wireless location signals 38 to at least some of the plurality of user devices to enable determination of location information.

The application unit 16 and storage unit 36 include a processing module (e.g., an application processing module) and memory to support execution of one or more applications (e.g., an agricultural lifecycle optimization application) and storage of information. Each user device may be a portable computing device (e.g., embedded farming equipment electronics, a farming equipment interface dongle, embedded vehicular electronics, a smart phone, a tablet computer, a laptop, a handheld computer, and/or any other portable device that includes a computing unit) and/or a fixed computing device (e.g., a desktop computer, a cable television set-top box, an application server, an internet television user interface and/or any other fixed device that includes a computing unit). Such a portable or fixed computing device includes one or more of a computing unit (e.g., providing processing module functionality), one or more wireless modems, sensors, and one or more user interfaces. The user device is discussed in greater detail with reference to FIG. 4.

Farming equipment includes any machinery, apparatus, and/or tool associated with agriculture. For example, the farming equipment may include one or more of a tractor, a seed planter, a fertilizer dispenser, a soil tiller, a combine, and a harvesting mechanism. As an example of user device implementation, user devices 1-1A, 1-2A, 2-1A, and 2-2A includes embedded farming equipment electronics associated with farm tractors. As another example, user devices 1-1C, 2-1C, 1-2C, and 2-2C include smart phones. As yet another specific example, user device 2-1B includes a tractor interface dongle.

The user device 14, the application unit 16, and the storage unit 36, may be implemented in a variety of ways. For example, a first user device includes a computing unit, which includes the application unit 16. As another example, a second user device includes another computing unit, which includes the storage unit 36. As yet another example, a third user device includes yet another computing unit that includes the application unit 16 and the storage unit 36. As a still further example, a still further computing unit includes the application unit 16 and the storage unit 36.

In general and with respect to optimization of the agricultural lifecycle, the computing system 10 supports at least five example functions: capturing data, analyzing data, producing an analysis summary, producing an agricultural prescription, and utilizing the agricultural prescription in the execution of the steps associated with the agricultural lifecycle. In accordance with these functions, agricultural prescriptions can be created that are relevant in relationship to likely planting lifecycles and may be utilized to enhance the effectiveness of the overall agricultural lifecycle.

The first example function includes the computing system 10 capturing data. In this example, the user device 1-1A receives wireless location signals 38 and determines location information (e.g., location coordinates, a timestamp, identification of geographic region 1) therefrom. Having produced the location information, the user device 1-1A captures data associated with one or more steps of the agricultural lifecycle within the geographic region 1 and generates wireless communication signals 42 based on one or more of the data and the location information. As a specific example, the user device 1-1A traverses at least a portion of the geographic region 1 and captures sensor data as the captured data when the embedded control electronics for the farm tractor includes the user device 1-1A. Alternatively, the user device 1-1A stores at least a portion of the captured data in a local memory. The wireless communication signals 42 from user device 1-1A are received by a user device 1-1C. The user device 1-1C extracts the data from the received wireless communication signals 42 from the user device 1-1A and subsequently generates wireless communication signals 42 for transmission to the wireless communication network 1, where the wireless communication signals 42 are based on the data.

The wireless communication network 1 receives the wireless communication signals 42 from the user device 1-1C and decodes the wireless communication signals 42 to reproduce the data. Having reproduced the data, the wireless communication network 1 sends a data message 44, via the network 24, to the storage unit 36, where the data message 44 includes the reproduced data. Alternatively, or in addition to, the user device 1-2A functions in a similar fashion as the user device 1-1A to capture further data within the geographic region 1, and to send, via a user device 1-2C, the wireless communication network 1, and the network, the further captured data to the storage unit 36. Having received one or more of the data message 44 from the user device 1-1A and another data message from the user device 1-2A, the storage unit 36 extracts the reproduced data from the data message 44 of the user device 1-1A and/or extracts the further captured data from the other data message 44 from the user device 1-2A to produce data from the geographic region 1.

Having obtained the data from geographic region 1, the storage unit 36 generates data records based on the data from geographic region 1. Having generated the data records, the storage unit 36 facilitates storage of the data records in at least one of a local memory associated with the storage unit, the application unit, one or more user devices, another storage unit, and in a storage system. As a specific example, the storage unit 36 stores the data records in the local memory of the storage unit and sends, via the network 24, an information message 48 to a user device 14 associated with the geographic region 1, where the information message 48 includes the data record.

In another example of operation of the capturing of the data, a user device 2-1A captures data associated with the geographic region 2 and sends interface information 40 to the user device 2-1B, where the interface information 40 includes the captured data associated with the geographic region 2 and location information associated with the user device 2-1A. Alternatively, or in addition to, the user device 2-1A stores at least a portion of the interface information 40 in a local memory of the user device 2-1A. The user device 2-1B sends, using the wireless communication signals 42, the captured data to the user device 2-1C. Alternatively, or in addition to, the user device 2-1B stores at least the portion of the interface information 40 in a local memory of the user device 2-1B. Alternatively, the user device 2-1B sends, using the wireless communication signals 42, the interface information 40 to the communication network 2. The user device 2-1C sends, using the wireless communication signals 42, the interface information 40 that includes the captured data to the wireless communication network 2 when the user device 2-1B sends the captured data to the user device 2-1C. The wireless communication network 2 sends the captured data, via the network 24, to the storage unit 36. Alternatively, the user device 2-1C sends, using the wireless communication signals 42, the captured data to the wireless communication network 1 where the wireless communication network 1 sends the captured data, via the network 24, to the storage unit 36. In a similar fashion, a user device 2-2A captures further data within the geographic region 2, and sends the captured further data, via one or more of the user device 2-2C, the wireless communication network 2, and the network 24, to the storage unit 36.

The storage unit 36 receives data and/or captured further data from one or more of the user devices 2-1A and 2-2A to produce data from the geographic region 2. Having obtained the data from geographic region 2, the storage unit 36 generates data records based on the data from geographic region 2 and facilitates storage of the data records from the geographic region 2 in at least one of the local memory associated with the storage unit, the application unit, the one or more user devices, another storage unit, and in the storage system. As a specific example, the storage unit 36 stores the data records associated with the geographic region 2 in the local memory of the storage unit and sends, via the network 24, another information message 48 to another user device 14 associated with the geographic region 2, where the other information message 48 includes the data record associated with the geographic region 2.

The second example function includes the computing system 10 analyzing the data. In an example of operation, the user device 14 associated with geographic region 1 issues an application message 46, via the network 24, to the application unit 16, where the application message 46 requests an analysis of the agricultural lifecycle for the geographic region 1. The application unit 16 obtains the information message 48 from the storage unit 36, where the information message 48 includes one or more of data records associated with the geographic region 1 and historical summaries associated with the geographic region 1. Such historical summaries include one or more of a result of a previous analysis, a summary of a previous analysis, and a summary of a previous agricultural prescription. Alternatively, or in addition to, the application unit 16 obtains another information message 48 from the storage unit 36, where the other information message 48 includes one or more data records associated with one or more other geographic regions. As a specific example, the application unit 16 obtains data records associated with geographic regions that are immediately proximally adjacent to the geographic region 1.

Having obtained the one or more of the data records and the historical summaries, the application unit 16 performs one or more analysis functions on the data records and/or the historical summaries to produce an analysis. The analysis functions includes one or more of a filtering function, correlation function, a comparing function, a transformation function, a mathematical function, a logical function, an identification function, a listing function, a searching function, an estimation function, a probability density generating function, a trend analysis function, and any other function that may be utilized in assisting in analyzing the data records and/or the historical summaries to provide insights to improving the effectiveness of the steps of the agricultural lifecycle. As a specific example, the application unit 16 compares corn crop yield rates for the geographic region 1 and the geographic region 2 for a similar set of conditions (e.g., soil type, weather) and for differing approaches to the steps of the agricultural lifecycle to produce the analysis. Alternatively, or in addition to, the application unit 16 facilitates storage of the analysis in the storage unit 36 (e.g., to facilitate subsequent retrieval as history summaries).

The third example function includes the computing system 10 producing the analysis summary. In an example of operation, having produced the analysis, the application unit 16 may obtain one or more further information messages 48 from the storage unit 36, where the one or more further information messages 48 includes one or more previous analysis summaries. Having obtained the further information messages 48, the application unit 16 summarizes the analysis to produce the analysis summary based on one or more of the analysis, the application message, and the previous analysis summaries. As a specific example, the application unit summarizes the analysis to produce a corn crop yield analysis summary for a previous year using a similar format in accordance with the previous analysis summaries, when the application message 46 from the user device 14 associated with the geographic region 1 requests a corn crop yield analysis for the previous year. Alternatively, or in addition to, the application unit 16 facilitates storage of the analysis summary in the storage unit 16 (e.g., to facilitate subsequent retrieval as history summaries).

The fourth example function includes the computing system 10 producing the agricultural prescription. In an example of operation, having produced the analysis summary, the application unit 16 may obtain still further information messages 48 from the storage unit 36, where the still further information messages 48 includes one or more previous agricultural prescriptions. Having obtained the further information messages 48, the application unit 16 generates the agricultural prescription based on one or more of the analysis summary, the application message 46, and the previous agricultural prescriptions. The generating may include further analysis. As a specific example, the application unit 16 analyzes a previous agricultural prescription for the previous year, and the summary analysis for the previous year indicating results of utilizing the previous agricultural prescription, to produce a corn crop optimization prescription for a current year. For instance, the corn crop optimization prescription indicates which hybrid corn type to plant, when to plant, how to plant (e.g., including a density level of planting seeds), and a recommended procedure for harvesting. Having produced the agricultural prescription, the application unit 16 may send, via the network 24, yet another application message 46 to the user device 14 associated with the geographic region 1, where the yet another application message 46 includes the agricultural prescription. Alternatively, or in addition to, the application unit 16 facilitates storage of the agricultural prescription in the storage unit 36 (e.g., to facilitate subsequent retrieval as history summaries).

The fifth example function includes the computing system 10 utilizing the agricultural prescription. In an example of operation, the application unit 16 generates another data message 44, where the other data message 44 includes the agricultural prescription. The agricultural prescription may be represented in a variety of formats including one or more of hypertext markup language, text, graphics, typographic maps, and a machine-readable format to facilitate some level of automation. For instance, the agricultural prescription includes the recommended steps of the agricultural lifecycle in a machine-readable format that is compatible with a particular set of farming machinery including one or more of farm tractors, soil maintenance machinery, fertilizer application machinery, planting machinery (e.g., a planter), and crop harvesting machinery (e.g., a combine). Having generated the other data message 44, the application unit 16 sends, via the network 24 and the wireless communication network 1 (e.g., using the wireless communication signals), the other data message 44 to the user device 1-1C. Having received the other data message 44, the user device 1-1C distributes the agricultural prescription to one or more of a user interface associated with the user device 1-1C (e.g., to display to an operator of farm machinery) and to user device 1-1A. Having received the agricultural prescription, the user device 1-1A extracts control information from the agricultural prescription. Having obtained the control information, the user device 1-1A outputs the control information to an actuator set associated with one or more varieties of farming machinery to facilitate the automation of the one or more steps of the agricultural lifecycle. The outputting of the control information to the actuator set is discussed in greater detail with reference to FIG. 11.

FIG. 2 is a diagram illustrating an embodiment of a plurality of geographic regions, where one or more of the geographic regions include the geographic regions 1-R of FIG. 1. The plurality of geographic regions may include any number of geographic regions spanning relatively small areas (e.g., a few acres per region), relatively large areas (e.g., tens of thousands of acres or more per region), or any size in between. Two or more geographic regions may be associated with common characteristics. For example, each geographic region may include a common geographic region size or a unique geographic region size. Two or more geographic regions may overlap such that a common portion is included in each of the two or more geographic regions. Each geographic region may include two or more sub-geographic regions.

Each geographic region may be associated with region characteristics. The region characteristics include one or more of a natural water supply level, a man-made irrigation water supply level, an average number of sun-days, an average sun intensity level, a soil type, a soil nutrient level, a previous utilization history, a crop yield rate, an insect affect level, an average altitude level, and average temperature level, and any other metric associated with characteristics that may affect the efficiency of the agricultural lifecycle. Two or more regions may share common and/or similar region characteristics. For example, adjacent geographic regions have a higher probability of sharing more common region characteristics than non-adjacent geographic regions. As another example, a series of geographic regions that include a common waterway (e.g., a lake, a river) may share more common region characteristics.

Each geographic region may be associated with varying groups of user devices utilized in the primary steps of the computing system 10 of FIG. 1. For example, a common first user device is associated with operation within geographic regions 1 and 2. As another example, a unique second user device is associated with operation within geographic region 2 and a unique third user device is associated with operation within geographic region 3.

Figure 3:
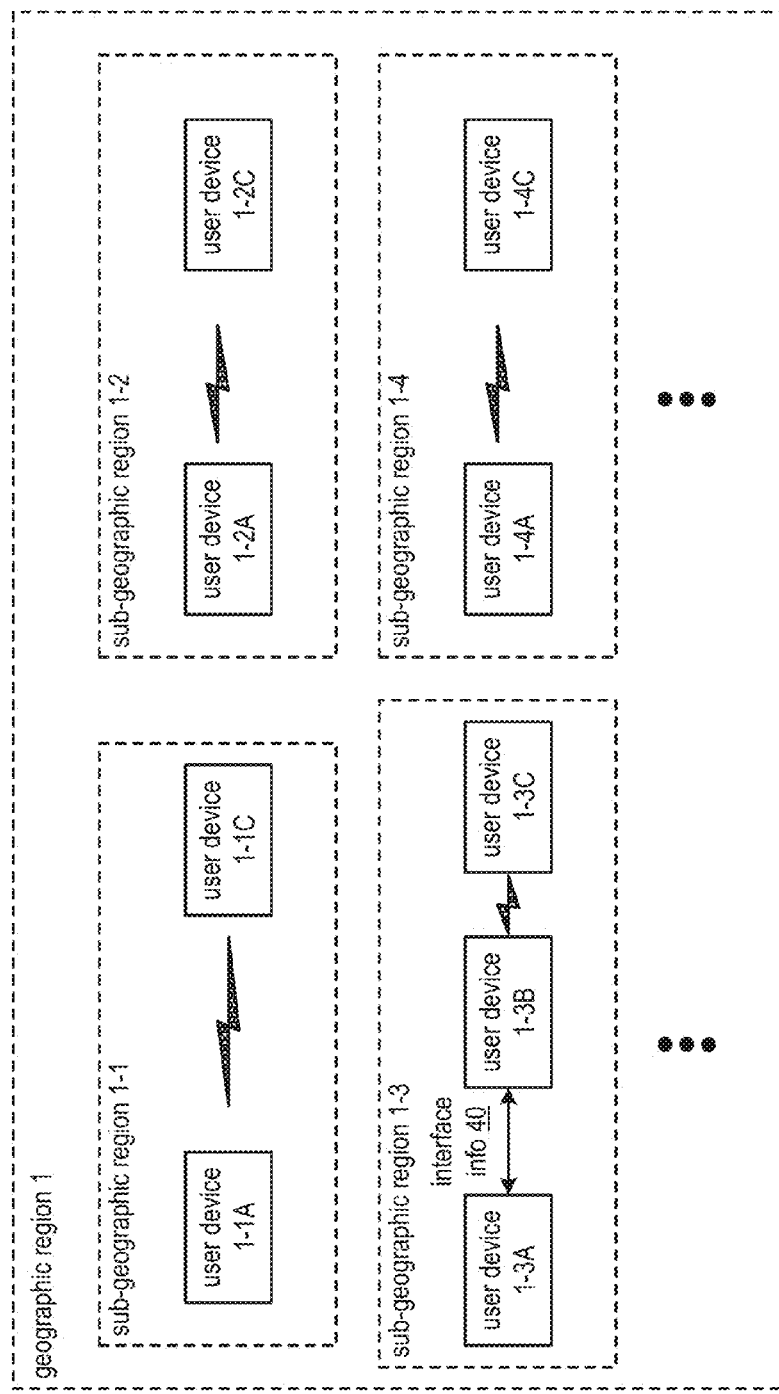
FIG. 3 is a diagram illustrating an embodiment of a plurality of sub-geographic regions in accordance with the present invention.

FIG. 3 is a diagram illustrating an embodiment of a geographic region divided into any number of sub-geographic regions. Hereafter, a sub-geographic region may be referred to interchangeably as a geographic sub-region. For example, geographic region 1 includes geographic sub-regions 1-1, 1-2, 1-3, 1-4, etc.

Each geographic sub-region may include any number of user devices that operate within the sub-region. For example, the geographic sub-region 1-1 includes a user device 1-1A and a user device 1-1C; the geographic sub-region 1-2 includes a user device 1-2A and a user device 1-2C; the geographic sub-region 1-3 includes a user device 1-3A, a user device 1-3B operably coupled with the user device 1-3A to exchange interface information 40, and a user device 1-3C; and the geographic sub-region 1-4 includes a user device 1-4A and a user device 1-4C. As another example, each geographic sub-region may include a common group of user devices such that the common group of user devices traverses each geographic sub-region of the geographic region.

Figure 4:
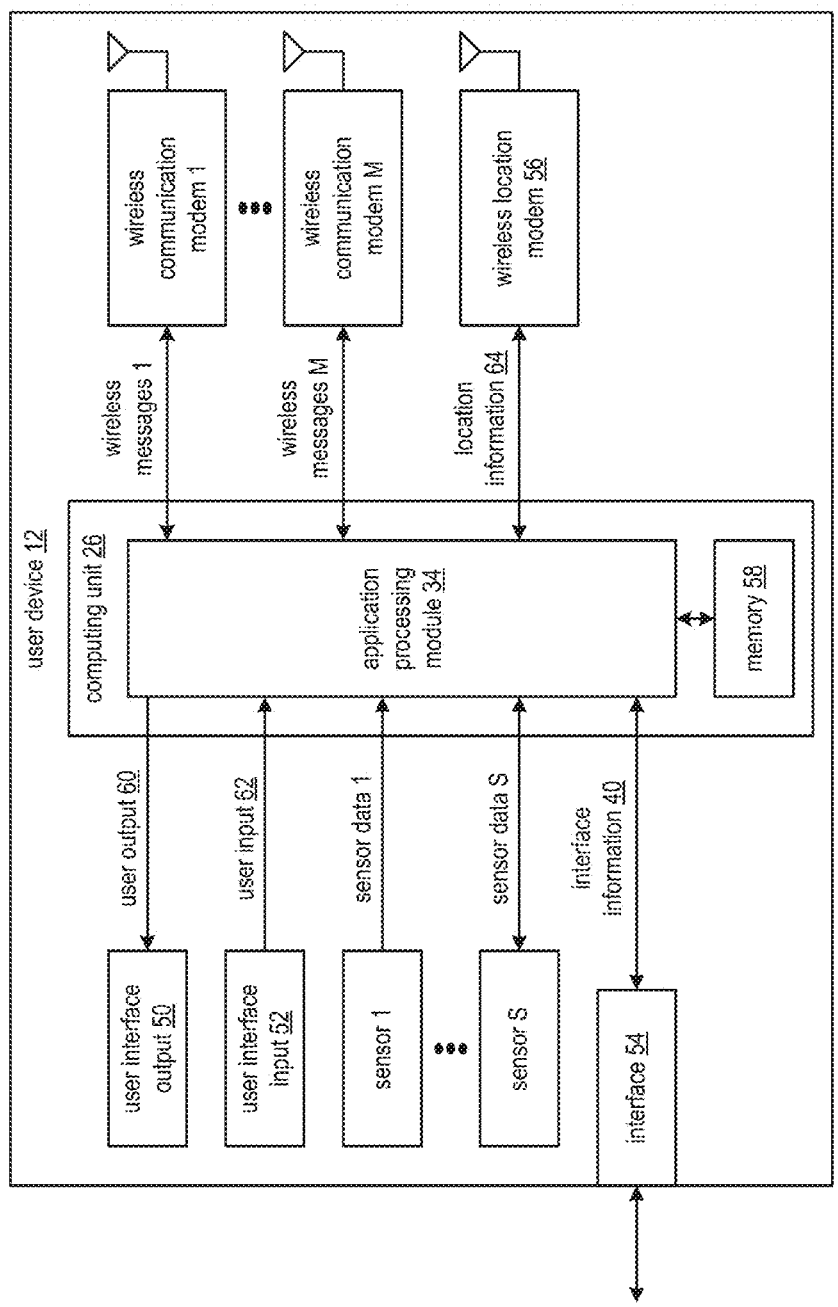
FIG. 4 is a schematic block diagram of an embodiment of a user device in accordance with the present invention.

FIG. 4 is a schematic block diagram of an embodiment of a user device (e.g., 12, 14 or any other user device). The user device includes a user interface output 50, a user interface input 52, one or more sensors 1-S, an interface 54, a computing unit 26, one or more wireless communications modems 1-M, and at least one wireless location modem 56. The user interface output 50 may include a single interface output device or a plurality of interface output devices to present user output 60. The interface output device may include one or more of a display, a touch screen, a speaker, an earpiece, a motor, an indicator light, a light emitting diode (LED), a transducer, and a digital indicator. For instance, the interface output device includes a color touch screen display capable of rendering static images and/or full-motion video.

The user interface input 52 may include a single interface input device or a plurality of interface input devices to capture user input 62. The interface input device includes one or more of a touch screen sensor array, a keyboard, a microphone, a fingerprint reader, a trackball, a mouse sensor, an image sensor, a pushbutton, and a selector switch. For instance, the interface input device includes a touch screen sensor array associated with the color touch screen display.

Each sensor includes capabilities for sensing one or more of a magnetic field (e.g., a compass), motion (e.g., an accelerometer), temperature, pressure, altitude, humidity, moisture, an image, visible light, infrared light, an electromagnetic field, ultrasonic sound, weight, density, a chemical type, fluid flow volume, execution of a step of the agricultural lifecycle, a stream of images (e.g., capture video), biometrics, proximity, capacitance, gases, radiation, pathogens, light levels, bio hazards, DNA, wind speed, wind direction, and characteristics of an object to support object detection and/or object identification. The sensors 1-S output sensor data 1-S to the computing unit 26. For example, a first sensor outputs sensor data 1 that includes a video stream when the first sensor includes an image capture device. As another example, a second sensor outputs sensor data 2 that includes a moisture level indicator when the second sensor includes a moisture detector. As yet another example, a third sensor outputs sensor data 3 that includes tractor pitch, tractor yaw, tractor roll, tractor velocity, tractor acceleration, tractor position, tractor inclination, tractor tilt, tractor orientation tractor impact (e.g., shock) when the third sensor includes the accelerometer and the embedded control electronics of a farming tractor includes the user device.

The interface 54 provides an external wireline interface to the computing unit such that interface information 40 may be communicated with one or more other devices operably coupled to the interface 54. Each device includes one or more other user devices. For example, another user device is associated with embedded control electronics of a farming planting mechanism. As another example, the other user device is associated with embedded control electronics of a farming fertilizing mechanism. As yet another example, the other user device is associated with embedded control electronics of a farming harvesting mechanism. As a still further example, the other user device is associated with the embedded control electronics of the farming tractor.

The interface 54 may operate in accordance with one or more industry interface protocol standards such as on-board diagnostics (OBD), controller area network (CAN), or any other industry interface protocol standard. For instance, the interface operably couples to a CAN interface of a farming tractor such that the interface information 40 may be exchanged between the computing unit 26 and the embedded control electronics of the farming tractor. The interface information 40 includes one or more of further sensor data, an agricultural prescription, and control information (e.g., one or more steps of an agricultural lifecycle). As a specific example, the interface 54 couples the computing unit 26 to the farming fertilizing mechanism such that the computing unit 26 receives sensor data from a sensor array associated with the farming fertilizing mechanism that monitors fertilization steps of the agricultural lifecycle.

Each wireless communication modem 1-M may include a single wireless transceiver or a plurality of wireless transceivers. Alternatively, or in addition to, each communication modem may include one or more wireless transmitters. The wireless transceiver and/or transmitter encodes wireless messages to produce wireless communication signals and the wireless transceiver further receives other wireless communication signals for decoding into corresponding wireless messages. The wireless transceiver and/or transmitter may operate in accordance with one or more wireless industry standards including universal mobile telecommunications system (UMTS), global system for mobile communications (GSM), long term evolution (LTE), wideband code division multiplexing (WCDMA), IEEE 802.11, IEEE 802.16, and Bluetooth. For example, the wireless communication modem 1 encodes the wireless messages 1 for transmission as Bluetooth wireless communication signals to a local user device and the wireless communication modem 2 encodes the wireless messages 2 for transmission as LTE wireless communication signals to a wireless communication network.

The wireless location modem 56 may include one or more of a single wireless location receiver, a single wireless location transceiver, a plurality of wireless location receivers, and a plurality of wireless location transceivers. The wireless location receiver and wireless location transceiver may operate in accordance with one or more wireless location technologies including GPS, WiFi, angle of arrival, time difference of arrival, signal strength, and beaconing to produce location information 64.

The computing unit 26 includes an application processing module 34, a memory 58, and one or more internal interfaces to one or more of the user interface output 50, the user interface input 52, the sensors 1-S, the interface 54, the wireless communication modems 1-M, and the wireless location modem 56. The memory 58 provides a non-transitory computer readable storage medium that stores operational instructions that are executed by the processing module 34.

The memory 58 may include a single memory device or a plurality of memory devices. Each memory device is associated with a memory type including one or more of a read-only memory, random access memory, volatile memory, non-volatile memory, cache memory, and/or any device that stores digital information. Each memory device may be implemented utilizing one or more technologies including static random access memory (SRAM), dynamic random access memory (DRAM), NAND flash memory, magnetic memory (e.g., a hard disk), and optical memory (e.g., an optical disc) that stores digital information. The memory device may be removable (e.g., a universal serial bus flash drive) to facilitate transfer of data between the computing unit 26 and other entities that may operably coupled with the removable memory device.

Figure 5:
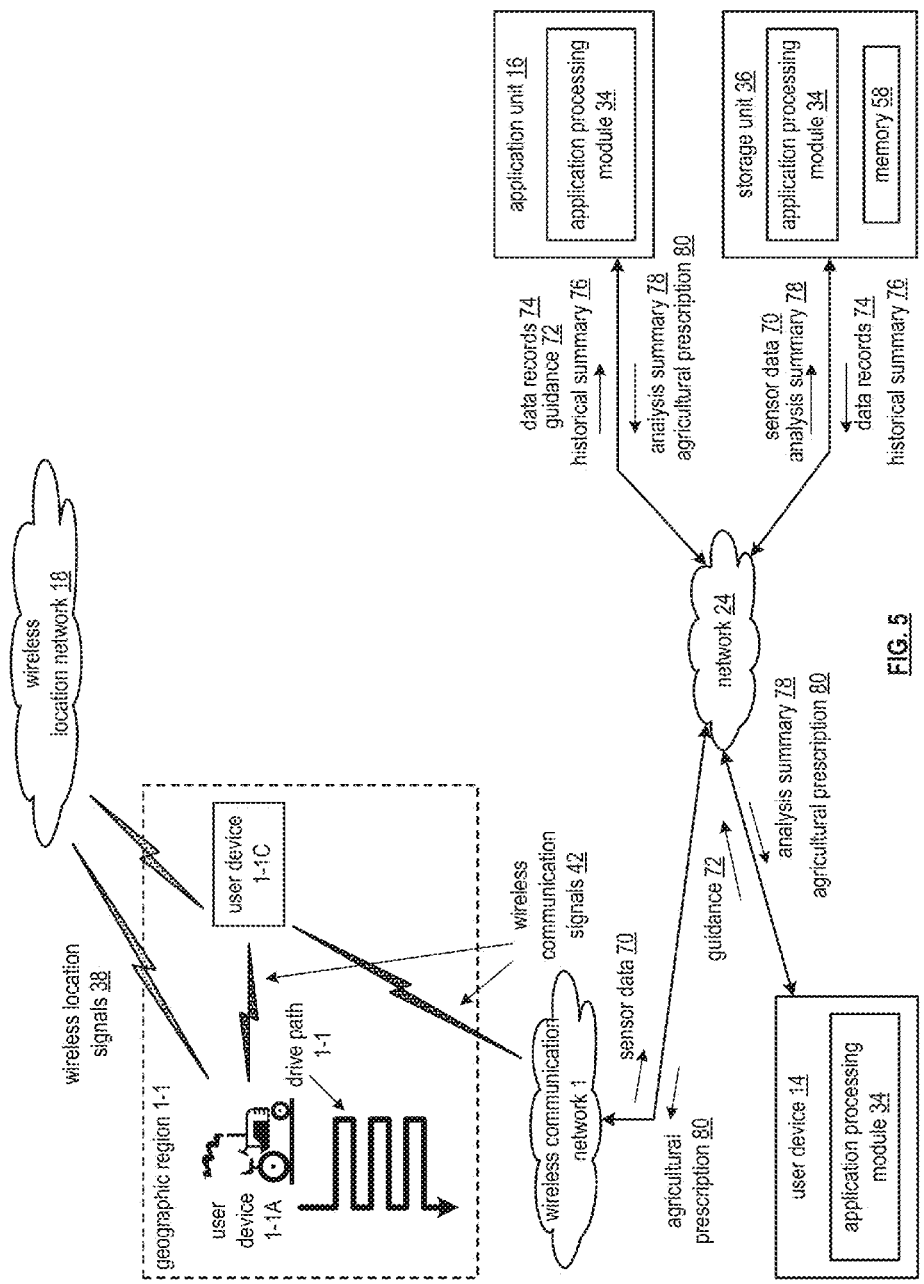
FIG. 5 is a schematic block diagram of another embodiment of a computing system in accordance with the present invention.

FIG. 5 is a schematic block diagram of another embodiment of a computing system that includes the wireless location network 18, the wireless communication network 1, the network 24, the application unit 16, the storage unit 36, and the user device 14 that is associated with geographic region 1-1. Within the geographic region 1-1 are the user device 1-1A (e.g., embedded control electronics of a farming tractor) and the user device 1-1C (e.g., a smart phone utilized by an operator of the farming tractor).

In an example of operation of performing one of the five example functions, the user device 1-1A determines location information based on receiving wireless location signals 38 from the wireless location network 18 and captures sensor data (e.g., farming tractor accelerometer data, soil moisture levels, soil chemical content, etc.) along a drive path 1-1 for at least a portion of the geographic region 1-1. The drive path 1-1 includes a geographic path of the user device 1-1A when the user device 1-1A operates within the geographic region 1. The drive path may include two or more sub-drive paths. For example, a first sub-drive path traverses the geographic region 1-1 from west to east and a second sub-drive path traverses the geographic region 1-1 from east to west. The user device 1-1A may monitor the drive path (e.g., passively monitoring along a path taken by the farming tractor) or may provide the drive path (e.g., where an agricultural prescription includes control information to invoke operation of the farming tractor along the drive path). The drive path 1-1 may be obtained by the user device 1-1A in a variety of ways including one or more of determining a specific drive path in accordance with the agricultural prescription 80, utilizing a predetermined drive path (e.g., the drive path for geographic region 1-1 from a list), generating a random drive path, utilizing a previous drive path associated with geographic region 1-1 (e.g., obtaining a historical summary), and receiving the agricultural prescription 80 that includes control information associated with the drive path. As a specific example, the user device 1-1A utilizes the drive path 1-1 from the agricultural prescription 80 while an associated farming tractor and tilling machinery is tilling the soil of at least a portion of the geographic region 1-1.

Having captured the sensor data, the user device 1-1A sends, using, for example, Bluetooth wireless communication signals, the captured sensor data to the user device 1-1C. The user device 1-1C sends, utilizing, for example, long-term evolution (LTE) wireless communication signals, the captured sensor data 70 via the wireless communication network 1 and the network 24 to the storage unit 36. The application processing module 34 of the storage unit 36 processes the captured sensor data 70 to produce data records 74 for storage in the memory of the storage unit 36. Alternatively, a removable memory of the user device 1-1A is utilized to temporarily store the captured sensor data 70.

The removable memory is operably coupled to the storage unit 36 to facilitate transfer of the captured sensor data 70 to the application processing module 34 of the storage unit 36. For example, the removable memory device is directly interfaced to the storage unit 36. As another example, the removal memory device is interfaced to the user device 14 associated with the geographic region 1-1 and the user device 14 facilitates sending, via the network 24, the captured sensor data 70 to the storage unit 36.

The application processing module 34 of the user device 14 associated with the geographic region 1-1 receives a user input to invoke a request for an analysis and generation of an agriculture prescription 80. The application processing module 34 of the user device 14 generates guidance 72 based on the request and other desired characteristics (e.g., a crop list, a time frame, equipment availability, chemical availability, and soil management operational ranges available) of the agriculture prescription 80 for the geographic region 1-1. The user device 14 sends, via the network 24, the guidance 72 to the application unit 16. The application processing module 34 of the application unit 16 obtains the data records 74 for the geographic region 1-1 from the storage unit 36 based on the guidance 72. The application processing module 34 of the application unit 16 may further obtain historical summaries 76 with regards to the geographic region 1-1 based on the guidance 72.

Having obtained the guidance 72, the data records 74, and/or the historical summaries 76, the application processing module 34 of the application unit 16 produces an analysis based on the data records 74 and/or the historical summaries 76. The application processing module 34 of the application unit 16 processes the analysis in accordance with the guidance 72 and/or the historical summaries 76 to produce an analysis summary 78. The application processing module 34 of the application unit 16 facilitates storage of the analysis summary 78 by the storage unit 36 to enable subsequent recovery of the historical summaries 76 that includes the analysis summary 78.

Having produced the analysis summary 78, the application processing module 34 of the application unit 16 processes the analysis summary 78 in accordance with the guidance 72 and the historical summaries 76 to produce the agricultural prescription 80. The agricultural prescription 80 may further include a plurality of steps, where each step includes one or more actions, and for each action, one or more required preconditions to execute the action. Such steps may be executed in parallel, in series, and in a combination in accordance with the preconditions for execution.

The preconditions for execution of the action includes required conditions to enable execution of the action (e.g., when to execute the action) including one or more of a current date match, a current date within a date range, a time within a time range, a current data sensor value within a desired range (i.e., a current temperature within a temperature range), an actuator readiness state, distance from a previously executed step (i.e., seed dispensing population of seeds per acre), and elapsed time since a previously executed step). For example, a precondition for planting a short growing seed at a later date has occurred within a growing season.

Each action includes what to do and how to do it (e.g., when to do it is a precondition). As such, each action includes one or more of dispensing particular one or more materials (i.e. a gas, a liquid, a slurry, a solid), how to dispense the material (i.e., distance between dispensing points, distance between parallel dispensing tracks), collect sensor data, and manipulate another object (i.e. management practices including one or more of: tilling, irrigation control, sunlight control), activate a variant of an electromagnet field). The liquids include chemical compounds such as fertilizers and pesticides. The pesticides include one or more of insecticides (e.g., insect killers), herbicides (e.g., weed killers), and fungicides (e.g., to kill or inhibit fungi). The solids include one or more of seed, fertilizer powder, and manure. The seeds include a plurality of hybrid seed types and may vary from growing season to growing season.

Having produced the agricultural prescription 80, the application processing module 34 of the application unit 16 sends, via the network 24, one or more of the analysis summary 78 and the agricultural prescription 80 to the user device 14. The application processing module 34 of the application unit 16 may further send the agricultural prescription 80, via the network 24 and the wireless communication network 1, to the user device 1-1C for utilization in performing of one or more steps of the agricultural lifecycle in accordance with the agricultural prescription 80. For example, the user device 1-1C displays a portion of the agricultural prescription 80 and sends control information of the agricultural prescription, via wireless signals 42, to the user device 1-1A to automate a portion of the execution of at least some of the steps of the agricultural lifecycle. For the example, the user device 1-1A issues control information to a set of actuators to dispense fertilizer in accordance with the agricultural prescription 80. For instance, to control dispensing a specified volume of liquid fertilizer in a specified date range in a specified geometric pattern for at least a portion of the geographic region 1-1 as the user device 1-1A versus the drive path 1-1.

Figure 6:
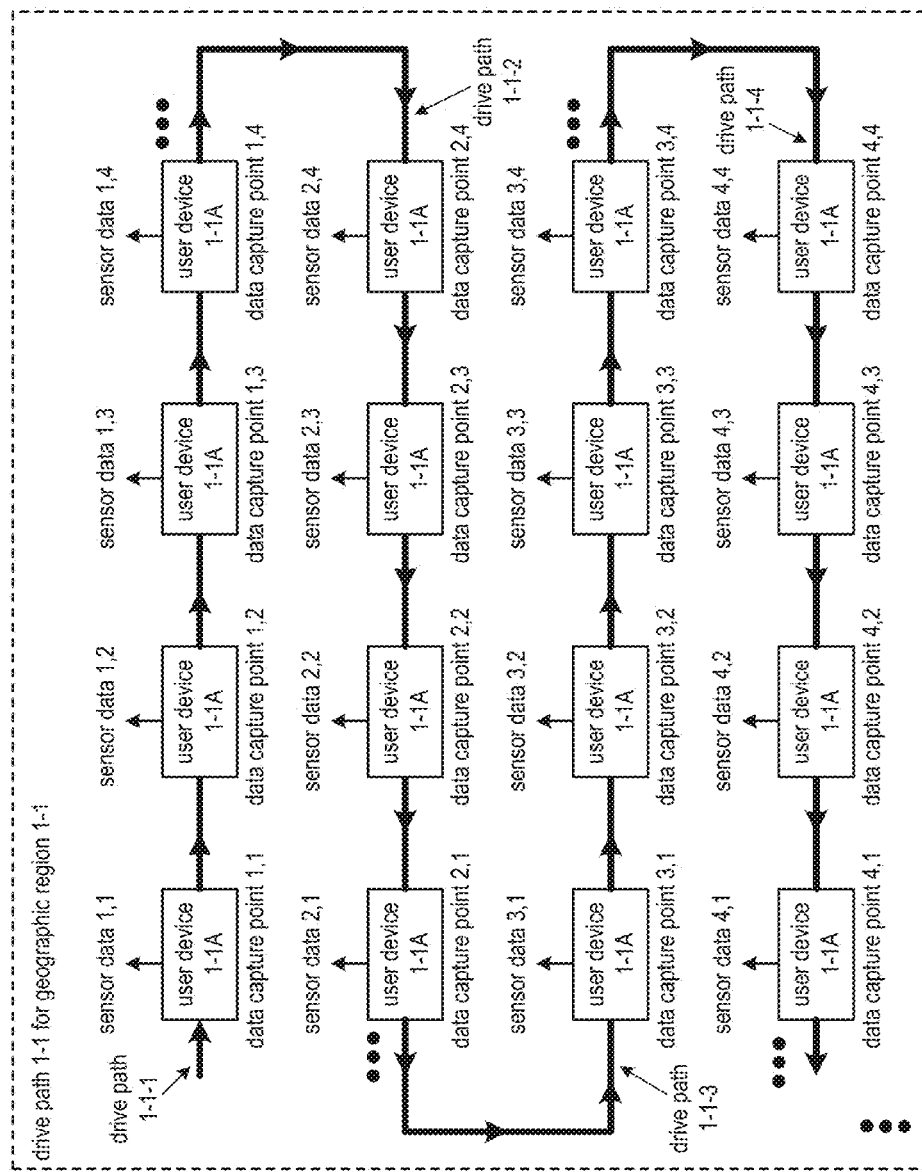
FIG. 6 is a diagram illustrating an embodiment of a drive path for an associated geographic region in accordance with the present invention.

FIG. 6 is a diagram illustrating an embodiment of a drive path 1-1 for an associated geographic region 1-1. In an example of operation, the user device 1-1A of FIG. 1 traverses the drive path 1-1 when executing steps of an agricultural lifecycle. The traversing of the drive path 1-1 may be in accordance with an agricultural prescription. The drive path 1-1 includes a plurality of corresponding drive paths 1-1-1, 1-1-2, 1-1-3, 1-1-4, etc. Each corresponding drive path may be associated with a portion of the overall drive path such that the corresponding drive path is associated with favorable attributes. Such favorable attributes includes one or more of minimizing waste by including fewer turnaround sections or deleting sections that link one corresponding drive path to another, minimizing fuel usage, minimizing soil erosion, maximizing crop yield, and maximizing overall efficiency of executing one or more steps of an agricultural lifecycle. For example, drive path 1-1-1 extends from a western edge of the geographic region 1-1 to an eastern edge of the geographic region 1-1 such that a farming tractor traversing the drive path 1-1-1 minimizes an amount of time to cover acreage associated with drive path 1-1-1 (e.g., driving in a substantially straight line).

The user device 1-1A includes an array of sensors that are utilized along the drive path 1-1 to capture sensor data in accordance with a data capture scheme. The agricultural prescription may include the data capture scheme. The data capture scheme includes one or more of where to capture sensor data (e.g., coordinates, distance between capturing), when to capture sensor data (e.g., how often, precondition trigger), which sensors to capture sensor data from (e.g., selecting particular sensors based on a step of an agricultural lifecycle), and how to capture the sensor data (e.g., instantaneous sample, average sample, another mathematical distribution applied to sample data).

The user device 1-1A may utilize the array of sensors to capture the sensor data for as many as each pass along the drive path 1-1 when operating within the geographic region 1-1 to execute at least some of the steps of the agricultural lifecycle. For example, the user device 1-1A captures sensor data while one or more of the following steps of the agricultural lifecycle are executed: initiating a planting cycle by tilling soil, applying fertilizer, applying pesticide, planting a primary crop, simultaneously applying fertilizer while planting the primary crop, planting a cover crop (e.g., utilized to minimize soil erosion and enhance soil nutrients), managing irrigation, harvesting according to a time schedule, harvesting based on detecting a crop condition trigger (e.g., crop moisture content), tilling the soil after harvesting, and applying fertilizer after harvesting.

The capturing of the sensor data may be unique for each of the corresponding drive paths. For example, the data capture scheme indicates to capture the sensor data from all sensors along the drive path 1-1-1 every one tenth of an inch to produce data capture points 1,1, 1,2, 1,3, 1,4, etc. When capturing the sensor data at periodic distance intervals, one of the data sensors may be utilized to measure the distance between data capture points to trigger capture of a next set of sensor data at a next data capture point. As another example, the data capture scheme indicates to capture the sensor data from sensors 1, 3, 5, and 7 along the drive path 1-1-2 every two seconds. As yet another example, the data capture scheme indicates to capture the sensor data from sensors 2 and 4 along the drive path 1-1 when sensor data from sensor 1 is interpreted to detect that a particular chemical density level is less than a low chemical density threshold level.

Figure 7:
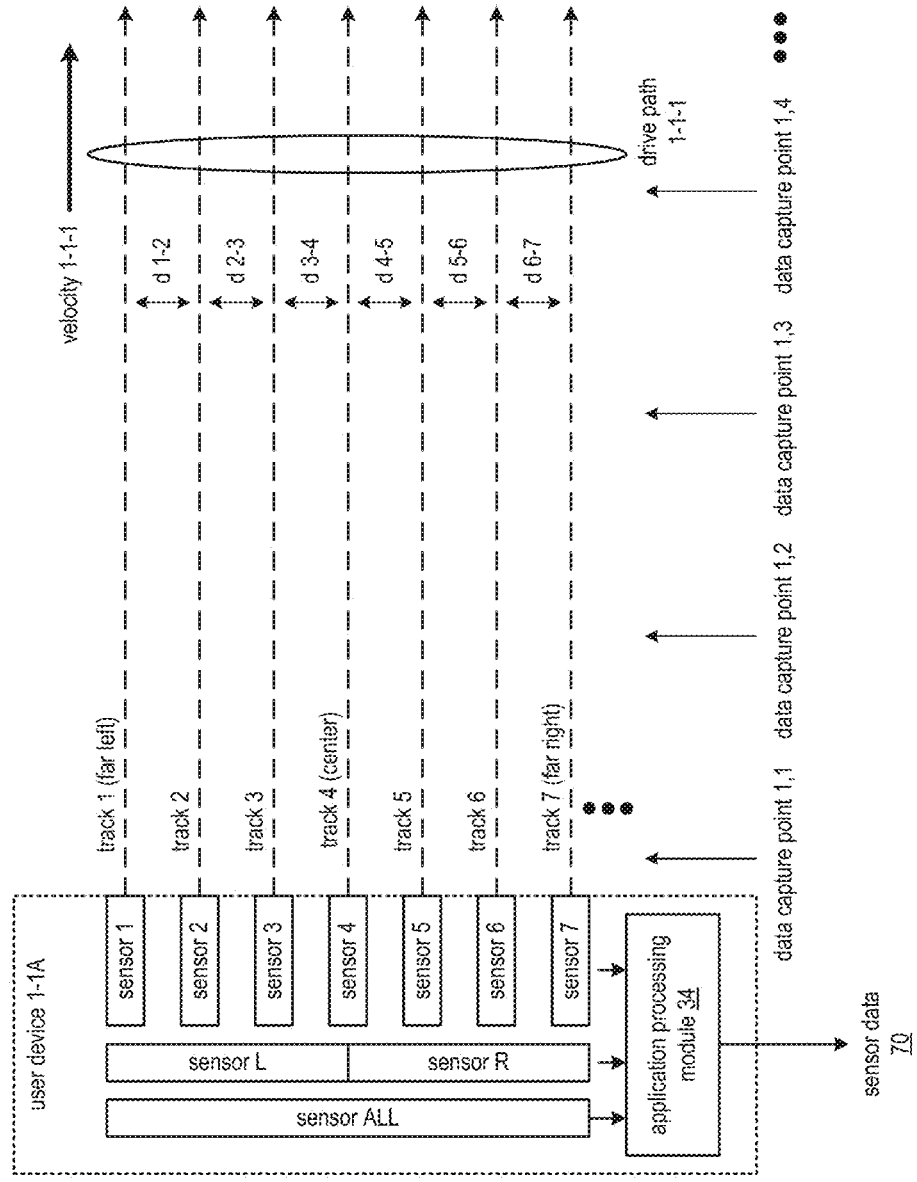
FIG. 7 is a diagram illustrating a relationship between a user device and tracks along a drive path in accordance with the present invention.

FIG. 7 is a diagram illustrating a relationship between the user device 1-1A and tracks 1-7 along the drive path 1-1-1. The user device 1-1A includes the application processing module 34, an array of sensors 1-7, sensor L, sensor R, and sensor ALL to capture corresponding sensor 70 data along the drive path 1-1-1 as the user device 1-1A traverses the drive path 1-1-1 in accordance with a velocity 1-1-1. The velocity 1-1-1 may be established as at least one of a random velocity, a predetermined velocity, and an instantaneous velocity in accordance with a velocity schedule. An agricultural prescription may include the velocity schedule for each corresponding drive path or portion thereof.

The drive path 1-1-1 is associated with the tracks 1-7 and may include further tracks. Each track is a virtual path substantially parallel with the drive path 1-1-1. A center track (e.g., track 4) may further align with the drive path 1-1-1 and each other track runs in parallel to the center track, where each track is separated from another track by a potentially unique distance d (e.g., different distances between different tracks in a typical range of a few centimeters to many meters). For example, track 3 is separated from track 4 by distance d3-4 of 8 inches and track 4 is separated from track 5 by distance d4-5 of 20 inches. The agricultural prescription may include a number of tracks, each of the distances that separate the tracks, and a track to sensor mapping.

Each sensor is associated with one or more tracks. For example, sensor 1 is associated with track 1, sensor 2 is associated with track 2, sensor 3 is associated with track 3, etc., through sensor 7 is associated with track 7; sensor L is associated with tracks 1-4; sensor R is associated with tracks 4-7; and sensor ALL is associated with tracks 1-7. Each sensor may include capabilities to sense one or more attributes associated with one or more of the tracks in accordance with the track mapping. For example, sensors 1-7 include image sensors to detect and enable identification of objects (e.g., desired and undesired) along tracks 1-7, sensor L includes an ultrasonic sensor to detect objects associated with tracks 1-4, sensor R includes an ultrasonic sensor to detect objects associated with tracks 4-7, and sensor ALL includes an accelerometer to provide inertia information with regards to a farming tractor associated with the user device 1-1A (e.g., to enable precision location determination).

The application processing module 34 captures the sensor data 70 from the array of sensors from time to time in accordance with a data capture scheme. The application processing module 34 processes the sensor data 70 in accordance with a sensor data processing scheme. The agricultural prescription may include the sensor data processing scheme. The application processing module 34 obtains the sensor data processing scheme by at least one of accessing a predetermination, initiating a query, receiving a query response, receiving the agricultural prescription, and determining the agricultural prescription.

The sensor data processing scheme includes one or more of locally storing at least a portion of the sensor data, outputting at least some of the sensor data, identifying a portion of the sensor data for analysis, analyzing the identified portion of the sensor data to produce an analysis, summarizing the analysis to produce an analysis summary, and generating an updated agricultural prescription. As a specific example of capturing the sensor data 70, the application processing module 34 captures the sensor data 70 from the array of sensors at a data capture point 1,1 for each of the tracks 1-7, where the distance between tracks is 8 inches; captures the sensor data 70 from the array of sensors at a data capture point 1, 2 for each of the tracks 1-7, where the distance between tracks is adjusted to 6 inches, from sensor L, from sensor R, and from sensor ALL; captures the sensor data 70 from the array of sensors at a data capture point 1, 3 for each of the tracks 1-7, where the distance between tracks is maintained at 6 inches, and the velocity 1-1-1 is suggested from 8 miles per hour (MPH) to 11 MPH; etc.

Figure 8:
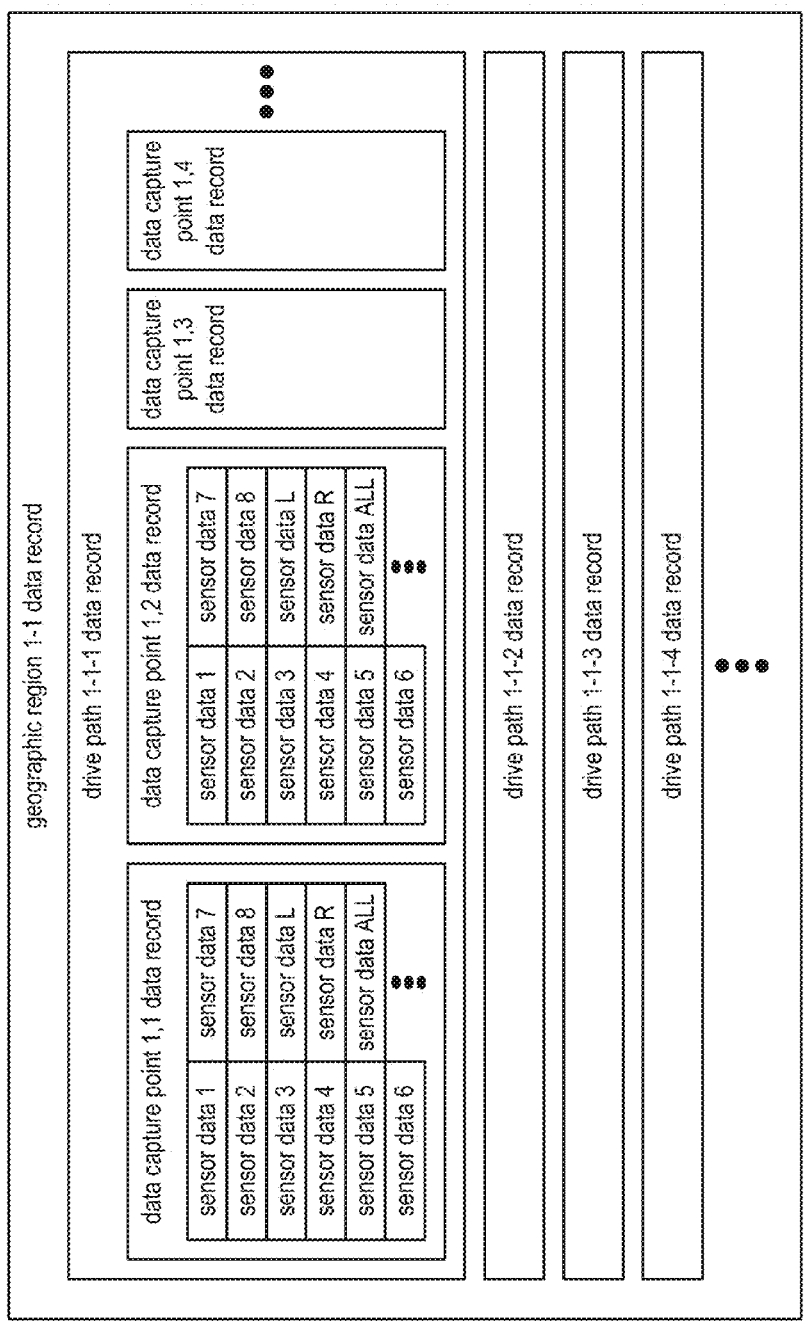
FIG. 8 is a diagram illustrating an example of a structure of a data record in accordance with the present invention.

FIG. 8 is a diagram illustrating an example of a structure of a geographic region 1-1 data record, where the data records 74 may include the geographic region 1-1 data record. The geographic region 1-1 data record includes a plurality of drive path data records 1-1-1, 1-1-2, 1-1-3, etc. Each drive path data record is associated with a plurality of corresponding drive paths of a drive path associated with the geographic region 1-1. Each drive path data record includes data capture point data records. For example, the drive path 1-1-1 data record includes data capture point data records for data capture points 1,1, 1,2, 1,3, 1,4, etc.

Each data capture data record includes the sensor data 70 for a sensor array corresponding to a user device associated with capture of the sensor data. For example, the data capture point data records for the drive path 1-1-1 data record includes sensor data 1-8, sensor data L, sensor data R, sensor data ALL, and may include further data associated with data capture point 1,1. The further data may include one or more of a timestamp corresponding to capturing of the sensor data, a timestamp corresponding to receiving of the captured sensor data, location information associated with the data capture point, an identifier of a user device associated with the sensor array, identifiers for each sensor of the sensor array, an identifier associated with another user device that is associated with the user device, an identifier of the geographic region, an identifier of the drive path data record, an identifier of the data capture point, a data owner identifier, an access control list, security credentials, security information (e.g., a signed certificate, an encryption key, an encryption key seed), and any other data to facilitate optimization of an agricultural lifecycle.

Figure 9:
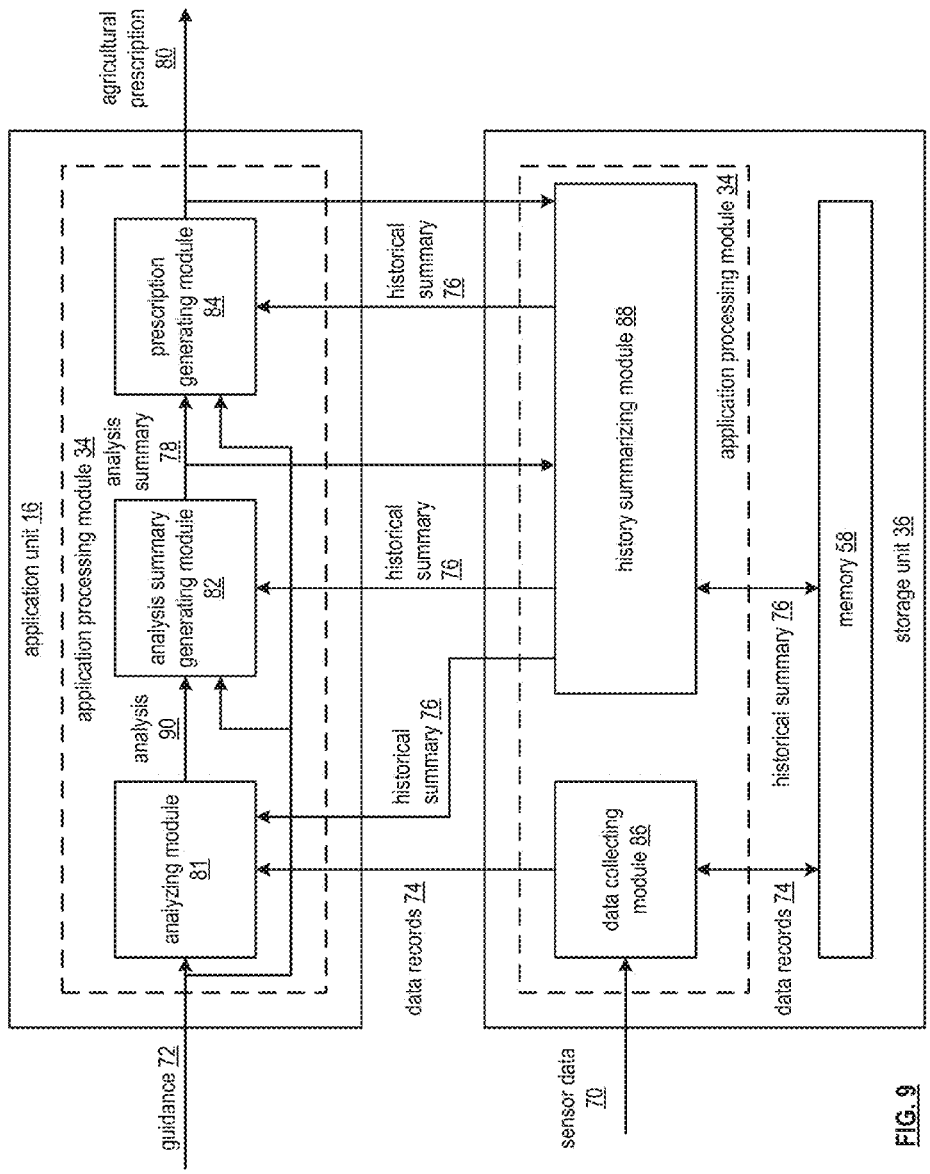
FIG. 9 is a schematic block diagram of an embodiment of an application unit and an associated storage unit in accordance with the present invention.

FIG. 9 is a schematic block diagram of an embodiment of the application unit 16 and of the storage unit 36, where the application unit 16 and the storage unit 36 include corresponding application processing modules 34 and may include the memory 58. Alternatively, a single computing device may include each application processing module 34 and each memory 58. The application processing module 34 of the application unit 16 includes an analyzing module 81, an analysis summary generating module 82, and a prescription generating module 84. The application processing module 34 of the storage unit 36 includes a data collecting module 86 and a history summarizing module 88.

The application unit 16 and storage unit 36 perform at least some steps associated with the five example functions of the computing system 10. In an example of operation, the data collecting module 86 receives sensor data 70 from one or more user devices associated with a geographic region of a plurality of geographic regions. The data collecting module 86 generates one or more data records 74 based on the sensor data 70 and stores the one or more data records 74 in the memory 58 of the storage unit 36.

The analyzing module 81 receives guidance 72 from a user device (e.g., the user device 14 of FIG. 1) associated with the geographic region. For example, the guidance 72 includes a request for an analysis and conditions of the analysis. The analyzing module 81 obtains data records 74 from the data collecting module 86 based on the guidance 72 and may further obtain a historical summary 76 from the history summarizing module 88 based on the guidance 72. Hereafter, the historical summary 76 may be interchangeably referred to as a history summary. For example, the analyzing module 81 issues a data records request to the data collecting module 86 with regards to the geographic region and receives the data records 74 from the data collecting module 86, where the received data records 74 are associated with the geographic region and adjacent geographic regions to the geographic region. As another example, the analyzing module 81 issues a history summary request to the history summarizing module 88 and receives the historical summary 76 with regards to the geographic region and the adjacent geographic regions from the history summarizing module 88.

Having obtained the data records 74 and the historical summary 76, analyzing module 81 analyzes one or more of the data records 74 and the historical summary 76 to produce an analysis 90 in accordance with the guidance 72. For example, the analyzing module 81 identifies results from the data records 74 and correlates the results to specific steps of an agricultural lifecycle of the historical summary 76 to produce the analysis 90, where the analysis 90 indicates results and associated steps.

The analysis summary generating module 82 obtains another historical summary 76 from the history summarizing module 88, where the other historical summary 76 includes a previous analysis summary associated with the geographic region. Having received the historical summary 76, the analysis summary generating module 82 summarizes the analysis 90 in accordance with one or more of the guidance 72 and the historical summary 76 to produce an analysis summary 78. For example, the analysis summary generating module 82 determines probabilities of favorable results associated with the steps based on previous sets of results and steps.

The history summarizing module 88 may obtain the analysis summary 78 and process the analysis summary 78 to produce a further historical summary 76 for storage in the memory 58 of the storage unit 36. The prescription generating module 84 obtains yet another historical summary 76 from the history summarizing module 88, where the yet another historical summary 76 may include one or more previous agricultural prescriptions associated with the geographic region and/or agricultural prescriptions associated with the adjacent geographic regions. Having received the analysis summary 78 and the yet another historical summary 76, the prescription generating module 84 generates a prescription 80 for the geographic region based on one or more of the analysis summary 78, the yet another history summary 76, and the guidance 72. For example, the prescription generating module 84 utilizes the probabilities of favorable results associated with the steps to recommend steps of the agricultural lifecycle associated with the geographic region and in accordance with the guidance 72 (e.g., for a specific desired crop type).

The prescription 80 may include one or more of steps, actions associated with each step, and preconditions for each action. The prescription generating module 84 outputs the prescription 80 which may include sending the prescription 80 to the history summarizing module 88. When receiving the prescription 80, the history summarizing module 88 processes the prescription 80 to produce an updated historical summary 76 for storage in the memory 58.

Figure 10:
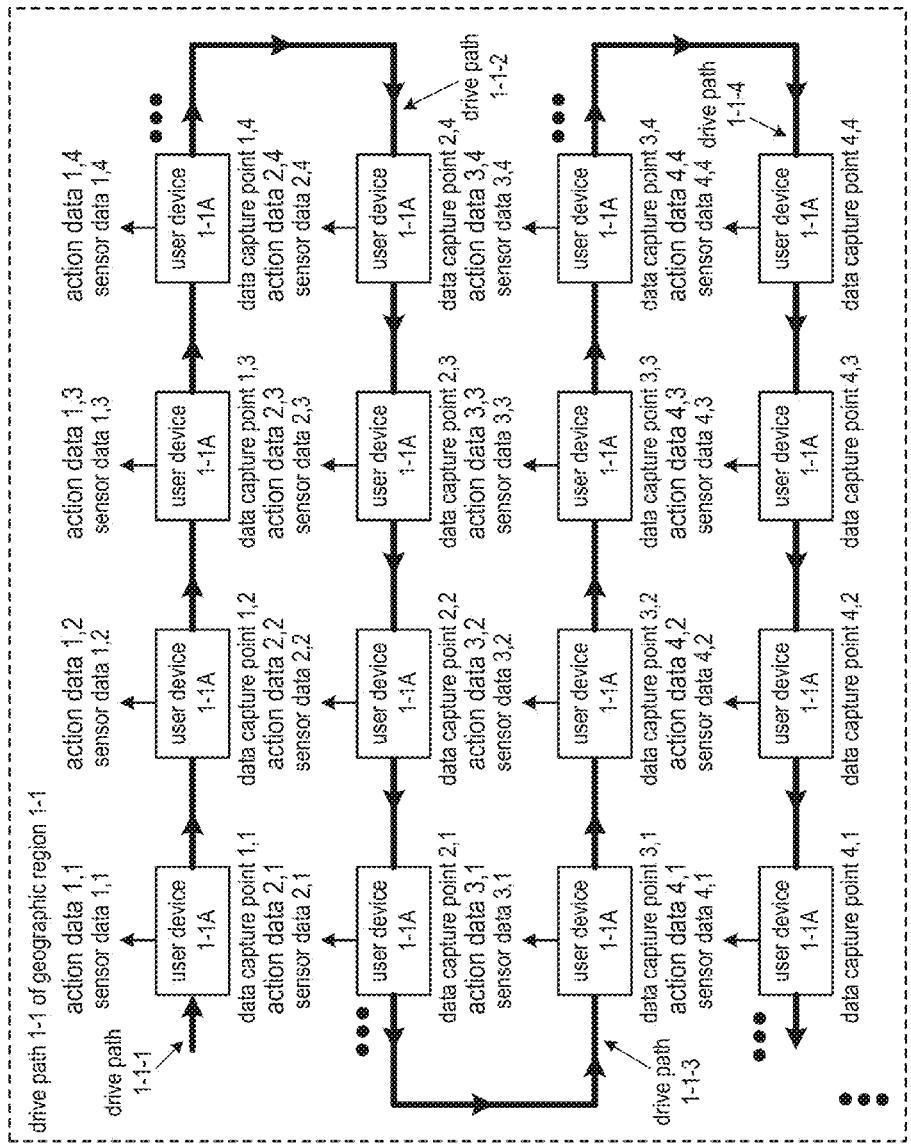
FIG. 10 is a diagram illustrating another embodiment of a drive path for an associated geographic region in accordance with the present invention.

FIG. 10 is a diagram illustrating another embodiment of the drive path 1-1 for associated geographic region 1-1. The user device 1-1A captures sensor data at the plurality of data capture points along each associated drive path of the drive path 1-1 and provides action data along at least some of the associated drive paths. The user device enables execution of the action data along each associated drive path in accordance with an agricultural prescription.

The action data includes one or more steps of an agricultural lifecycle, and may further include actions and associated preconditions for each action. For example, an action may include depositing a specified volume of liquid fertilizer along the drive path 1-1-1 at specific intervals. As another example, the action may include planting seeds of a desired crop at a specific soil depth at specified intervals along the drive path 1-1-2. For instance, a specified average number of seeds are deposited along the drive path 1-1-2 in accordance with action data 2, 4 followed by depositing further seeds along the drive path 1-1-2 in accordance with action data 2, 3 etc.

Figure 11:
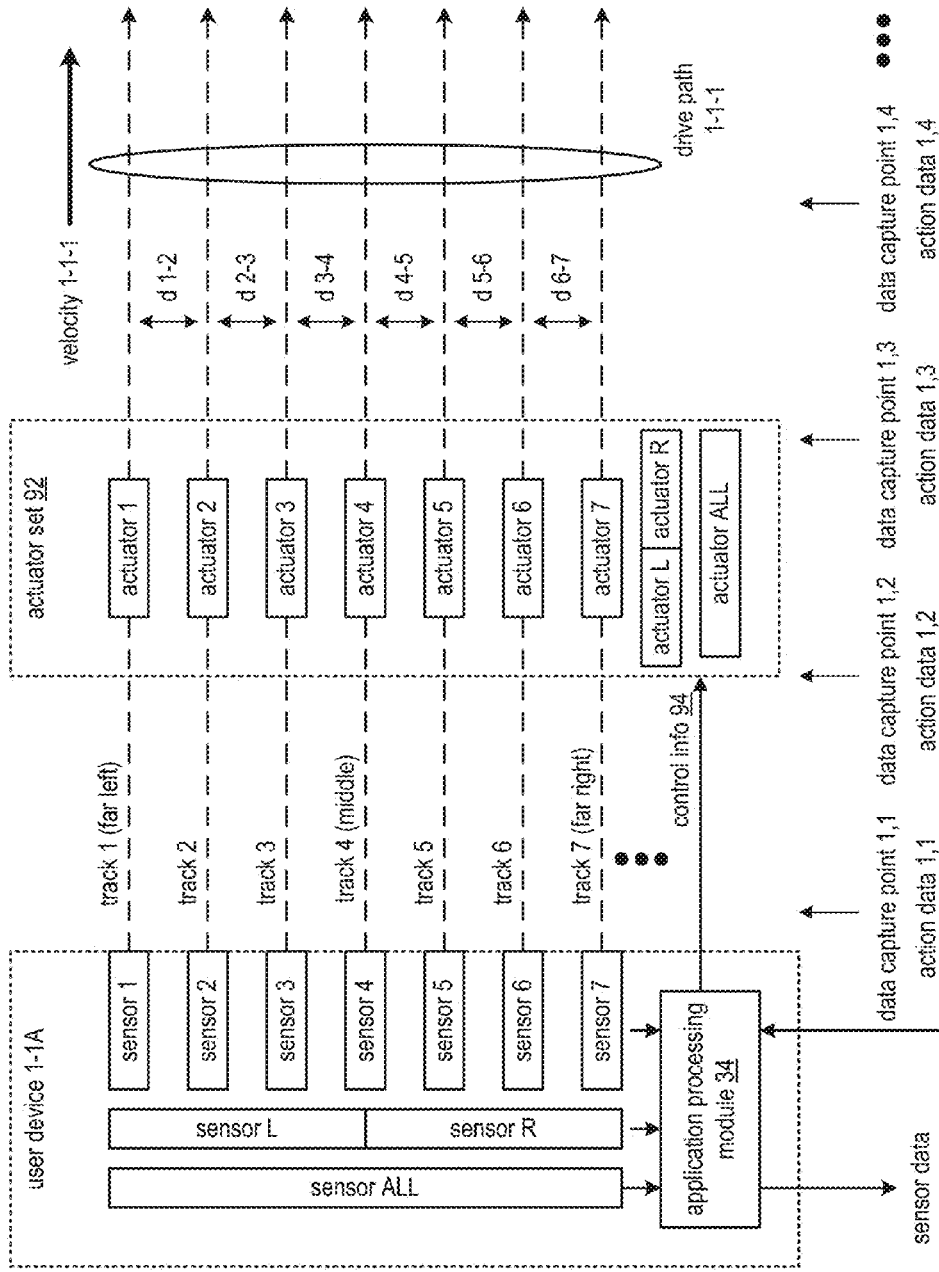
FIG. 11 is a diagram illustrating a relationship between a user device, an actuator set, and tracks along a drive path in accordance with the present invention.

FIG. 11 is a diagram illustrating a relationship between the user device 1-1A, an actuator set 92, and the tracks 1-7 along the drive path 1-1-1. In an embodiment, the actuator set 92 includes a set of actuators 1-7, actuator L, actuator R, and actuator ALL. Each actuator is operable to perform an action in accordance with control information 94 including one or more of dispensing fluid (e.g., fertilizer, pesticide, fungicide), dispensing a solid (e.g., planting a seed), and manipulating soil (e.g., tilling). An agricultural prescription 80 includes the control information 94 that includes the actions of the planting. The user device 1-1A includes the sensor array of FIG. 7 and the application processing module 34 of FIG. 7.

The control information 94 further includes one or more instructions with regards to implementation of actions performed by the actuators. The instructions includes one or more of setting a distance between the tracks, planting a seed at a specified planting depth, dispensing a specified volume of a liquid within a linear distance along a track, setting a velocity 1-1-1 of traversing of the drive path 1-1-1 in accordance with a velocity schedule, modifying the velocity 1-1-1 based on real-time sensor data, and utilizing one or more sensors to detect preconditions to enable execution of one or more actions.

The user device 1-1A and the actuator set 92 share a common implementation association. For example, embedded control electronics of a farming tractor includes the user device 1-1A and a farming planting mechanism, propelled by the farming tractor, includes the actuator set 92, where the actuator set 92 facilitates actions associated with planting along the drive path 1-1-1.

Each actuator may be associated with one or more of the tracks 1-7. For example, actuator 1 is associated with track 1, actuator 2 is associated with track 2, etc., through actuator 7 is associated with track 7, actuator L is associated with tracks 1-4, actuator R is associated with tracks 4-7, and actuator ALL is associated with tracks 1-7. For example, actuators 1-7 include planting actuators, actuator L includes a mechanism to simultaneously adjust a position of actuators 1-4 (e.g., lift left, lower left), actuator R includes a mechanism to simultaneously adjust a position of actuators 4-7 (e.g., lift right, lower right), and actuator ALL includes a mechanism to simultaneously adjust a position of actuators 1-7 (e.g., lift all, lower all).

In an example of operation, the application processing module 34 of the user device 1-1A extracts the control information 94 from the received prescription 80 and activates the actuator set 92 with the control information 94. As the user device 1-1A and the actuator set 92 traverses the drive path 1-1-1 at velocity 1-1-1, the actuator set 92 performs the actions of the control information 94 (e.g., plants seeds along the tracks) in accordance with a plurality of action data 1,1, 1,2, 1,3, 1,4, etc., and the application processing module 34 captures sensor data 70 from the array of sensors at data capture points 1,1, 1,2, 1,3, 1,4, etc. The application processing module 34 may update the control information 94 based on the captured sensor data 70. For example, the application processing module modifies a planting depth of the control information 94 based on a moisture sensor data value and in accordance with the prescription 80.

FIGS. 12A and 12B are a schematic block diagram of an embodiment of a computing system 100 that includes the wireless location network 18 of FIG. 1, the geographic region 1-1 of FIG. 3, the wireless communication network 1 of FIG. 1, the network 24 of FIG. 1, the user device 14 of FIG. 1, and the application unit 16 of FIG. 1. The geographic region 1-1 includes the user devices 1-1A and 1-1C of FIG. 1, where the user device 1-1A is associated with agriculture equipment (e.g., operably coupled to a farming tractor of a plurality of farming tractors) and traverses a drive path 1-1 (e.g., with at least one of the agriculture equipment) within the geographic region 1-1. Hereafter, the user devices 1-1A and 1-1C may be interchangeably referred to as the agriculture equipment and the geographic region may be interchangeably referred to as an agriculture region. The user device 14 includes the application processing module 34 of FIG. 4. The application unit 16 includes the application processing module 34 of FIG. 4 and the memory 58 of FIG. 4. Hereafter, the application unit 16 may be interchangeably referred to as a host device. The computing system functions to generate an agriculture prescription. The generation of the agriculture prescription is discussed in greater detail with reference to FIGS. 12A-12H.

FIG. 12A illustrates steps of an example of operation of the generating of the agriculture prescription where the agriculture equipment collects current on-site gathered agriculture data regarding an agriculture region (e.g., geographic region 1-1). For example, the user device 1-1A collects sensor data (e.g., accelerometer data) with regards to the geographic region 1-1 as the associated agriculture equipment traverses the drive path 1-1; sends, via wireless communication signals 42, the sensor data to the user device 1-1C; and the user device 1-1C receives wireless location signals 38 from the wireless location network 18 to produce location information associated with the sensor data.

The collecting of the current on-site gathered agriculture data may further include at least one collecting approach of a variety of collecting approaches. As a specific example of a first collecting approach, the user device 1-1A receives, via the network 24 and the wireless communication network 1 by way of the wireless communication signals 42, from the host device (e.g., the application unit 16), an indication to collect the current on-site gathered agriculture data. For instance, the user device 1-1A receives a collect-all sensor data indicator from the host device the indication to collect the current on-site gathered agriculture data.

As a specific example of a second collecting approach, the user device 1-1A receives, from the host device, a message to collect a particular type of agriculture data. For instance, the user device 1-1A receives an indicator to collect the accelerometer data as the message to collect the particular type of agriculture data. As a specific example of a third collecting approach, the user device 1-1A interprets an agriculture prescription to determine one or more types of agriculture data to collect as the current on-site gathered agriculture data. For instance, the user device 1-1A receives an agriculture prescription that includes an indicator to collect the accelerometer data and interprets the received agriculture prescription to determine to collect the accelerometer data as the current on-site gathered agriculture data.

Having collected the current on-site gathered agriculture data regarding the agriculture region, the user device 1-1A sends, at least a representation of the current on-site gathered agriculture data to the host device (e.g., the application unit 16). For example, the user device 1-1A and the user device 1-1C produces agriculture data for region 1-1 as the representation and sends, via the wireless location signals 42, the agriculture data for region 1-1 to the wireless location network 1, where the wireless communication network 1 sends, via the network 24 the agriculture data for region 1-1 to the application unit 16.

The sending may further include at least one of a variety of sending approaches. As a specific example of a first sending approach, the user device 1-1A generates the at least a representation of the current on-site gathered agriculture data by utilizing the current on-site gathered agriculture data as the at least a representation of the current on-site gathered agriculture data. For instance, the user device 1-1A utilizes the sensor data as the representation (e.g., raw sensor data). As a specific example of a second sending approach, the user device 1-1A filters, based on the agriculture prescription, the current on-site gathered agriculture data to produce the at least a representation of the current on-site gathered agriculture data. For instance, the user device 1-1A selects every tenth accelerometer data sample along the drive path 1-1 to filter the accelerometer data to produce the representation.

As a specific example of a third sending approach, the user device 1-1A and/or the user device 1-1C compile the current on-site gathered agriculture data to produce the at least a representation of the current on-site gathered agriculture data. For instance, the user device 1-1A sends the accelerometer data, via wireless communication signals 42 (e.g., Bluetooth) to the user device 1-1C and the user device 1-1C associates the accelerometer data with the location information to produce the representation. As a specific example of a fourth sending approach, user device 1-1A processes the current on-site gathered agriculture data to produce the at least a representation of the current on-site gathered agriculture data. For instance, the user device 1-1A performs an averaging function on the accelerometer data (e.g., to produce an average elevation for a portion of the drive path 1-1) to produce the representation.

Alternatively, or in addition to, still further user devices associated with the geographic region 1-1 send corresponding representations of the current on-site gathered agriculture data associated with the geographic region 1-1. Further alternatively, or further in addition to, the user device 1-1A and/or the user device 1-1C send further representations of further current on-site gathered agriculture data associated with the geographic region 1-1 when the user device 1-1A further traverses the drive path 1-1 (e.g., for each pass of the farming tractor performing steps of an agriculture lifecycle along the drive path 1-1).

FIG. 12B illustrates further steps of the example of operation of the generating of the agriculture prescription 114 where the host device processes one or more of the at least a representation of the current on-site gathered agriculture data, current off-site gathered agriculture data 110, historical on-site gathered agriculture data, historical off-site gathered agriculture data, and historical analysis of agriculture predictions regarding the agriculture region to produce a current agriculture prediction for the agriculture region. For example, the application processing module 34 of the application unit 16 compares the current on-site gathered agriculture data with the historical on-site gathered agriculture data (e.g., from a previous traversing of the geographic region) to produce a topographical trend (e.g., detecting a change in elevation of a portion of the geographic region that is greater than a change in elevation threshold level) as the current agriculture prediction.

The processing may further include the host device receiving the at least a representation of the current on-site gathered agriculture data and storing the received representation. For instance the application processing module 34 of the application unit 16 receives, via the network 24 and the wireless communication network 1, the agriculture data for region 1-1 and stores the agriculture data for region 1-1 in the memory 58 producing a new portion of the historical on-site gathered agriculture data.

The processing may further include the application unit 16 receiving, via the network 24, the current off-site gathered agriculture data 110 from an external entity (e.g., a server via a public Internet, a server of a private computing system, a fixed sensor array, etc.), where the current off-site gathered agriculture data 110 includes one or more of current regional topology information (e.g., a current topographical map of the geographic region), current weather data (e.g., temperature, wind direction, wind speed, precipitation level, sunlight intensity, etc.), and current soil conditions (e.g., moisture level, nutrient level, fertilizer level, etc.).

The processing may further include the application unit 16 retrieving, from the memory 58, one or more of the historical on-site gathered agriculture data, the historical off-site gathered agriculture data, the historical analysis of the agriculture predictions, where the historical off-site gathered agriculture data includes one or more of historical regional topology information (e.g., a series of chronologically ordered topographical maps of the geographic region), historical weather data (e.g., historical temperatures, historical wind directions, historical wind speeds, historical precipitation levels, historical sunlight intensities, etc.), and current historical soil conditions (e.g., historical moisture levels, historical nutrient levels, historical fertilizer levels, etc.).

The processing by the host device may further include, for a given snapshot of an agriculture season (e.g., for a time portion of the agriculture lifecycle), comparing agriculture predictions with actual agriculture results to produce comparison data. For example, the application processing module 34 of the application unit 16 analyzes agriculture data for the agriculture region 1-1 associated with a harvesting portion of the agriculture season to produce the actual agriculture results (e.g., yield in terms of bushels of corn per acre), and compares an agriculture prediction associated with an earlier portion of the agriculture season with the actual agriculture results associated with the harvesting portion to produce the comparison data (e.g., indicating accuracy of the agriculture prediction for the harvesting of the corn).

Having produced the comparison data, the host device processes the comparison data with the one or more of the at least a representation of the current on-site gathered agriculture data, the current off-site gathered agriculture data, the historical on-site gathered agriculture data, the historical off-site gathered agriculture data, and the historical analysis of agriculture predictions regarding the agriculture region to produce an in-season course correction agriculture prediction for the agriculture region. For example, the application processing module 34 of the application unit 16 processes the indicated accuracy of the comparison data for the harvesting of the corn and the historical analysis of agriculture predictions (e.g., from previous agriculture lifecycles of the agriculture region 1-1) to produce the in-season course correction agriculture prediction for the agriculture region 1-1. For instance, the application processing module 34 generates the in-season course correction agriculture prediction that indicates optimizing of crop yield further includes a requirement to use 4% more fertilizer than a previous agriculture prediction.

The processing by the host device may further include processing geographical information of the at least a representation of the current on-site gathered agriculture data to produce a current topographical map of the agriculture region. For example, the application processing module 34 processes the accelerometer data and corresponding location information of the agriculture data for region 1-1 for multiple passes of the drive path 1-1 to produce the current topographical map of the agriculture region 1-1. Having produced the current topographical map, the host device compares the current topographical map with one or more previous topographical maps of the agriculture region to detect one or more areas of erosion. For example, the application processing module 34 of the application unit 16 detects a pocket area of a lowering of an elevation level over time and indicates the pocket area as the area of erosion. The generating of the current topographical map and the detecting of the erosion is discussed in greater detail with reference to FIGS. 12D-H.

Having produced one or more of the current agriculture prediction and the in-season course correction agriculture prediction, the host device generates an agriculture prescription 114 regarding at least a portion of the agriculture region based on one or more of the current agriculture prediction and the in-season course correction agriculture prediction. For example, the application processing module 34 of the application unit 16 analyzes a series of current agriculture predictions with regards to correlation of steps of the agriculture lifecycle and crop yield optimization and selects a group of steps to produce the agriculture prescription 114, where the selected group of steps facilitates the crop yield optimization.

The host device may produce the agriculture prescription 114 in accordance with a variety of producing approaches. As an example of a first producing approach, the host device establishes a speed pattern (e.g., average velocity, maximum velocity, minimum velocity, etc.) for one of the agriculture equipment while traversing the at least a portion of the agriculture region. For example, the application processing module 34 of the application unit 16 identifies an optimal speed (e.g., not too slow, not too fast) for the farming tractor of the agriculture equipment when performing one or more steps of the agriculture prescription for each of a plurality of portions of the agriculture region, where the optimal speeds correlate to the improved crop yield optimization. The identifying of the optimal speed is discussed in greater detail with reference to FIGS. 16A-C.

As an example of a second producing approach, the host device establishes a crop planting orientation pattern for the one of the agriculture equipment while traversing the at least a portion of the agriculture region. For example, the application processing module 34 of the application unit 16 identifies an optimal direction (e.g., heading) for the farming tractor of the agriculture equipment when performing the one or more steps of the agriculture prescription for the each of a plurality of portions of the agriculture region, where the optimal directions correlate to the improved crop yield optimization. The identifying of the optimal direction is discussed in greater detail with reference to FIGS. 14A-C.

As an example of a third producing approach, a host device establishes a crop planting distribution pattern for the one of the agriculture equipment while traversing the at least a portion of the agriculture region. For example, the application processing module 34 of the application unit 16 identifies an optimal crop planting distribution pattern (e.g., seed depth, seed spacing, etc.) for the farming tractor of the agriculture equipment when performing the one or more steps of the agriculture prescription for the each of a plurality of portions of the agriculture region, where the optimal crop planting distribution patterns correlate to the improved crop yield utilization.

Having produced the agriculture prescription 114, the host device sends the agriculture prescription 114 to one or more of the agriculture equipment. Alternatively, or in addition to, the host device sends the agriculture prescription 114 to the user device 14, where the user device 14 may further process and/or display the agriculture prescription 114. For example, the application processing module 34 of the application unit 16 sends, via the network 24, the agriculture prescription 114 to the user device 14 and to the wireless communication network 1. Having received the agriculture prescription 114, the communication network 1 sends, via the wireless communication signals 42, the agriculture prescription 114 to the user device 1-1C. Having received the agriculture prescription 114, the user device 1-1C may further process the agriculture prescription 114 and/or forward, via further wireless communication signals 42, the agriculture prescription 114 to the user device 1-1A. The processing of the agriculture prescription 114 by the user device 1-1C may include one or more of extracting an indicator to collect agriculture data, identifying steps of the agriculture prescription associated with the user device 1-1C, and modifying the agriculture prescription 114 to produce an updated agriculture prescription 114 based on further collected agriculture data.

Having received the agricultural prescription, the one or more of the agriculture equipment executes at least a portion of the agriculture prescription 114. For example, the user device 1-1A identifies steps of the agriculture prescription 114 associated with the user device 1-1A and facilitates execution of the identified steps (e.g., gathering further agriculture data, activating actuators associated with the agriculture equipment, etc.).

FIG. 12C is a flowchart illustrating an example of generating the agriculture prescription. In particular, a method is presented for use in conjunction with one or more functions and features described in conjunction with FIGS. 1-11, 12A-B, and also FIG. 12C. The method begins or continues at step 120 where a processing module of one or more processing modules of one or more computing devices affiliated with agriculture equipment collects current on-site gathered agriculture data regarding an agriculture region. For example, a processing module of the agriculture equipment collects the current on-site gathered agriculture data regarding an agriculture region. The collecting the current on-site gathered agriculture data may further include at least one of the agriculture equipment receiving, from a host device, an indication to collect the current on-site gathered agriculture data; the agriculture equipment receiving, from the host device, a message to collect a particular type of agriculture data; and the agriculture equipment interpreting an agriculture prescription to determine one or more types of agriculture data to collect as the current on-site gathered agriculture data.

The method continues at step 122 where the agriculture equipment sends at least a representation of the current on-site gathered agriculture data to the host device. The sending may include one of the agriculture equipment generating the at least a representation of the current on-site gathered agriculture data by at least one of utilizing the current on-site gathered agriculture data as the at least a representation of the current on-site gathered agriculture data, filtering, based on the agriculture prescription, the current on-site gathered agriculture data to produce the at least a representation of the current on-site gathered agriculture data, compiling the current on-site gathered agriculture data to produce the at least a representation of the current on-site gathered agriculture data, and processing the current on-site gathered agriculture data to produce the at least a representation of the current on-site gathered agriculture data.

The method continues at step 124 where the host device processes one or more of the at least a representation of the current on-site gathered agriculture data, current off-site gathered agriculture data, historical on-site gathered agriculture data, historical off-site gathered agriculture data, and historical analysis of agriculture predictions regarding the agriculture region to produce a current agriculture prediction for the agriculture region. The method continues at step 126 where the host device, for a given snapshot of an agriculture season, compares agriculture predictions with actual agriculture results to produce comparison data.

The method continues at step 128 where the host device processes the comparison data with the one or more of the at least a representation of the current on-site gathered agriculture data, the current off-site gathered agriculture data, the historical on-site gathered agriculture data, the historical off-site gathered agriculture data, and the historical analysis of agriculture predictions regarding the agriculture region to produce an in-season course correction agriculture prediction for the agriculture region. The method continues at step 130 where the host device processes geographical information of the at least a representation of the current on-site gathered agriculture data to produce a current topographical map of the agriculture region when the current topographical map is desired to facilitate another step. The method continues at step 132 where the host device compares the current topographical map with one or more previous topographical maps of the agriculture region to detect one or more areas of erosion.

The method continues at step 134 where the host device generates an agriculture prescription regarding at least a portion of the agriculture region based on one or more of the current agriculture prediction and the in-season course correction agriculture prediction. The host device may generate the agriculture prescription in accordance with a variety of generation approaches. The generating step method continues at step 134*a* where the host device establishes a speed pattern for one of the agriculture equipment while traversing the at least a portion of the agriculture region when the agriculture prescription requires the speed pattern. Alternatively, or in addition to, the generating step method continues at step 134*b* where the host device establishes a crop planting orientation pattern for the one of the agriculture equipment while traversing the at least a portion of the agriculture region when the agriculture prescription requires the crop planting orientation pattern. Further alternatively, or in addition to, the generating step method continues at step 134*c* where the host device establishes a crop planting distribution pattern for the one of the agriculture equipment while traversing the at least a portion of the agriculture region when the agriculture prescription requires the crop planting distribution pattern.

The method continues at step 136 where the host device sends the agriculture prescription to one or more of the agriculture equipment. For example, the host device transmits the agriculture prescription to a fleet of farming tractors. The sending may further include transmitting the agriculture prescription to one or more user devices associated with the geographic region. The method continues at step 138 where the one or more of the agriculture equipment executes at least a portion of the agriculture prescription. For example, the fleet of farming tractors executes steps of the agriculture prescription.

The method described above in conjunction with the processing module can alternatively be performed by other modules of the one or more computing devices affiliated with the agriculture equipment or by other devices. In addition, at least one memory section (e.g., a non-transitory computer readable storage medium) that stores operational instructions can, when executed by one or more processing modules of the one or more computing devices affiliated with the agriculture equipment, cause the one or more computing devices to perform any or all of the method steps described above.

FIG. 12D is a schematic block diagram of another embodiment of a computing system that includes the wireless location network 18 of FIG. 1, the geographic region 1-1 of FIG. 1, the wireless communication network 1 of FIG. 1, the network 24 of FIG. 1, the user device 14 of FIG. 1, the application unit 16 of FIG. 1, and the storage unit 36 of FIG. 1. The geographic region 1-1 includes the user devices 1-1A and 1-1C of FIG. 1, where the user device 1-1A traverses the drive path 1-1. User device 14 includes the application processing module 34 of FIG. 3. The application unit 16 includes the application processing module 34 of FIG. 4.

The storage unit 36 includes the application processing module 34 of FIG. 4 and the memory 58 of FIG. 4.

The computing system is operable to identify a sub-region within the geographic region 1-1 associated with a results abnormality of an agricultural lifecycle. The results abnormality may include one or more of a crop yield below a low crop yield threshold level, the crop yield above a high crop yield threshold level, utilization of a resource above a high resource utilization threshold level, utilization of the resource below a low resource utilization threshold level, and any other results metric that compares unfavorably to an expected results range. For example, the system identifies a quarter acre portion of the geographic region 1-1 that is associated with a corn crop yield rate that is 30% below an average corn crop yield rate for the entire geographic region 1-1.

The computing system may further operate to identify a potential root cause for the results abnormality for the sub-region. For example, the computing system identifies an above average level of soil erosion associated with the sub-region as the potential root cause for the below average corn crop yield rate. As another example, the computing system identifies an above average level of soil buildup associated with the sub-region has potential root cause for the below average corn crop yield rate.

In an example of operation, the user device 1-1A obtains a plurality of sets of sensor data for two or more instances of operation along the drive path 1-1. The user device 1-1A sends, via the wireless communication signals 42 via user device 1-1C, the wireless communication network 1, and the network 24, sensor data sets for region 1-1 to the storage unit 36. The storage unit 36 processes the sensor data sets for region 1-1 to produce two or more data records 1, 2. For example, the application processing module 34 of the storage unit 36 produces 10 data records that corresponds to a last 10 passes over the drive path 1-1 by the user device 1-1A. The application processing module 34 of the storage unit 36 stores the data records 1, 2 in the memory 58 of the storage unit 36.

The application processing module 34 of the user device 14 issues, via the network 24, an erosion analysis request 160 to the application unit 16, where the erosion analysis request 160 includes an identifier for the geographic region 1-1. The application processing module 34 of the application unit 16 obtains, via the network 24, the data records 1, 2 from the storage unit 36 based on the erosion analysis request 160, where the data records 1, 2 pertain to the geographic region 1-1 of the erosion analysis request 160.

Having obtained the data records 1, 2, the application processing module 34 of the application unit 16 analyzes the data records 1, 2 in accordance with the erosion analysis request 160 to generate a topographic map for each data record with regards to the geographic region 1-1. The generating includes the application processing module 34 analyzing one or more of accelerometer sensor data and location information to produce an interim map that includes precise elevation information for a plurality of X Y coordinates. For example, application processing module 34 produces the elevation information for each data capture point of the drive path 1-1 based on one or more of the accelerometer sensor data and the location information. Having produced the interim map, the application processing module 34 generates connectors between points of substantially similar elevation, where additional points of elevation may be interpolated between the data capture points. Having generated the connectors, the application processing module 34 aggregates the interim map and the connectors to produce a corresponding topographic map that includes contour lines of common elevation levels.

Having produced the topographic map for each data record, the application processing 34 module of the application unit 16 interprets the contour lines of each topographic map for the two or more data records to identify an elevation abnormality trend. The application processing module 34 identifies the elevation abnormality trend when a difference between elevation levels depicted by contour lines of at least two topographic maps for a common location is greater than a difference threshold level. For example, the application processing module indicates a soil erosion elevation abnormality trend when an elevation level depicted by a first typographic map for a particular location is 6 inches higher than an elevation level depicted by a second topographic map for the same particular location, where the second topographic map is associated with a later timestamp. As another example, the application processing module 34 indicates a soil buildup elevation abnormality trend when the elevation level depicted by the first typographic map for the particular location is 6 inches lower than the elevation level depicted by the second topographic map for the same particular location, where the second topographic map is associated with a later timestamp.

Having identified the elevation abnormality trend, the application processing module 34 of the application unit 16 obtains a historical summary 162 with regards to the geographic region 1-1 from the storage unit 36, where the historical summary 162 includes historical crop yield rates for the geographic region 1-1. Having obtained the historical summary 162, the application processing module 34 correlates crop yield rates of the historical summary 162 to the particular location of the elevation abnormality trend to determine a level of impact on the crop yield rates as a potential result of the elevation abnormality trend. Having determined the level of impact, the application processing module 34 generates an erosion analysis summary 164 that includes one or more of an identifier for the particular location, one or more of the topographic maps, one or more of the crop yield rates, and the level of impact on the crop yield rates. For example, the application processing module 34 generates the erosion analysis summary 164 to indicate that crop yield rates associated with particular location is 30% below the average crop yield rate level of the geographic region 1-1 since the erosion has extended beyond an 8 inch level of erosion over the last three years.

Having generated the erosion analysis summary 164, the application processing module 34 of the application unit 16 sends, via the network 24, the erosion analysis summary 164 to one or more of the user device 14 and the storage unit 36. Alternatively, or in addition to, the application processing module 34 of the application unit 16 generates an agricultural prescription that includes additional soil management steps (e.g., aggressive tilling, etc.) of an agricultural lifecycle to abate the soil erosion.

FIG. 12E is a diagram illustrating another embodiment of a drive path for an associated geographic region 1-1. A user device obtains a plurality of sets of sensor data for two or more instances of operation along the drive path 1-1 in accordance with a data capture scheme. For example, the user device captures a set of sensor data from an array of sensors every one tenth of an inch of travel along the drive path 1-1 when the data capture scheme indicates to capture sensor data every one tenth of an inch. As such, the user device captures sensor data at approximately 633,000 data capture points along each west-to-east traversal of the geographic region 1-1 when the traversal is approximately 1 mile in distance.

The sensor array may cover a 40 foot path along the drive path when a farming mechanism that includes the sensor array is at least 40 feet in width. As such, the drive path further includes approximately 100 horizontal traversals of drive path elements when the area of coverage on the drive path is 40 feet and the north to south distance is approximately 4,000 feet.

The user device produces approximately 63.3 million sets of sensor data when each of the 100 horizontal elements of drive path includes the 633,000 data capture points. Each set of the sensor data include sensor data from sensors spaced apart across the width of the drive path. For example, data capture points are spaced one tenth of an inch apart along a track where tracks are separated by approximately 6 feet when the drive path with is approximately 40 feet and seven tracks of sensors are utilized along the drive path.

FIGS. 12F-G are diagrams illustrating examples of topographic maps for an associated geographic region 1-1. Each topographic map indicates contours of elevation (e.g., in feet above sea level, in the meters above sea level, in a distance versus another reference level) that is generated based upon a plurality of sets of captured sensor data. Each topographic map is associated with a particular timestamp. FIG. 12F indicates a topographic map produced based on sensor data associated with time t1. FIG. 12G indicates a topographic map produced based on sensor data associated with time t2. Alternatively, or in addition to, further topographic maps may be produced based on further sensor data associated with further timestamps.

Contour lines of two or more of the topographic maps are compared to identify a potential elevation abnormality trend. For example, the topographic map of the geographic region 1-1 at time t2 indicates a new lower area of potential erosion within a swale between elevation points at the 990 level. A geographic location of the identified potential elevation abnormality trend may be identified to enable further analysis. For example, the further analysis includes correlating crop yield rates for the geographic region over time to identify a level of impact on the crop yield rates from the identified potential elevation abnormality trend.

FIG. 12H is a flowchart illustrating an example of identifying topographic abnormalities. The method begins or continues at step 166 where a user device obtains two or more groups of sets of sensor data, where each group includes a plurality of sets of sensor data and where each group of sets of sensor data corresponds to a common drive path. The obtaining includes one or more of initiating a query, receiving a query response, interpreting an agriculture prescription to identify the sensor data for obtaining, selecting sensors of a sensor array, selecting the common drive path, appending timestamps to the sensor data, and appending location information to the sensor data.

The method continues at step 168 where a storage unit obtains the two or more groups of sets of sensor data. The obtaining includes at least one of receiving a group of sets of sensor data, initiating a sensor data request, and receiving a sensor data response. The method continues at step 170 where the storage unit processes the two or more groups of sets of sensor data to produce two or more data records. The processing includes one or more of generating a data record to include a group of sets of sensor data in accordance with a data record formatting scheme, storing the data records, and sending the data records to an application unit.

The method continues at step 172 where the application unit processes the two or more data records to produce two or more topographic maps of a common geographic area. The processing includes one or more of requesting the two or more data records (e.g., sending a request to the storage unit), receiving the two or more data records, analyzing sensor data of the two or more data records to produce a grid of XYZ coordinates for the common geographic region, and interpolating further coordinates of the grid to produce the topographic map. For example, the application unit interprets accelerometer data of the sensor data to account for pitch and roll of a farm tractor traversing the drive path of the common geographic area to produce the grid of XYZ coordinates.

The method continues at step 174 where the application unit compares the two or more topographic maps to identify contour differences that are greater than a contour difference threshold level. The comparing includes obtaining the threshold level, calculating the contour differences, comparing the contour differences to the threshold level, and indicating that the contour differences are greater than the contour difference threshold level when a difference between two contours is greater than the contour difference threshold level.

The method continues at step 176 where the application unit identifies the corresponding geographic location information for each instance of identifying the contour differences that are greater than the contour difference threshold level. The identifying includes extracting geographic location information from one or more of the two or more data records. The method continues at step 178 where the application unit compares historical results that include results associated with the identified geographic location information to identify one or more potential results abnormalities. The comparing includes one or more of obtaining the historical results from the storage unit (e.g., crop yield rates of previous years) and correlating changes in results for the identified geographic location. For example, the application unit identifies a 30% drop in corn crop yield rates when soil erosion within the identified geographic location is greater than 8 inches of soil depletion.

The method continues at step 180 where the application unit generates an analysis summary that includes the identified one or more potential results abnormalities and the corresponding geographic location information. The generating includes one or more of aggregating the results abnormalities and the location information, outputting the analysis summary to a requesting entity, and facilitating storage of the analysis summary within the storage unit as a historical summary.

FIG. 13A is a schematic block diagram of an embodiment of an application processing module that includes the analyzing module 81 of FIG. 9, the analysis summary generating module 82 of FIG. 9, the prescription generating module 84 of FIG. 9, the data collecting module 86 of FIG. 9, the history summarizing module 88 of FIG. 9, and the memory 58 of FIG. 9.

In an example of operation, the analyzing module 81 receives a request for guidance for a region of interest (e.g., geographic region 9). The request includes a request to optimize selection of the crop type for the geographic region 9 and may further include one or more of candidate crop types and conditions associated with the agricultural lifecycle. The analyzing module 81 selects a super-region 166 based on the request, where the super-region 166 includes the geographic region 9. The selecting may be based on one or more of accessing a list of adjacent geographic regions for geographic region 9, performing a lookup, initiating a query, and receiving a query response. For example, the analyzing module 81 selects geographic regions 2-4, 8-10, and 14-16 to be included in the super-region 166 based on a lookup.

Having selected the super-region 166, the analyzing module 81 obtains data records 168 for the super-region 166. For example, the analyzing module 81 issues a data records request for the super-region to the data collecting module 86 and receives the data records 168 in response. The data collecting module 86 accesses the memory 58 to recover the data records 168 based on identity of one or more of the super-region, the geographic region 9, and the adjacent geographic regions.

Having obtained the data records 168, the analyzing module 81 obtains historical summaries for the super-region. For example, the analyzing module 81 issues a historical summary request to the history summarizing module 88 for historical summaries of each of the geographic regions associated with the super-region, the history summarizing module 88 recovers the historical summaries from the memory 58, and the history summarizing module 88 sends the historical summaries (e.g., for geographic regions 2, 3, 4, 8, 9, 10, 14, 15, and 16) to the analyzing module 81.

Having obtained the data records 168 and the historical summaries, the analyzing module 81 analyzes the data records 168 and/or the historical summaries to produce results of a super-region analysis 170, where the results include results of the agricultural lifecycle for the candidate crop types as a function of associated conditions. The analysis may include one or more of an analysis over the super-region as a single geographic region, an analysis over portions of the super-region, and an analysis over each geographic region of the super-region. The analysis may weight utilization of the data records 168 and/or historical summaries from each geographic region of the super-region based on one or more of age of the data records and/or historical summaries, a data collection accuracy estimate, a data owner identifier, an indicator of differences between previous predictions and measured results, and a distance of the geographic region to the region of interest. For example, the analyzing module may apply higher weight to utilization of data records of geographic regions that are immediately adjacent to the region of interest than other geographic regions that are not immediately adjacent to the region of interest.

The results of agricultural lifecycle includes one or more of absolute crop yield levels for each of the candidate crop types, normalized crop yield rates for each of the candidate crop types, and a return on investment (ROI) level for each of the candidate crop types. The associated conditions include one or more of, for each result, a weather pattern, a planting cycle template identifier, a water supply level, and a list of steps and actions of a previous agricultural lifecycle. For example, the analyzing module analyzes the data records 168 and the historical summaries to produce results that indicate that a crop yield rate for beans is 10% higher than average when a rainfall weather pattern is average over the super-region. As another example, the analyzing module 81 analyzes the data records 168 and the historical summaries to produce results that indicates that a crop yield rate for corn is 15% higher than average when the rainfall weather pattern is 8-10% drier than average over the super-region.

The analysis summary generating module 82 obtains one or more super-region analysis sets 170 and, for similar conditions, compares results of two or more crop types to produce a super-region analysis summary 172. For example, the analyzing module 81 analyzes the data records 168 and the historical summaries to produce results that indicate that an ROI for beans is 9% higher than an ROI for corn when a rainfall weather pattern is average in geographic region 9. As another example, the analyzing module 81 analyzes the data records 168 and the historical summaries to produce results that indicates that ROI for corn is 16% higher than beans when the rainfall weather pattern is 8-10% drier than average in geographic region 9. The analysis summary generating module 82 may send the super-region analysis summary 172 to the historical summarizing module 88 to facilitate storage of the super-region analysis summary 172 in the memory 58 as a historical analysis summary.

The prescription generating module 84 obtains the super-region analysis summary 172. The prescription generating module 84 may further obtain geographic region 9 historical summaries from the history summarizing module 88. Having obtained the super-region analysis summary 172 and the geographic region 9 historical summaries, the prescription generating module 84 generates a prescription for geographic region 9 based on the super-region analysis summary 172 and the geographic region 9 historical summaries, where the prescription includes a crop type recommendation for each of one or more sets of conditions. The prescription may further include one or more of steps, actions, and associated conditions of the agricultural lifecycle. For example, the prescription includes a recommendation for a first segment of a drive path to plant beans for a first 3,000 feet and then to plant corn for a next 2,280 feet. The prescription may further include other actions associated with the agricultural lifecycle, such as, applying fertilizer in accordance with optimizing fertilizer-based results based on the super-region analysis summary 172.

FIG. 13B is a diagram illustrating an example of producing a super-region analysis 172. Data records and/or historical summaries are analyzed for a super-region 166 to produce the super-region analysis 172, where the analysis includes a portrayal of the super-region where the portrayal indicates areas of common results. A result of the common results may represent a normalized outcome over an associated portion of the geographic region for a particular crop type and associated conditions. Alternatively, the results may represent a difference between at least two crop choices where a higher level indicates more favorable results for one of the two crop choices. For example, a results 1 portion indicates an area of the super-region where a lowest return on investment (ROI) is realized for soybeans (e.g., beans), a results 2 portion indicates an area of the super-region where an ROI advantage exists for corn over beans for similar conditions, and a results 3 portion indicates an area of the super-region where an ROI for beans is greater than corn. The ROI may be based on one or more of past yield rates, estimated yield rates, past pricing levels, estimated future pricing levels, estimated weather conditions, and any other conditions and/or factors that play into a calculation of ROI.

FIG. 13C is a diagram illustrating an example of producing a super-region analysis summary 172. A plurality of super-region analysis outcomes are obtained and utilized to generate the super-region analysis summary 172, where the summary, for similar conditions, compares two or more crops to highlight which of the two or more crops produces more optimal results. For example, a super-region analysis for corn hybrid 457 in terms of an ROI under a wet weather condition set 1, a super-region analysis for beans hybrid 106 in terms of an ROI under the wet weather condition set 1, a super-region analysis for the corn hybrid 457 in terms of an ROI under a dry weather condition set 1, and a super-region analysis for beans hybrid 106 in terms of an ROI under the dry weather condition set 1 are all compared to produce the super-region analysis summary for a given wet condition or dry condition. As illustrated, a portion of the super-region corresponds to where beans have a more optimal ROI over corn and another portion of the super-region corresponds to where corn has a more optimal ROI over beans for similar weather conditions.

FIG. 13D is a diagram illustrating an example of producing an agricultural prescription for a geographic region. A super-region analysis summary 172 is analyzed to generate an agricultural prescription for a region of interest (e.g., geographic region 9), where the prescription includes a crop type recommendation for given conditions. The prescription may further include steps and/or actions of an agricultural lifecycle. For example, the prescription for geographic region 9 indicates a portion of the geographic region 9 where beans hybrid 106 shall be planted and another portion of the geographic region 9 where corn hybrid 457 shall be planted to optimize overall return on investment.

FIG. 13E is a flowchart illustrating an example of generating an agricultural prescription. The method begins or continues at step 174 where an analyzing module selects a super-region based on an analysis request. The analysis request may include identifiers of two or more candidate crop types, and conditions for comparison. The selecting may include receiving a region of interest, identifying one or more adjacent regions to the region of interest, aggregating the adjacent regions and region of interest to produce the super-region. The method continues at step 176 where the analyzing module obtains history summaries for the super-region. The history summaries include one or more of current data records for a current year and historical summaries for previous years. The obtaining includes one or more of receiving the summaries, initiating a request, and receiving a response.

The method continues at step 178 where, for each candidate crop type, the analyzing module analyzes portions of the history summaries to produce a super-region analysis that includes results and associated conditions. For example, the analyzing module identifies desired results categories, and for each desired result category, analyzes one or more of the data records and/or the historical summaries to produce results (e.g., yield rates, ROI), and identifies associated conditions for the results. The method continues at step 180 where an analysis summary generating module obtains the super region analysis. The obtaining includes one or more of receiving the analysis, initiating a request, and receiving a response.

For each of a range of conditions of a plurality of condition ranges, the method continues at step 182 where the analysis summary generating module compares the results for two or more crops of the candidate crops to produce an analysis summary. For example, the analysis summary generating module identifies areas of optimal results for each of the candidate crop types. The method continues at step 184 where a prescription generating module obtains the analysis summary. The obtaining includes at least one of receiving the summary, initiating a request, and receiving a response.

The method continues at step 186 where the prescription generating module generates a prescription with regards to crop type selection based on the analysis summary for at least one common condition range. For example, the prescription generating module selects, based on estimated conditions for a current year, a crop type for different sub-regions of the geographic region of interest based on the analysis summary. Alternatively, or in addition to, the prescription generating module may further generate the prescription to include a steps template of an agricultural lifecycle based on steps of the history summaries and associated results.

FIG. 14A is a schematic block diagram of another embodiment of an application processing module that includes the analyzing module 81 of FIG. 9, the analysis summary generating module 82 of FIG. 9, the prescription generating module 84 of FIG. 9, the data collecting module 86 of FIG. 9, the history summarizing module 88 of FIG. 9, and the memory 58 of FIG. 9. In an example of operation, the analyzing module 81 receives a request for guidance for a region of interest (e.g., geographic region 9). The request includes a request to optimize the steps of an agricultural lifecycle with regards to planting and harvesting a desired crop type within the region of interest.

The analyzing module 81 obtains data records 190 and historical summaries 192 for the region of interest. For example, the analyzing module issues a data records request for the geographic region 9 to the data collecting module 86 and receives region 9 data records in response. As another example, the analyzing module 81 issues a historical summary request to the history summarizing module 88 for historical summaries of geographic region 9 and receives the geographic region 9 historical summaries where the summaries includes past agricultural prescriptions for the geographic region of interest.

Having obtained the data records and the historical summaries, the analyzing module 81 analyzes the data records and/or the historical summaries to produce a region 9 analysis, where the analysis includes results (e.g., return on investment (ROI), crop yield rates, efficiency, soil erosion levels, time efficiency levels, etc.) of one or more previous planting cycles for a plurality of planting approaches. The planting approaches include one or more of a direction of a drive path for a portion of the region of interest (e.g., traversing a contour pattern), planting depth versus a contour gradient, and a planting volume for the portion of the region of interest (e.g., seeds per acre). For example, the analyzing module generates an ROI for a planting approach that includes a drive path planting pattern that follows contour curves. As another example, the analyzing module generates an ROI for a planting approach that includes a drive path planting pattern that cuts diagonally across a downward sloping contour curve. As yet another example, the analyzing module generates an ROI for a planting approach that includes a drive path planting pattern that cuts horizontally across the downward sloping contour curve.

The analysis summary generating module 82 obtains one or more region 9 analysis sets and, for similar conditions, correlates the planting approaches to associated results for various conditions to produce a region 9 analysis summary. For example, the analysis summary generating module 82 produces the region 9 analysis summary to indicate that, for average rainfall years, the drive path that includes following the contour curves is associated with optimized results, and, for below average rainfall years, the drive path that cuts diagonally across the country curves is associated with the optimized results. The analysis summary generating module 82 may send the region 9 analysis summary to the historical summarizing module 88 to facilitate storage of the region 9 analysis summary in the memory 58 as historical summaries 192.

The prescription generating module 84 obtains the region 9 analysis summary. The prescription generating module 84 may further obtain geographic region 9 historical summaries from the history summarizing module 88. Having obtained the region 9 analysis summary and the geographic region 9 historical summaries, the prescription generating module 84 generates a prescription for geographic region 9 based on the region 9 summary and the geographic region 9 historical summaries, where the prescription includes recommended drive paths for a portion of the geographic region 9 for similar conditions. The generating may include determining conditional probabilities for drive path scenarios that optimize various contour scenarios for particular crop types, obtaining a topographic map for the region of interest, and generating the prescription that includes recommended drive paths for one or more portions of the geographic region 9 based on contour information of the topographic map and the conditional probabilities.

FIG. 14B is a diagram illustrating an example of a drive path agricultural prescription. The drive path agricultural prescription includes a topographic map of geographic region 9, where portions of the geographic region 9 each include a prescription for geographic region 9 drive paths. For example, a northwest (e.g., upper left) portion of the geographic region 9 includes a prescription that includes a drive path recommendation for north-south paths. As another example, a southeast (e.g., lower right) portion of the geographic region 9 includes a prescription that includes a drive path recommendation for west-east paths, etc.

FIG. 14C is a flowchart illustrating another example of generating an agricultural prescription for a geographic region. The method begins or continues at step 194 where an analyzing module analyzes a plurality of data records to produce corresponding results for one or more planting cycles of a geographic region of interest. The data records may include current agricultural cycle data and past historical summaries of previous planting cycles. For example, the analyzing module produces crop yield results for various portions of the geographic region of interest for each planting cycle.

The method continues at step 196 where the analyzing module identifies one or more planting approaches associated with the corresponding results of each of the one or more planting cycles. For example, the analyzing module identifies drive path approaches versus contour of typography for a range of yield information (e.g., planting down a hill, planting up a hill, and planting across a hill). The method continues at step 198 where the analyzing module identifies, for each of the one or more planting approaches, common conditions associated with each of the one or more planting cycles. For example, the analyzing module extracts planting information from the data records, where the planting information includes one or more of a crop type, a soil type, a moisture content level, a number of rain days, a number of sun days, and timing of steps of an agricultural lifecycle.

The method continues at step 200 where an analysis summary generating module correlates, for each planting approach, the corresponding results and the common conditions to produce a results estimate for the planting approach based on a range of common conditions. For example, the analysis summary generating module, for each planting approach, identifies optimal crop yield rates from results for a given range of common conditions.

The method continues at step 202 where a prescription generating module generates conditional results probabilities for each planting approach based on the range of common conditions. For example, the prescription generating module performs trend analysis on results estimates for each occurrence of a planning cycle associated with the common range of conditions. The method continues at step 204 where the prescription generating module generates a planting prescription for the geographic region of interest based on the conditional results probabilities for a requested crop type, where the prescription includes a recommended planting approach. For example, the prescription generating module indicates drive paths on a topographic map of the geographic region of interest, where the drive paths are associated with an optimization of crop yields using the conditional results probabilities.

FIG. 15A is a diagram illustrating another relationship between the user device 1-1A of FIG. 7, one or more desired crops 210, one or more desired plants 212, one or more undesired plants 214, debris 216, and the tracks 1-7 of FIG. 7 along the drive path 1-1-1 of FIG. 7 within a data capture zone 1-1. The user device 1-1A includes the sensor array of FIG. 7 and an application processing module 218. The application processing module 218 may be implemented utilizing the application processing module 34 of FIG. 4.

The desired crop 210 includes subsequent crop growth resulting from previous planting of seeds of the desired crop. The desired plant 212 includes a plant that while not a desired crop is not undesirable (e.g., a cover crop). As such, the desired plant may favorably affect the desired crops (e.g., enhancing soil nutrients, favorably affecting soil erosion, etc.). The undesired plant 214 includes any plants that may unfavorably affect the desired crops (e.g., weeds that consume water and nutrients). The debris 216 includes any other object that may unfavorably affect steps of an agricultural lifecycle and/or results of the agricultural lifecycle. Examples of the debris 216 includes one or more of a rock, a tree branch, a bottle, paper waste, a plastic bag, etc.

The user device 1-1A is operable to capture sensor data 222 associated with one or more of the desired crop 210, the desired plant 212, the undesired plant 214, and the debris 216 as the user device 1-1A traverses the drive path 1-1-1 through the data capture zone 1-1. The one or more of the desired crop 210, the desired plant 212, the undesired plant 214, and the debris 216 may hereafter be interchangeably referred to as objects. The user device 1-1A may further function to detect and/or identify the objects.

In an example of operation of detecting an object of the objects, two or more sensors capture sensor data 222 associated with the object. The application processing module 218 analyzes captured sensor data 1 from sensor 1 to detect the object. For example, the application processing module 218 compares the sensor data 1 to a sensor data pattern for a non-object reference (e.g., background with no object present) and indicates that the object is detected when the sensor data 1 compares unfavorably to the sensor data pattern for the non-object reference. As another example, when the sensor data 1 compares unfavorably to the sensor data pattern for the non-object reference, the application processing module compares sensor data 2 from sensor 2 to the sensor data pattern for the non-object reference and indicates that the object is detected when both the sensor data 1 and sensor data 2 compares unfavorably to the sensor data pattern for the non-object reference.

In an example of operation of identifying the object, the application processing module 218 analyzes captured sensor data 1 from sensor 1 to identify the object. The analyzing may be in accordance with an associated agricultural prescription 220, where the agricultural prescription 220 indicates one or more of a desired crop type (e.g., corn was planted), a desired plant type (e.g., a cover crop species), an expected undesired plant (e.g., a particular weed associated with the data capture zone 1-1), and expected debris (e.g., types of rocks associated with the data capture zone 1-1). For example, the application processing module 218 compares the sensor data 222 to a sensor data pattern for the object and indicates that the object is detected when the sensor data 222 compares favorably to the sensor data pattern for the object. For example, the application processing module 218 compares an image from sensor 1 to a stored image of a first desired crop associated with the agricultural prescription 220 (e.g., a corn stock image when corn was previously planted) and indicates that the object has been identified as the corn stock when the image from sensor 1 compares favorably to the stored image of the corn stock.

The application processing module 218 detects objects and/or identifies objects along the tracks 1-7 and may, based on a trigger, output and/or locally store sensor data 222 that includes one or more of sensor output, indications of detected objects, identities of identified objects, and statistics associated with each type of object for at least a portion of the data capture zone 1-1. The trigger may be based on one or more of an elapsed time since a previous trigger, a distance traveled since a last trigger, detection of an object, identification of a particular object type, and detecting sensor data 222 the compares favorably to a sensor data precondition threshold level.

The application processing module 218 may further analyze sensor data 222 to characterize objects to produce object characteristics (e.g., physical characteristics). The statistics includes one or more of a number of objects per unit of measure (e.g., distance, time), a number of identified objects by object type per unit of measure, and object characteristics by object type (e.g., average corn stock width, minimum corn stock width, maximum corn stock width, average corn stock moisture level, average estimated yield).

FIG. 15B is a schematic block diagram of another embodiment of the application processing module 218 of FIG. 15A that includes two or more object detection modules, two or more object identification modules, and two or more object characterization modules. Each object detection module is operably coupled to a sensor of a sensor array associated with the user device 1-1A of FIG. 15A. The application processing module 218 is operable to detect and identify objects within an operational area of at least one sensor of the sensor array to produce sensor data 222.

In an example of operation, a desired crop 210 is within the operational area of sensor 1, a desired plant 212 is within the operational area of sensors 1-2, and another desired crop 210 is within the operational area of sensor 2. Alternatively, an object may be within the operational area of each of any number of sensors of the sensor array. The object detection module 1 analyzes sensor data 1 from sensor 1 to produce object info 1 when an object is detected (e.g., either or both of the desired crop 210 and the desired plant 212 are detected). The object information 1 includes a subset of the sensor data 1 that is associated with the detected object(s) and an indication of the detected object(s). For example, the object detection module 1 indicates that an object is detected when the sensor data 1 compares unfavorably to a background sensor data template with no objects present. Similarly, the object detection module 2 analyzes sensor data 2 from sensor 2 to produce object info 2 when either or both of the desired plant and the other desired crop are detected.

The object identification module 1 analyzes object information from one or more object detection modules in accordance with a prescription 220 to identify the detected object and produce identified object information 1. For example, the object identification module 1 compares object info 1 to a series of sensor data templates associated with the prescription to pre-identify the detected object and compares object info 2 to a particular sensor data template associated with the pre-identification of the detected object to produce the identified object information 1. The identified object information 1 includes one or more of an object type indicator (e.g., desired crop identifier (ID), desired plant ID, undesired plant ID, debris ID) and a portion of one or more of the object information 1 and the object information 2.

The object characterization module 1 analyzes the identified object information 1 to produce object characterization information 1 of the sensor data 222, where the object characterization information 1 includes one or more of object characteristics, objects statistics (e.g., corn stock width, etc.), the object type indicator, and the identified object information 1. The analyzing may include analyzing object information from two or more sensors to produce the object characteristics. For example, the object characterization module 1 compares images of a detected corn stock from sensors 1 and 2 to a stock width calibration image to determine the corn stock width.

FIG. 15C is a flowchart illustrating an example of digitizing objects within a geographic region. The method begins or continues at step 224 where a processing module (e.g., an application processing module) selects a plurality of sensors for analyzing objects within a geographic region. The selecting may be based on one or more of identifying crop types from an associated agricultural prescription and identifying sensor types based on the identified crop types, performing a lookup, initiating a request, initiating a query, receiving a query response, detecting an available sensor, and interpreting a predetermination.

The method continues at step 226 where the processing module obtains sensor data from at least some of the plurality of sensors. The obtaining includes at least one of receiving the sensor data, initiating a query, receiving a query response that includes the sensor data, and accessing a memory. The method continues at step 228 where the processing module analyzes the sensor data from one or more of the sensors to detect an object. The analyzing includes one or more of comparing the sensor data to a predetermined sensor data template that corresponds to a background without an object present, comparing the sensor data to a sensor data table, and detecting the object utilizing two or more sensor types (e.g., a camera image and radar).

The method continues at step 230 where the processing module generates object information for the detected object. For example, the processing module identifies a subset of the sensor data that is associated with the detected object. For the detected object, the method continues at step 232 where the processing module identifies the detected object based on the sensor data from at least some of the one or more sensors, the object information, and an associated agricultural prescription. For example, the processing module analyzes the object information and or additional sensory data utilizing an object identification algorithm, where the algorithm may utilize an object type bias pattern obtained from the prescription. The object identification algorithm may include indicating the identified object when a pattern of the object information substantially matches the pattern of the object type.

The method continues at step 234 where the processing module generates identified object information for the identified detected object. For example, the processing module generates the identified object information to include the object type and the object information for the detected object. The method continues at step 236 where the processing module analyzes the identified object information to produce object characterization information. For example, the processing module compares the object information and/or additional sensory data using an object characterization algorithm to produce the object characterization information. The object characterization algorithm includes indicating a characteristic when a pattern of the object information substantially matches a pattern of a characteristic. The object characterization includes one or more of the object type, the object information, and the object characterization information.

The method continues at step 238 where the processing module outputs one or more of the sensor data, the object information, the identified object information, and the object characterization information. The outputting includes one or more of receiving a request for the sensor data, executing autonomous outputting, locally storing the sensor data, sending the sensor data to a storage unit, sending the sensor data to a requesting user device, and sending the sensor data to a requesting application unit.

FIG. 16A is a schematic block diagram of another embodiment of an application processing module that includes the analyzing module 81 of FIG. 9, the analysis summary generating module 82 of FIG. 9, the prescription generating module 84 of FIG. 9, the data collecting module 86 of FIG. 9, the history summarizing module 88 of FIG. 9, and the memory 58 of FIG. 9.

In an example of operation, the analyzing module 81 receives a request for guidance for a region of interest (e.g., geographic region 9). The request includes a request to optimize the steps and/or actions of the agricultural lifecycle with regards to planting and harvesting a desired crop type within the region of interest. The analyzing module 81 obtains data records and historical summaries for the region of interest. For example, the analyzing module 81 issues a data records request for the geographic region 9 to the data collecting module 86 and receives region 9 data records (e.g., which may include current and/or live sensor data 250) in response. For instance, the data collecting module 86 retrieves data records 252 from the memory 58, and extracts the region 9 data records from the retrieved data records 252, and sends the region 9 data records to the analyzing module 81. As another example, the analyzing module 81 issues a historical summary request to the history summarizing module 88 for historical summaries of geographic region 9 and receives the geographic region 9 historical summaries where the summaries includes past agricultural prescriptions for the geographic region of interest. For instance, the history summarizing module 88 retrieves historical summaries 254 from the memory 58, extracts the geographic region 9 historical summaries from the historical summaries 254, and sends the geographic region 9 historical summaries to the analyzing module 81.

Having obtained the data records and the historical summaries, the analyzing module 81 analyzes the data records and/or the historical summaries to produce a region 9 analysis, where the analysis includes results (e.g., return on investment (ROI), crop yield rates, efficiency, etc.) of one or more previous planting cycles for a plurality of planting approaches. The planting approaches includes one or more of a direction of a drive path for a portion of the region of interest (e.g., traversing a contour pattern), a drive path speed, planting depth versus a contour gradient, and a planting volume for the portion of the region of interest (e.g., seeds per acre). For example, the analyzing module 81 generates an ROI for a planting approach that includes a first drive path speed range for a prescribed drive path within a first portion of the region of interest. As another example, the analyzing module generates another ROI for another planting approach that includes a second drive path speed range for the prescribed drive path within the first portion of the region of interest. As yet another example, the analyzing module 81 generates yet another ROI for yet another planting approach that includes the first drive path speed range for another prescribed drive path within a second portion of the region of interest.

The analysis summary generating module 82 obtains one or more region 9 analysis sets and, for similar conditions, correlates the planting approaches to associated results for various conditions (e.g., including current and/or future conditions) to produce a region 9 analysis summary. For example, the analysis summary generating module 82 produces the region 9 analysis summary to indicate that, for average rainfall years, the first drive path speed range utilized on the first portion of the region of interest is associated with optimized results, and, for below average rainfall years, the second drive path speed range utilized on the first portion of the region of interest is associated with the optimized results. The analysis summary generating module 82 may send the region 9 analysis summary to the history summarizing module 88 to facilitate storage of the region 9 analysis summary in the memory 58 as a portion of the historical summaries 254.

The prescription generating module 84 obtains the region 9 analysis summary. The prescription generating module 84 may further obtain geographic region 9 historical summaries from the history summarizing module. Having obtained the region 9 analysis summary and the geographic region 9 historical summaries, the prescription generating module 84 generates a prescription for geographic region 9 based on the region 9 summary and the geographic region 9 historical summaries, where the prescription includes recommended drive path speed ranges for portions of the geographic region 9 for similar conditions. The generating may include determining conditional probabilities for drive path speed range scenarios that optimizes results for particular crop types, obtaining a topographic map for the region of interest, and generating the prescription that includes recommended drive path speed ranges for multiple portions of the geographic region 9 based on contour information of the topographic map and the conditional probabilities. Alternatively, or in addition to, the generating may be based on updating the region 9 data records to include current sensor data. For example, the prescription generating module 84 updates the prescription for geographic region 9 to include lowering the drive path speed range to optimize results in accordance with the conditional probabilities when current sensor data indicates that soil moisture is below average by 20% (e.g., based on farming machinery chatter detected by the sensor array).

FIG. 16B is a diagram illustrating an example of a drive speed agricultural prescription. The drive path agricultural prescription includes a topographic map of geographic region 9, where portions of the geographic region 9 each include a prescription for geographic region 9 drive paths. For example, a region 9-1 of the geographic region 9 includes a prescription that includes a 5-7 miles per hour (MPH) drive path speed range recommendation to optimize results of the agricultural cycle when the expected rainfall cycle is average. As another example, a region 9-2 of the geographic region 9 includes a prescription that includes a 9-11 miles per hour (MPH) drive path speed range recommendation to optimize results of the agricultural cycle when the current soil moisture is 10% more moist than average, etc.

FIG. 16C is a flowchart illustrating an example of determining a drive speed for an agricultural prescription. The method begins or continues at step 256 where an analyzing module analyzes a plurality of data records to produce corresponding results for one or more planting cycles. For example, the analyzing module generates results for the one or more planting cycles that includes crop yield information based on one or more of a crop type, typography, a drive path speed range, and other conditions (e.g., weather, a soil moisture range, etc.). The one or more planting cycles may include a current planting cycle. When the current planting cycles included, the plurality of data records includes current data records based on current sensor data. For example, the current sensor data includes life readings for one or more of soil moisture, weather conditions, accelerometer data, location information, etc.

The method continues at step 258 where the analyzing module identifies one or more planting speed ranges associated with the corresponding results of each of the one or more planting cycles. For example, the analyzing module determines drive path speed ranges for ranges of the crop yield information by portion of a geographic region of interest. The method continues at step 260 where the analyzing module identifies, for each of the one or more planning speed ranges, common conditions associated with each of the one or more planting cycles. For example, the analyzing module extracts the common conditions from one or more of the data records and/or historical summaries. For instance, the analyzing module extracts crop type, soil type, soil moisture level, number of rain days, number of sun days, and planting calendar timing with respect to steps of an agricultural lifecycle. In an example of identifying the common conditions associated with the one or more planting cycles, the analyzing module identifies, for a first set of conditions, optimal crop yields occur for a portion of a geographic region with a drive path speed range of 5-7 miles per hour (MPH). In another example, the analyzing module identifies, for a second set of conditions (e.g., current conditions), the optimal crop yields occur for the portion of the geographic region with a drive path speed range of 8-12 MPH.

The method continues at step 262 where an analysis summary generating module correlates, for each planning speed range, the corresponding results and the common conditions to produce a result estimate for the planning speed range based on a range of common conditions. For example, the analysis summary generating module, for each planning speed range, identifies optimal crop yields from the results for a given range of common conditions. The method continues at step 264 where the prescription generating module generates conditional results probabilities for each planning speed range based on the range of common conditions. For example, the prescription generating module performs a trend analysis on results estimates for each occurrence of a planting cycle in the common range of conditions to produce the conditional results probabilities. For instance, the prescription generating module generates the conditional results probabilities to indicate that a highest range of conditional probability is associated with the drive path speed range of 8-12 MPH to produce the optimal crop yields for the portion of the geographic region with when associated with the second set of conditions.

The method continues at step 266 where the prescription generating module generates a planting prescription for a requested geographic region based on the conditional results probabilities for a requested crop type, where the prescription includes a recommended planting speed range. For example, the prescription generating module indicates the drive path speed ranges for drive paths on a topographic map of the requested region, where the drive path speed ranges are associated with an optimization of crop yield rates using the conditional results probabilities.

FIG. 17A is a diagram illustrating another relationship between the user device 1-1A of FIG. 11, the actuator set 92 of FIG. 11, and the tracks 1-7 of FIG. 11 along the drive path 1-1-1. The user device 1-1A includes the application processing module 34 of FIG. 4 and the sensor array of FIG. 11. The application processing module 34 functions to encode data into a planting pattern and to decode the planting pattern to recover the data.

In an example of the encoding the data into the planting pattern, the application processing module 34 selects data for encoding to produce selected data. The data may include one or more of a crop hybrid identification number, a crop type indicator, a geographic region identifier, a present date, a date of a step of an agricultural prescription 270, an identifier of the agricultural prescription, a corn maze pattern, and ornamental crop pattern, and any other data item or pattern for encoding related to agriculture. The selecting includes one or more of receiving a user input, receiving a request, and interpreting the agricultural prescription 270.

Having selected the data, the application processing module 34 encodes the selected data using a coding scheme to produce a planting pattern for a portion of a geographic region. The encoding includes transforming a portion of the selected data into a corresponding planting pattern symbol, where the planting pattern symbol includes a track planting pattern for one or more tracks of at least a portion of an encoded zone. A track planting pattern includes one or more crop groups and one or more gaps between the one or more crop groups. Each crop group includes one or more of a number of plants, a length of the crop group, a density of the crop group, and a crop type indicator. Each gap includes one or more of a length of the gap, an alternate plant type indicator, a number of alternate plants, and a density of the alternate plants. The coding scheme may include one or more of a quick response code format, a barcode format, and any other scheme to encode data into a geographic pattern that includes plants that are planted in one or more substantially parallel tracks along a drive path. For example, a first planting pattern symbol includes a crop group 1-1 for 15 inches in length along track 1 filed by a gap 1-1 of 19 inches followed by a crop group 1-2 of 14 inches in length over the encoded zone 1-1.

Having encoded the selected data to produce the planting pattern for the portion of the geographic region, the application processing module 34 facilitates planting across the encoded zone in accordance with the planting pattern for the portion. For example, the application processing module 34 detects the portion of the geographic region (e.g., present location information matches a beginning of the portion), translates the planting pattern into control information 272, and outputs the control information 272 to the actuator set 92 such that actuators of the actuator set 92 plant in accordance with the planting pattern for the portion.

In an example of decoding the planting pattern to recover the data, the application processing module 34 obtains raw sensor data from the sensor array for the portion of the geographic region. For example, the application processing module 34 detects the encoded zone and receives the front sensor data from the sensor array. Having obtained the raw sensor data, the application processing module interprets the raw sensor data to detect the planting pattern. For example, the application processing module 34 detects the crop groups and the gaps between crop groups of each of the tracks 1-7, and matches the detected crop groups and gaps to planting pattern symbols of the coding scheme to produce planting pattern symbols of the planting pattern.

Having produced the planting pattern symbols, the application processing module 34 decodes the detected planting pattern using the coding scheme to produce recovered data. For example, the application processing module 34 interprets the planting pattern symbols using the coding scheme to produce the recovered data. Having produced the recovered data, the application processing module 34 outputs sensor data 274 that includes one or more of the recovered data and the raw sensor data. The outputting may include one or more of presenting a portion of the data via a user interface, triggering execution of a corresponding agricultural prescription, and sending the recovered data to another application processing module 34 as the sensor data 274.

FIG. 17B is a diagram illustrating another embodiment of a drive path 1-1 for an associated geographic region 1-1 that includes a series of drive paths, where each drive path includes a set of tracks. The series of drive paths includes an encoded zone 1-1 and a non-encoding encoded planting pattern 276. The non-encoded planting pattern 276 includes a planting pattern for one or more desired crops and does not include planting pattern symbols in accordance with encoded data. The encoded zone 1-1 includes the planting pattern symbols in accordance with the encoded data.

An example of operation, a user device associated with farming machinery traverses the series of drive paths. The traversing of the drive paths includes traversing the encoded zone 1-1. When traversing the encoded zone 1-1, the user device detects the planting pattern symbols and decodes the planting pattern symbols to produce recovered data. As a specific example, the farming machinery enters the geographic region 1-1 via the encoded zone 1-1, produces the recovered data, extracts a crop hybrid indicator from the recovered data, and displays the crop hybrid indicator on a user interface associated with the user device and/or another user device associated with the farming machinery. As another specific example, the farming machinery enters the geographic region 1-1 via the encoded zone 1-1, produces the recovered data, extracts an agricultural prescription identifier from the recovered data, and facilitates a next agricultural lifecycle step in accordance with the agricultural prescription (e.g., automatically applies a desired amount of fertilizer across desired portions of the geographic region based on the agricultural prescription).

FIG. 17C is a flowchart illustrating an example of coding data as a planting pattern, where when encoding the data, the method begins or continues at step 278 where a processing module (e.g., of an application processing module) selects data for encoding. The selecting may include at least one of interpreting a prescription and receiving a user input. The method continues at step 280 where the processing module encodes the selected data using a coding scheme to produce a planting pattern for a portion of a geographic region. For example, the processing module selects the coding scheme based on one or more of an identifier of the geographic region, a crop type, and a coding scheme compatibility factor. Having selected the coding scheme, the processing module encodes the data utilizing the coding scheme to produce planting pattern symbols of the planting pattern. Alternatively, the processing module may produce more than one planting pattern.

When planting the portion of the geographic region, the method continues at step 282 where the processing module facilitates the planting in accordance with the planting pattern. For example, the processing module detects planting the portion of the geographic region (e.g., based on a favorable comparison of location information of the portion of the geographic region to current location information), transforms the planting pattern into control information, and outputs the control information to one or more actuators to facilitate the planting of desired plants in accordance with the planting pattern. As another example, the processing module receives a machine-readable prescription that includes the control information and outputs the control information to the one or more actuators.

When decoding the planting pattern to recover the data, the method continues at step 284 where the processing module obtains sensor data from a sensor array associated with the portion of the geographic region. The obtaining includes at least one of detecting proximity to the portion of the geographic region, initiating a query, receiving a query response, and receiving the sensor data. The method continues at step 286 where the processing module interprets the sensor data to produce a detected planting pattern. The interpreting includes one or more of determining a number of plants within an expected distance of a crop group; determining a length of the crop group; determining a length of a gap between the crop groups; and matching a pattern of the lengths of the crop groups, the number of crop groups, and the gaps between the crop groups to profiles of planting pattern symbols to identify planting pattern symbols of the detected planting pattern.

The method continues at step 288 where the processing module decodes the detected planting pattern in accordance with the coding scheme to produce recovered data. For example, the processing module obtains the coding scheme (e.g., a lookup), interprets the identified planting pattern symbols using the coding scheme to produce portions of the recovered data, and aggregates portions of the recovered data to produce the recovered data.

The method continues at step 290 where the processing module outputs the recovered data. The outputting includes one or more of receiving a request from a requesting entity, outputting the recovered data to the requesting entity, outputting the recovered data to a user interface output, sending that recovered data to another application processing module, and sending the recovered data to a storage unit.

FIG. 18A is a diagram illustrating another relationship between the user device 1-1A of FIG. 11, the actuator set 92 of FIG. 11, and the tracks 1-7 of FIG. 11 along the drive path 1-1-1. The user device 1-1A includes the application processing module 34 of FIG. 4 and the sensor array of FIG. 11. The application processing module 34 functions to align the tracks 1-7 with drive paths. The aligning includes producing an end of drive path indicator and subsequent detection of the drive path indicator to facilitate the aligning of the tracks 1-7 with a next drive path.

In an example of operation of the producing the end of drive path indicator, the application processing module 34, while planting along a set of tracks along a drive path, detects an end of the drive path. For example, the application processing module 34 indicates that the end of the drive path has been detected when current location information compares favorably to predetermined location information associated with the end of the drive path that is associated with the drive path.

Having detected the end of the drive path, the application processing module facilitates planting along the set of tracks in accordance with an end of drive path planting pattern to produce the end of drive path indicator. The end of drive path planting pattern includes one or more agricultural lifecycle steps with regards to planting plants across one or more of the tracks of the set of tracks. For example, the end of drive path planting pattern includes suspending planting on all but one track, where the one track (e.g., track 7) is at an edge bordering next to a corresponding track (e.g., track 7) of the next drive path (e.g., drive path 1-1-2). As another example, the end of drive path planting pattern includes suspending planting one track prior to a row end (e.g., 1 foot), where the one track (e.g., track 7) is at the edge bordering next to the corresponding track (e.g., track 7) of the next drive path (e.g., drive path 1-1-2).

As a specific example of the planting in accordance with the end of drive path planting pattern, the application processing module 34 obtains the end of drive path planting pattern (e.g., from an agricultural prescription 300, from a predetermined list) and sends control information 302 to the actuator set 92 (e.g., attached to a planter), where the control information 302 includes the end of drive path planting pattern such that the actuator set 92 plants in accordance with the end of drive path planting pattern. For instance, tracks 1-6 stop planting and track 7 continues planting for one more foot to produce an edge of drive path indicator 1-1-1. As another instance, tracks 1-5 stop planting and tracks 6-7 continues planting for the one more foot to produce the edge of drive path indicator 1-1-1. As yet another instance, track 7 stops planting 1 foot early and tracks 1-6 stop planting at the end of the drive path to produce the edge of drive path indicator 1-1-1. As a still further instance, tracks 1-3 and 5-6 stop planting at the end of the drive path and tracks 4 and 7 continue planting for the one more foot to produce the edge of drive path indicator 1-1-1 (e.g., which includes an indicator in the middle to facilitate subsequent detection utilizing the sensor array when attached to a combine, where the planter is twice the width of the combine).

In an example of operation of the subsequent detection of the drive path indicator to facilitate the aligning of the tracks 1-7 with the next drive path, the application processing module 34 obtains raw sensor data from the sensor array. As a specific example, the application processing module 34 receives the raw sensor data when next steps of the agricultural lifecycle include continuing to plant. As another specific example, the application processing module 34 receives the raw sensor data when the next steps of the agricultural lifecycle include other steps beyond planting (e.g., subsequent traversals of the drive path for fertilizing and/or harvesting).

Having obtained the raw sensor data, the application processing module 34 interprets the raw sensor data to detect the end of drive path planting pattern. The interpreting includes comparing the raw sensor data from the sensor array to one or more planting patterns associated with the end of drive path planting pattern. For example, sensor data from sensor 7 detects the edge of drive path indicator 1-1-1 by detecting at least one of a pattern associated with a recent planting (e.g., minutes later) and a pattern associated with growing crops associated with a previous planting (e.g., weeks later after the previous planting).

Having detected the end of drive path planting pattern, the application processing module 34 obtains location information associated with the end of drive path planting pattern. The application processing module 34 interprets the location information associated with the end of drive path planting pattern to produce location information of an edge of a previous drive path. Having produced the location information of the edge of the previous drive path, the application processing module 34 facilitates alignment of traversing along the set of tracks of the next drive path utilizing the location information of the edge of the previous drive path. As a specific example, the application processing module 34 produces further control information 302 to adapt location of farming machinery using the location information of the edge of the previous drive path, outputs sensor data 304 that includes the control information 302 to the farming machinery, outputs an indicator to a user interface, and initiates a next step of a series of steps of an agricultural lifecycle when at a beginning of the next drive path.

FIG. 18B is a diagram illustrating another embodiment of a drive path 1-1 for an associated geographic region 1-1. The drive path includes a series of drive paths, where each drive path includes a set of tracks. Plants are planted along at least some of the tracks of the series of drive paths. The planting traverses the drive path and ends at a boundary of the geographic region. An end of each drive path is planted in accordance with an end of drive path planting pattern to produce at least one of an end of drive path indicator and an edge of drive path indicator. For example, an edge track (e.g., of a drive path that borders a corresponding edge of a next drive path) is planted with a track extension 1-1-1 at the end of a first drive path to provide an edge of drive path indicator 1-1-1. For instance, a seventh track is planted for an additional 3 feet beyond other tracks. Farming machinery, upon approaching a beginning of the next drive path, may be substantially aligned on the next drive path by detecting the end of drive path indicator of a previous drive path and adjusting positioning of the farming machinery such that a desired spacing between edge tracks of drive paths is achieved without undesired overlap and/or under lap.

As a specific example, the farming machinery traverses the first drive path, plants the track extension 1-1-1, turns around to face the beginning of the second drive path, detects the track extension 1-1-1, and adjusts the positioning of farming machinery to provide desired alignment of the tracks along the second drive path. For instance, the desired alignment includes achieving a distance of separation between the edge track of the first drive path and the corresponding edge track of the second drive path to be substantially the same as a distance of separation between each of the tracks within any given drive path.

FIG. 18C is a flowchart illustrating an example of aligning tracks of a drive path. The method begins or continues at step 306 where, when applying an end of drive path indicator, a processing module (e.g., an application processing module) detects an end of a drive path. For example, the processing module indicates the end of the drive path when present location information compares favorably to location information associated with the end of the drive path. As another example, the processing module indicates the end of the drive path when detecting a previous end of drive path planting pattern.

The method continues at step 308 where the processing module obtains an end of drive path planting pattern. The obtaining includes at least one of retrieving from an agricultural prescription and generating based on an attribute of the planting. The attribute includes one or more of a crop type, a geographical location identifier, and a present terrain type indicator. The method continues at step 310 where the processing module modifies planting along a set of tracks of the drive path in accordance with the end of drive path planting pattern. The modifying includes replacing the current planting pattern with the end of drive path planting pattern and outputting the end of drive path planting pattern to a set of actuators associated with farming machinery.

The method continues, when utilizing a detected end of drive path indicator, at step 312 where the processing module obtains sensor data from a sensor array. The obtaining includes one or more of receiving sensor data, initiating a query, receiving a query response, and accessing a storage unit. The obtaining may be associated with continuation of planting or for subsequent traversals of the drive path (e.g., associated with fertilizing, associated with harvesting).

The method continues at step 314 where the processing module interprets the sensor data to detect the end of drive path planting pattern. The interpreting includes one or more of detecting one or more crops, determining a relationship pattern of the one or more crops, comparing the relationship pattern to one or more expected relationship patterns of end of drive path planting patterns, and indicating detection of the end of drive path planting pattern when a comparison is favorable.

The method continues at step 316 where the processing module determines location information of an edge of a previous drive path based on the detected end of drive path planting pattern. For example, the processing module identifies an edge of the detected end of drive path planting pattern and determines location information corresponding to the identified edge.

The method continues at step 318 where the processing module facilitates traversing along a set of tracks of a next drive path based on the location information of the edge of the previous drive path. For example, the processing module generates alignment guidance information based on a current location and the location information of the edge of the previous drive path and outputs the alignment guidance. The outputting includes issuing a message to a user interface output (e.g., turn left, turn right, go straight, backup, set speed). The outputting may further include issuing control information to a set of actuators of the farming machinery to substantially automate the traversing along the set of tracks of the next drive path.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices affiliated with agriculture equipment, the method comprising:
    collecting, by the agriculture equipment, current on-site gathered agriculture data regarding an agriculture region;
    sending, by the agriculture equipment, at least a representation of the current on-site gathered agriculture data to a host device;
    wherein the host device performs an analysis function that includes historical agriculture data and performance of at least one of:
        a transformation operation executable by the one or more processing modules that encodes the agriculture data regarding the agriculture region and transforms a portion of the current on-site agriculture data to a corresponding planting pattern symbol, wherein the planting pattern symbol comprises a track planting pattern for one or more tracks of the agriculture region,
        an identification operation executable by the one or more processing modules that identifies an object associated with at least a portion of the current on-site agriculture data, wherein the object is detected by an object detection module operably coupled to a plurality of sensors associated with the host device and identified by an object identification module,
        a probability density generating operation executable by the one or more processing modules that generates a measurable parameter of density based on at least a portion of the current on-site agriculture data,
        a trend analysis operation executable by the one or more processing modules that analyzes estimates of a subset of at least a portion of the current on-site agriculture data, and generates an analysis summary based on at least a portion of the current on-site agriculture data and at least one performed operation;
    using the analysis summary to process, by the host device, at least one of the at least a representation of the current on-site gathered agriculture data, current off-site gathered agriculture data, historical on-site gathered agriculture data, historical off-site gathered agriculture data, and historical analysis of agriculture predictions regarding the agriculture region to produce a current agriculture prediction for the agriculture region;
    comparing the current agriculture prediction with actual agriculture results collected for the agriculture region to produce comparison data;
    based, at least in part, on the comparison data, determining an in-season course correction agriculture prediction for the agriculture region;
    generating, by the host device, an agriculture prescription regarding at least a portion of the agriculture region based on the current agriculture prediction and the in-season course correction agriculture prediction;
    sending, by the host device, the agriculture prescription to the agriculture equipment;
    in response to receiving the agriculture prescription, the agriculture equipment dispensing a volume of agriculture substance based on the agriculture prescription.

2. The method of claim 1 further comprises:
    executing, by the one or more computing devices affiliated with agriculture equipment, at least a portion of the agriculture prescription.

3. The method of claim 1 further comprises:
    generating, by one of the one or more computing devices affiliated with agriculture equipment, the at least a representation of the current on-site gathered agriculture data by at least one of:
    utilizing the current on-site gathered agriculture data as the at least a representation of the current on-site gathered agriculture data;

filtering, based on the agriculture prescription, the current on-site gathered agriculture data to produce the at least a representation of the current on-site gathered agriculture data;

compiling the current on-site gathered agriculture data to produce the at least a representation of the current on-site gathered agriculture data; and processing the current on-site gathered agriculture data to produce the at least a representation of the current on-site gathered agriculture data.

4. The method of claim 1, wherein the processing by the host device further comprises:

for a given snapshot of an agriculture season:
comparing the current agriculture prediction with actual agriculture results for the given snapshot to produce comparison data; and
processing the comparison data with the one or more of the at least a representation of the current on-site gathered agriculture data, the current off-site gathered agriculture data, the historical on-site gathered agriculture data, the historical off-site gathered agriculture data, and the historical analysis of agriculture predictions regarding the agriculture region to produce an in-season course correction agriculture prediction for the agriculture region for the given snapshot.

5. The method of claim 1, wherein the collecting the current on-site gathered agriculture data further comprises at least one of:

receiving, from the host device, an indication to collect the current on-site gathered agriculture data;
receiving, from the host device, a message to collect a particular type of agriculture data; and
interpreting, by the agriculture equipment, the agriculture prescription to determine one or more types of agriculture data to collect as the current on-site gathered agriculture data.

6. The method of claim 1, wherein the processing by the host device further comprises:

processing geographical information of the at least a representation of the current on-site gathered agriculture data to produce a current topographical map of the agriculture region; and
comparing the current topographical map with one or more previous topographical maps of the agriculture region to detect one or more areas of erosion.

7. The method of claim 1, wherein the agriculture prescription comprises:

establishing a speed pattern for the agriculture equipment while traversing the at least a portion of the agriculture region.

8. The method of claim 1, wherein the agriculture prescription comprises:

establishing a crop planting orientation pattern for the agriculture equipment while traversing the at least a portion of the agriculture region.

9. The method of claim 1, wherein the agriculture prescription comprises:

establishing a crop planting distribution pattern for the agriculture equipment while traversing the at least a portion of the agriculture region.

10. A non-transitory computer readable storage medium comprising at least one memory section that stores operational instructions that, when executed by one or more processing modules of one or more computing devices affiliated with agriculture equipment of a computing system, cause the one or more computing devices to:

collect, by the agriculture equipment, current on-site gathered agriculture data regarding an agriculture region;

send, by the agriculture equipment, at least a representation of the current on-site gathered agriculture data to a host device;

wherein the host device performs an analysis function that includes historical agriculture data and performance of at least one of:

a transformation operation executable by the one or more processing modules that encodes the agriculture data regarding the agriculture region and transforms a portion of the current on-site agriculture data to a corresponding planting pattern symbol, wherein the planting pattern symbol comprises a track planting pattern for one or more tracks of the agriculture region;

an identification operation executable by the one or more processing modules that identifies an object associated with at least a portion of the current on-site agriculture data, wherein the object is detected by an object detection module operably coupled to a plurality of sensors associated with the host device and identified by an object identification module;

a probability density generating operation executable by the one or more processing modules that generates a measurable parameter of density based on at least a portion of the current on-site agriculture data, a trend analysis operation executable by the one or more processing modules that analyzes estimates of a subset of at least a portion of the current on-site agriculture data, and generates an analysis summary based on at least a portion of the current on-site agriculture data and at least one performed operation;

using the analysis summary to process, by the host device, at least one of the at least a representation of the current on-site gathered agriculture data, current off-site gathered agriculture data, historical on-site gathered agriculture data, historical off-site gathered agriculture data, and historical analysis of agriculture predictions regarding the agriculture region to produce a current agriculture prediction for the agriculture region;

comparing the current agriculture prediction with actual agriculture results collected for the agriculture region to produce comparison data;

based, at least in part, on the comparison data, determining an in-season course correction agriculture prediction for the agriculture region;

generating, by the host device, an agriculture prescription regarding at least a portion of the agriculture region based on the current agriculture prediction and the in-season course correction agriculture prediction;

sending, by the host device, the agriculture prescription to the agriculture equipment;

in response to receiving the agriculture prescription, the agriculture equipment dispensing a volume of agriculture substance based on the agriculture prescription.

11. The non-transitory computer readable storage medium of claim 10 wherein the at least one memory section stores further operational instructions that, when executed by the one or more processing modules, cause the one or more computing devices of the computing system to:

execute, by the one or more computing devices affiliated with agriculture equipment, at least a portion of the agriculture prescription.

12. The non-transitory computer readable storage medium of claim 10 wherein the at least one memory section stores further operational instructions that, when executed by the one or more processing modules, cause the one or more computing devices of the computing system to:
generate, by one of the one or more computing devices affiliated with agriculture equipment, the at least a representation of the current on-site gathered agriculture data by at least one of:
utilize the current on-site gathered agriculture data as the at least a representation of the current on-site gathered agriculture data;
filter, based on the agriculture prescription, the current on-site gathered agriculture data to produce the at least a representation of the current on-site gathered agriculture data;
compile the current on-site gathered agriculture data to produce the at least a representation of the current on-site gathered agriculture data; and
process the current on-site gathered agriculture data to produce the at least a representation of the current on-site gathered agriculture data.

13. The non-transitory computer readable storage medium of claim 10, wherein the one or more processing modules execute the operational instructions stored by the at least one memory section to cause the one or more computing devices of the computing system to:
for a given snapshot of an agriculture season:
compare the current agriculture prediction with actual agriculture results for the given snapshot to produce comparison data; and
process the comparison data with the one or more of the at least a representation of the current on-site gathered agriculture data, the current off-site gathered agriculture data, the historical on-site gathered agriculture data, the historical off-site gathered agriculture data, and the historical analysis of agriculture predictions regarding the agriculture region to produce an in-season course correction agriculture prediction for the agriculture region for the given snapshot.

14. The non-transitory computer readable storage medium of claim 10, wherein the one or more processing modules execute the operational instructions stored by the at least one memory section to cause the one or more computing devices of the computing system to:
receive, from the host device, an indication to collect the current on-site gathered agriculture data;
receive, from the host device, a message to collect a particular type of agriculture data; and
interpret, by the agriculture equipment, the agriculture prescription to determine one or more types of agriculture data to collect as the current on-site gathered agriculture data.

15. The non-transitory computer readable storage medium of claim 10, wherein the one or more processing modules execute the operational instructions stored by the at least one memory section to cause the one or more computing devices of the computing system to:
process geographical information of the at least a representation of the current on-site gathered agriculture data to produce a current topographical map of the agriculture region; and
compare the current topographical map with one or more previous topographical maps of the agriculture region to detect one or more areas of erosion.

16. The non-transitory computer readable storage medium of claim 10, wherein the at least one memory section stores further operational instructions that, when executed by the one or more processing modules, cause the one or more computing devices of the computing system to:
establish a speed pattern for the agriculture equipment while traversing the at least a portion of the agriculture region.

17. The non-transitory computer readable storage medium of claim 10, wherein the at least one memory section stores further operational instructions that, when executed by the one or more processing modules, cause the one or more computing devices of the computing system to:
establish a crop planting orientation pattern for the agriculture equipment while traversing the at least a portion of the agriculture region.

18. The non-transitory computer readable storage medium of claim 10, wherein the at least one memory section stores further operational instructions that, when executed by the one or more processing modules, cause the one or more computing devices of the computing system to:
establish a crop planting distribution pattern for the agriculture equipment while traversing the at least a portion of the agriculture region.

\* \* \* \* \*